(12) United States Patent
Ponting et al.

(10) Patent No.: US 8,818,998 B2
(45) Date of Patent: Aug. 26, 2014

(54) USER INTERFACE FOR USE IN NON-DETERMINISTIC SEARCHING

(75) Inventors: Keith Michael Ponting, Malvern (GB); Darren Lee Standing, Malvern (GB); David Mark Timothy Edwards, Malvern (GB); John Jacob, Malvern (GB); Timothy Richard Edwards, Malvern (GB); Malcolm Fintan Wilkins, Malvern (GB); Neil Campbell, Malvern (GB); James Michael Kirby, Malvern (GB)

(73) Assignee: Aurix Limited, Malvern, Worcestershire (GB)

( * ) Notice: Subject to any disclaimer, the term of this patent is extended or adjusted under 35 U.S.C. 154(b) by 461 days.

(21) Appl. No.: 13/318,657

(22) PCT Filed: May 5, 2010

(86) PCT No.: PCT/GB2010/050735
§ 371 (c)(1),
(2), (4) Date: Jan. 19, 2012

(87) PCT Pub. No.: WO2010/128323
PCT Pub. Date: Nov. 11, 2010

(65) Prior Publication Data
US 2012/0185473 A1    Jul. 19, 2012

Related U.S. Application Data

(60) Provisional application No. 61/213,072, filed on May 5, 2009.

(30) Foreign Application Priority Data

May 5, 2009   (GB) .................................. 0907664.7

(51) Int. Cl.
*G06F 17/30*    (2006.01)
*G06F 7/00*    (2006.01)

(52) U.S. Cl.
USPC .......................................... 707/723; 707/728

(58) Field of Classification Search
CPC .......... G06F 17/30867; G06F 17/3079; G06F 17/30755; G06F 17/3074
USPC ........... 707/723, 728, 748, 769, 805; 715/273
See application file for complete search history.

(56) References Cited

U.S. PATENT DOCUMENTS

| 6,574,632 B2 | 6/2003 | Fox et al. |
| 2001/0003185 A1 | 6/2001 | Lee et al. |

(Continued)

FOREIGN PATENT DOCUMENTS

| EP | 1494144 | 1/2005 |
| WO | WO 02/27533 | 4/2002 |

(Continued)

OTHER PUBLICATIONS

Abberley et al., "The THISL Broadcast News Retrieval System" In Proc. ESCA Workshop on Accessing Information in Spoken Audio, pp. 19-24, Cambridge, 1999.

(Continued)

*Primary Examiner* — Md. I Uddin
(74) *Attorney, Agent, or Firm* — Maldjian Law Group LLC; John Maldjian; Alexander D. Walter

(57) ABSTRACT

Apparatus for analyzing non-deterministic results of a search query of data, comprising a processor and a user interface, the processor being operably in communication with a plurality of data sources and adapted to communicate with the user interface which enables the user to query the content of the data sources, wherein the processor is adapted to determine the probable relevance of at least the part of a searched data source for a user query and the user interface is adapted to present to the user the search results in a form comprising two or more portlets, wherein the portlets comprises two or more of: a portlet presenting the search results (such as search strings) for a data source(s); a portlet presenting the data source (such as by source name) of a data source(s); a portlet presenting a data source filter tree for selecting currently active source(s); a portlet presenting the hit(s) of a search query for a data source; a portlet presenting the hit location within a data source; and at least one of the portlets presents the user with the probability of the relevance of the data source to the search query.

20 Claims, 40 Drawing Sheets

(56) References Cited

U.S. PATENT DOCUMENTS

| | | |
|---|---|---|
| 2003/0163455 A1 | 8/2003 | Dettinger et al. |
| 2004/0100510 A1* | 5/2004 | Milic-Frayling et al. ..... 345/864 |
| 2008/0201348 A1* | 8/2008 | Edmonds et al. ............. 707/101 |
| 2009/0006358 A1* | 1/2009 | Morris et al. ..................... 707/5 |
| 2010/0070523 A1* | 3/2010 | Delgo et al. .................. 707/769 |

FOREIGN PATENT DOCUMENTS

| | | |
|---|---|---|
| WO | WO 2007/124429 | 11/2007 |
| WO | WO 2008/027367 | 3/2008 |

OTHER PUBLICATIONS

En Cheng et al: "Search Result Clustering Based Relevance Feedback for Web Image Retrival." 2007 IEEE International Conference on Acoustics, Speech, and Signal Processing. Apr. 15-20, 2007. Honolulu, HI, USA, IEEE, Piscataway, NJ USA.

International Search Report prepared by the European Patent Office on Oct. 7, 2010, for International Application No. PCT/GB2010/050735.

Written Opinion prepared by the European Patent Office on Oct. 7, 2010, for International Application No. PCT/GB2010/050735.

* cited by examiner

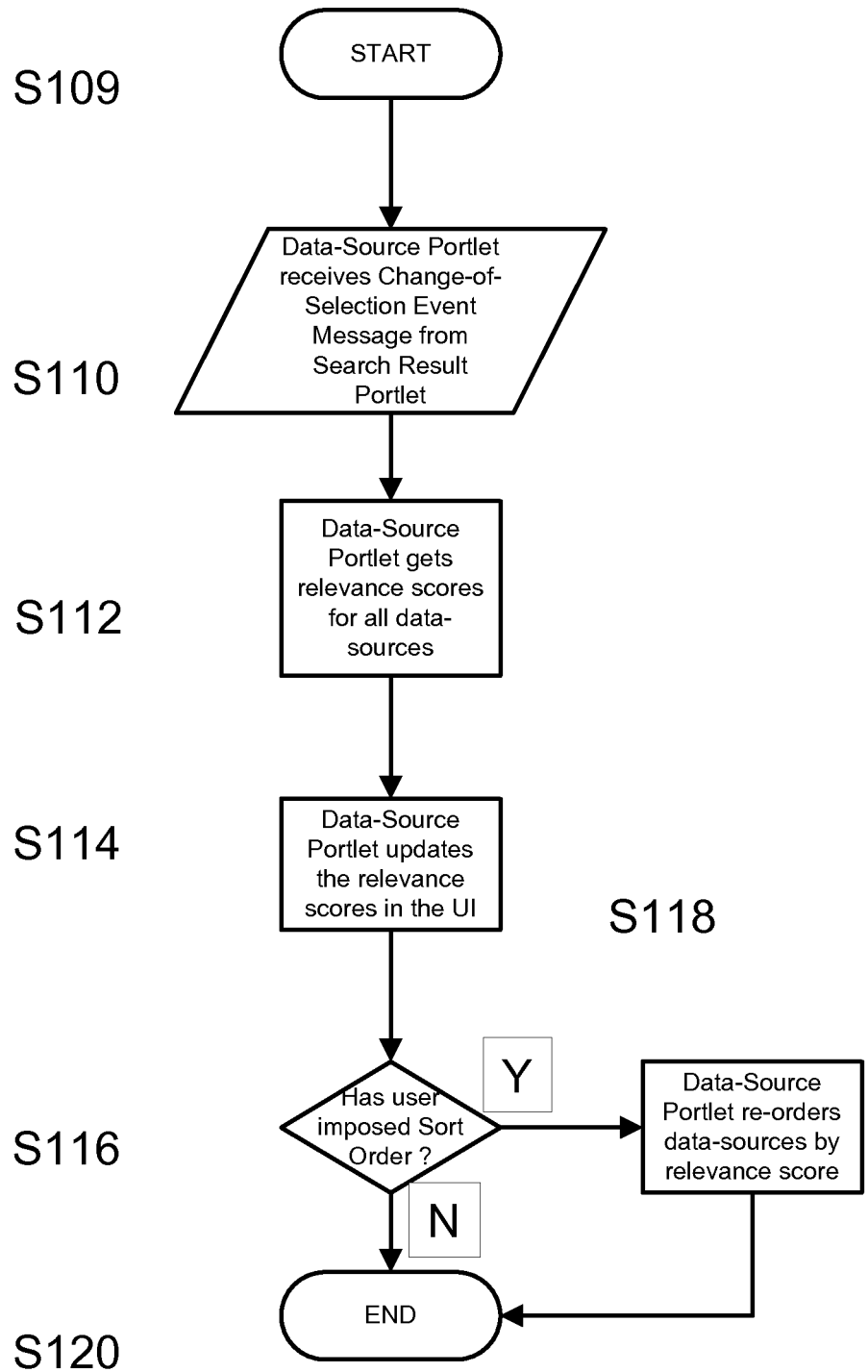

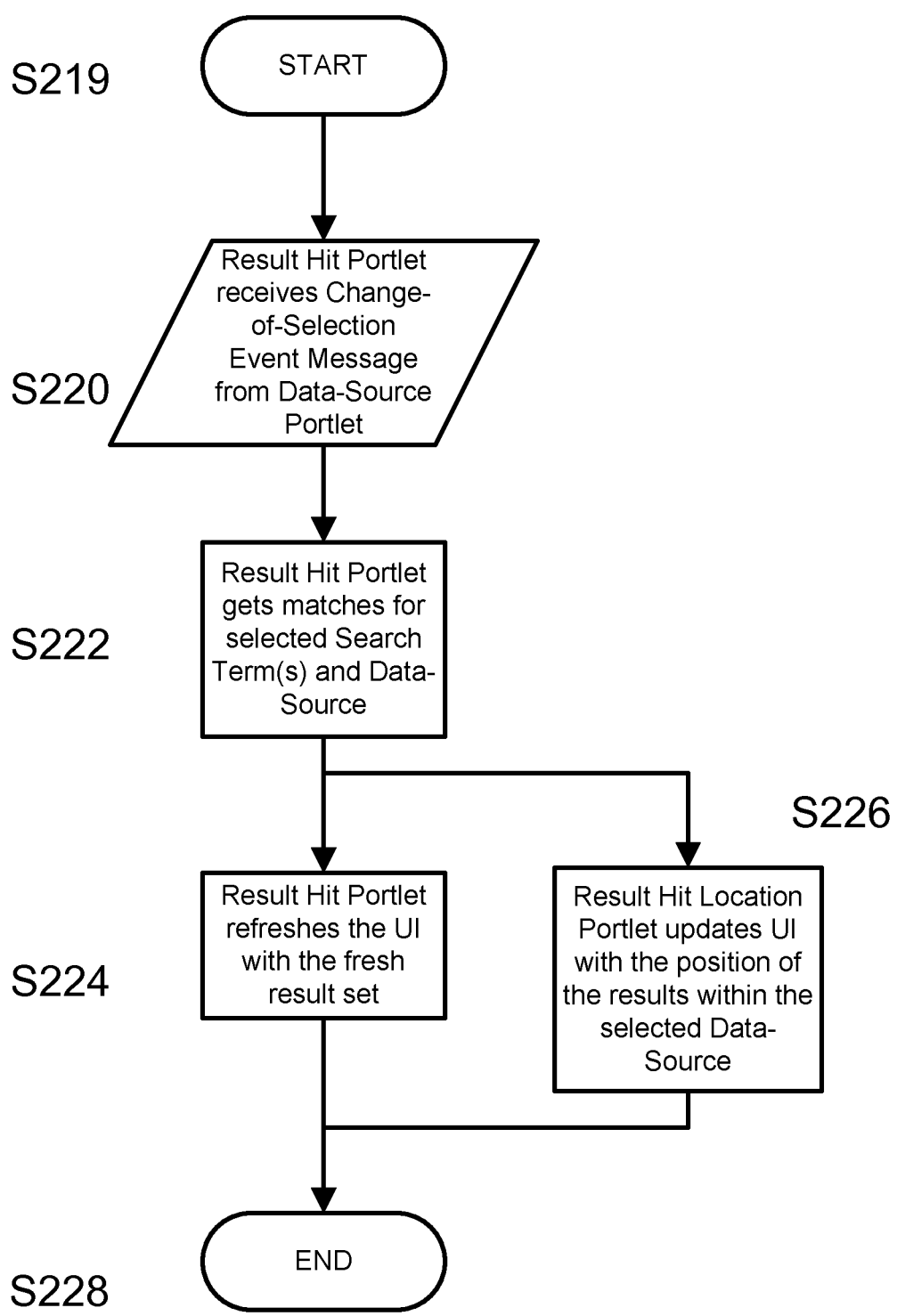

USER INTERFACE FOR USE IN NON-DETERMINISTIC SEARCHING

CROSS REFERENCE TO RELATED APPLICATIONS

This application is a national stage application under 35 U.S.C. 371 of PCT Application No. PCT/GB2010/050735 having an international filing date of 5 May 2010, which designated the United States, which PCT application claimed the benefit of Great Britain Application No. 0907664.7 filed 5 May 2009 and U.S. Provisional Application No. 61/213,072 filed 5 May 2009, the entire disclosure of each of which are hereby incorporated by reference.

FIELD OF INVENTION

The invention relates to, but not exclusively, a user interface to analyse, resolve and augment the necessarily non-deterministic results of a complex search involving audio data. In particular the interface enables the user to identify and effectively edit the relevance of the results of complex search queries that may otherwise not be apparent.

BACKGROUND TO THE INVENTION

It is known to submit queries to a database that return deterministic results where there is no ambiguity in the search term or the retrieved result. For example, a deterministic result from an SQL query may result from a query such as SELECT name FROM customers WHERE customer_id="123456", where the search terms, namely customers and customer_id are defined.

Furthermore, a search query may be a complex search or a nested search query, which utilises conjunctions and disjunctions to assimilate a query. For example a typical nested query in a SQL based environment may be SELECT*FROM customers where ((credit_rating='good' AND payment_history='excellent') OR (credit_rating='excellent')). In this example, a user may wish to identify all customers with good or excellent credit ratings, and has combined several search constraints, namely credit rating and payment history, to form a search query through the use of logical connectives such as conjunction and disjunction. In this way queries can be nested or structured in a hierarchical manner that creates complex search queries which query many objects which have a common root. Thus, the complex search query is a convenient way of referring to a single hierarchy of connected search constraints and search phrases. In the following description "search constituent" is used to indicate any constituent within the query structure, from an individual search term (word or phrase), through the search constraints to the entire complex query.

Subjectivity or uncertainty in the searched or queried data or material will result in non-absolute or non-deterministic results. This is particularly apparent when there may be some uncertainty in the content of the data. In particular searching multimedia data, such as audio recordings, usually gives rise to non-deterministic results due to the uncertainties involved in methods of searching audio data such as word recognition. Uncertainties in word or pattern recognition often require results to be calculated by their probable relevance or likelihood of match given uncertainties in the models used.

Such non-deterministic results are typically expressed as scores on a numerical scale for each of a set of variables, and execution of a complex search query is the process of extracting or obtaining those scores for the specified variables. The use of numerical scores allows alternative implementations of complex queries, which may be expressed as weighted combinations, so that if credit_rating and payment_history are scores on a numeric scale, the combined score would be expressed as 0.7*credit_rating+0.3*payment_history. For the example application this process is known as "credit scoring", but there are many wider applications. A further alternative is to introduce non-linear functions into the process, so that the combined example score would be 1/(1+exp(intercept+0.7*credit_rating+0.3*payment_history)), where "intercept" is a further heuristic parameter to be determined—in this form one statistical method allowing automatic selection of the parameters (intercept, 0.7, 0.3) is known as "logistic regression" and the input variables (credit_rating, payment_history) are known as "predictors". The word "probability" should be interpreted to mean any such score on a numerical scale, whether or not it strictly obeys the mathematical definition of probability.

It is known to combine such numerical scores with deterministic information and to allow such deterministic information to modify the weightings. In statistics, such information may be represented as a "factor" (taking one of a discrete set of values) among the predictors, and the modification of the weightings corresponds to "interactions" among the predictors, whether those are discrete or continuous. For example, in credit rating the applicant's gender may be included either in isolation, effectively providing a different "intercept" for men and women, or in such a way that all the parameters are different for men and for women.

The use of non-deterministic searching and matching is a powerful tool when analysing data. However, it is often difficult for a user to resolve or understand the non-deterministic nature of the query in a quick and efficient manner. In particular, a complex search query with nested queries may result in a non-deterministic result which has a relevancy score for each of the nested queries. As a complex query may have a nested structure which potentially runs into several tens or hundreds of fields, the user would be presented with a result that may have relevancy scores, or likelihoods of matches, for each of the terms in the nested structure requiring a large amount of human interaction and assimilation for the user to fully understand the results of the search query. Therefore, there is a need for the user to better understand the data presented to them, in a manner that facilitates their understanding of the results and improves man-machine interaction. In particular, there is a need for the user to be able to easily identify which of the results which have a probable relevance are the most likely to be absolutely relevant i.e. those hits or results that relate to the terms or objects for which the user is searching.

Additionally, due to the non-deterministic nature of the results there will be results returned from a search query that are calculated as having a high relevance which are in fact irrelevant or conversely, results that are seen as irrelevant which are in fact relevant. This is particularly an issue for searches of non-textual analogue material, such as audio, video or any other signal (such as radar) where there are uncertainties involved in the pattern matching algorithms used.

To assign an absolute relevance to a result (i.e. to turn a non-deterministic result to an absolute result) requires the result to be verified in some manner. Human interaction can help determine if the result is correct, however this may require a user to check the entire source that contains the hit. For example, if a complex nested search has returned a match to an audio source, and the user wishes to see if indeed the source is relevant they would be required to listen to the entire source to determine the relevancy of the audio source. This is clearly inefficient and, in the case where the source may be several minutes or hours in length, time consuming. Therefore, there is a requirement for a system which allows users to quickly and efficiently determine the relevancy of a hit and assign an absolute relevance if required.

To mitigate at least some of these, and other problems in the prior art there is provided, according to a first aspect of the invention apparatus for analysing non-deterministic results of a search query of data representing analogue information, such as audio data, comprising: a processor and a user interface, the processor being operably in communication with a plurality of data sources, preferably audio data sources, or databases representing the content thereof and adapted to communicate with the user interface which enables the user to query one or more data sources for the presence of search constituents within the data, wherein the processor is adapted to determine the non-deterministic likelihood of occurrence of the search constituent within at least part of a searched data source for a user query and the user interface is adapted to present to the user the search results in a form comprising two or more portlets from: a portlet presenting the overall search results (such as search strings) against part or all of the search query structure for a data source(s); a portlet presenting the data source (such as by source name) of one or more data source(s); a portlet presenting a data source filter tree for selecting currently active source(s); a portlet presenting the hit(s) of the search phrase(s) for a data source; a portlet presenting the hit location(s) within a data source, and wherein at least one of the portlets presents the user with information related to the probability of the relevance of a selected data source to the search query and/or parts of the search query, and the user interface further enabling the user to select and inspect at least part of the searched data source(s) for the presence of the search constituents.

According to another aspect of the invention there is provided a data file comprising core data and associated metadata, wherein the metadata comprises deterministic results of a complex search query resulting from human intervention with the data so as to assign the deterministic result to the data.

According to yet another aspect of the invention there is provided a method of analysing source data relevance for a complex search query, comprising the steps of constructing a complex search query of two or more search phrases, terms and/or constraints, searching a plurality of data sources according to the complex search query, determining a probable relevance of at least part of a data source for the search query, presenting the probable relevance of the data source to a user, enabling the user to determine directly the relevance of the data source for the search query, and enabling a user to edit the probable relevance of the data source based on user interaction with the data source.

According to yet another aspect of the invention there is provided a method of analysing plural data sources said data sources comprising core data and metadata; wherein at least some of the metadata comprises deterministic relevance results of a complex search queries, said deterministic relevance results determined through human intervention with said data sources having previously had non-deterministic relevance results for the relevance of a match of the source with the complex search query. The metadata may also include other information related to the data source, for example within a call centre environment the metadata may include agent and customer identifiers.

According to yet another aspect of the invention there are provided associated methods for defining sets of tags or labels and for assigning one or more tag(s) from one or more set(s) to some or all of the data sources or to portions within some or all of the data sources. The tags may be defined to be mutually exclusive within each set, so that at most one tag can be assigned from the set, or may be allowed to co-exist. The assignment of tags may be: fully automatic, based on ranges of the scores associated with the non-deterministic search results (alone or in combination with source metadata); fully manual, based on inspection of each data source; or a combination of these approaches. Once assigned the tags may be used, alone or in conjunction with search results and/or metadata associated with the data source, to select subsets of the material for further processing.

According to yet another aspect of the invention there is provided support for multiple people to work on the same project, including methods for exporting and importing the project as a whole and methods for re-connecting a project with data sources when either the data has been moved or the address through which the data is accessed has changed.

According to yet another aspect of the invention there is provided apparatus for defining deterministic results of a non-deterministic search comprising; a processor and a user interface, the processor being operably in communication with a plurality of data sources or databases representing the content thereof and adapted to communicate with the user interface which enables the user to query the content of the data sources, wherein the processor is adapted to determine the probable relevance of at least part of a searched data source for a user query and the user interface is adapted to present to the user the search results; the user interface further enabling the user to select and inspect at least part of the searched data source to assign a deterministic relevance result for at least part of the user query to said searched data source and/or to assign one or more tags from predefined tag sets to at least part of said searched data source.

Other aspects and features of the invention will become apparent from the following description and the appended claims.

BRIEF DESCRIPTION OF DRAWINGS

An embodiment of the invention is now described, by way of example only, with reference to the accompanying drawings in which:

FIG. 9b shows a flow diagram of the effect on the data source portlet of the user selecting a search constituent;

FIG. 11c is a flow diagram of the results on the result hit portlet and result hit location portlet of a user selecting a specified data source;

A DETAILED DESCRIPTION OF AN EMBODIMENT OF THE INVENTION

The present invention is described by reference only, in an example where the user is searching a set of audio sources to determine their content, and specifically to determine if certain key-words or phrases are present in the dataset.

The embodiment described herein is implemented using a user interface built on Windows Presentation Foundation (WPF). Other Graphical User Interface (GUI) tools and any suitable programming language may also be used. The audio data is searched using an audio search tool which assigns scores to matches against the search phrases, preferably an Aurix® audio miner which assigns the relevancy scores according to the confidence level of the match of the inputted search terms to the hidden Markov models used to describe the data.

In further embodiments other data sources and types of data representing analogue information (e.g. video, radar etc) are searched and relevancy scores determined according to the models used by the searching program. Analogue information is taken to mean data that represents natively non-discrete data such as audio, video etc. This data may itself be stored in a digital format (e.g. an audio file stored as a .wav file) but represent analogue information (i.e. the waveform of the audio).

The content which is searched for data sources or other types of data may be taken to include "metadata", such as, for example, the date on which a particular source was created and the words "search phrase" used herein are intended to include items which match such metadata.

Figure 1:
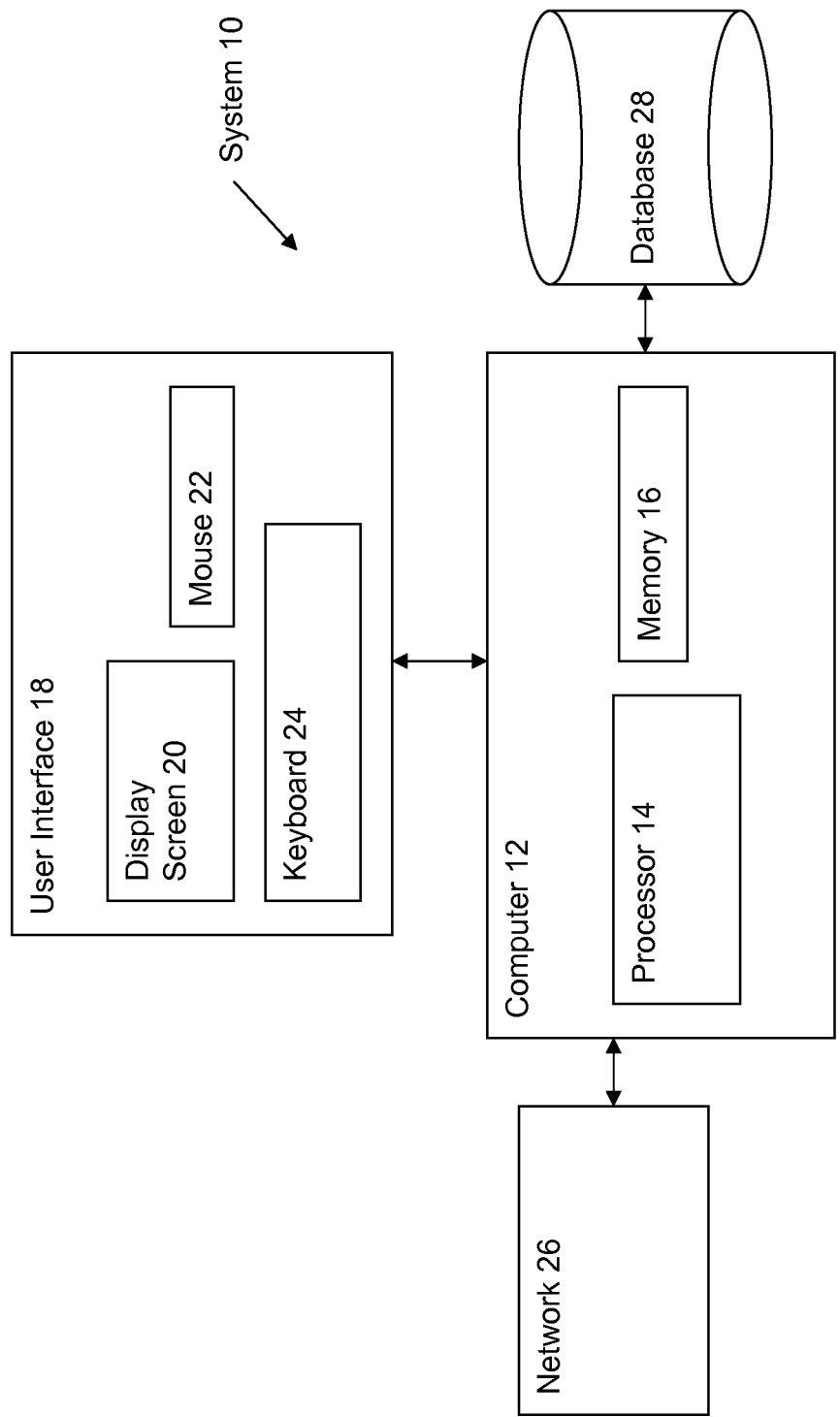
FIG. 1 is a schematic representation of the apparatus according to an aspect of the invention.

FIG. 1 shows a schematic representation of the apparatus according to an aspect of the invention. There is shown, the system 10, a computer 12, comprising a processor 14, and a memory 16. There is also shown a user interface 18, comprising a display screen 20, a mouse 22, and a keyboard 24. The computer 12 is in communication with a network 26 and an external database 28.

According to an aspect of the invention the computer 12, may be any known computer device such as a personal computer, desktop computer, laptop computer etc. The computer 12 may be connected as part of a network of computers or as a stand alone computer device. The computer 12 may also be in communication with an external database 28 comprising one or more sources which may without limitation be media files, text files or data files. The database 28 may be local to the computer and/or distributed across the network 26. The network 26 may represent a wired or wireless network of computers or the Internet.

The computer 12, is connected to a user interface 18. The user interface 18 may comprise any device which enables a user to interact with a computer in a known manner. In the preferred embodiment, the user interface 18 comprises a known display screen 20 a known mouse 22 and a key board 24, though in other embodiments other user input devices such as a known touch screen device, may be used as well or instead.

In the course of this specification the invention will be described with relation to a desktop computer which forms part of a network, though the invention may also be part of a network of computers, a function on a stand alone device, or be downloaded from the internet as an applet or stand alone programme.

The present invention is described with particular reference to the searching of audio data. The audio data in a preferred embodiment is searched for matches based on phonetic spelling(s) of search phrases wherein the audio data is initially analysed to give match scores based on phoneme models. Such analysers are commercially available from Aurix®.

Figure 2:
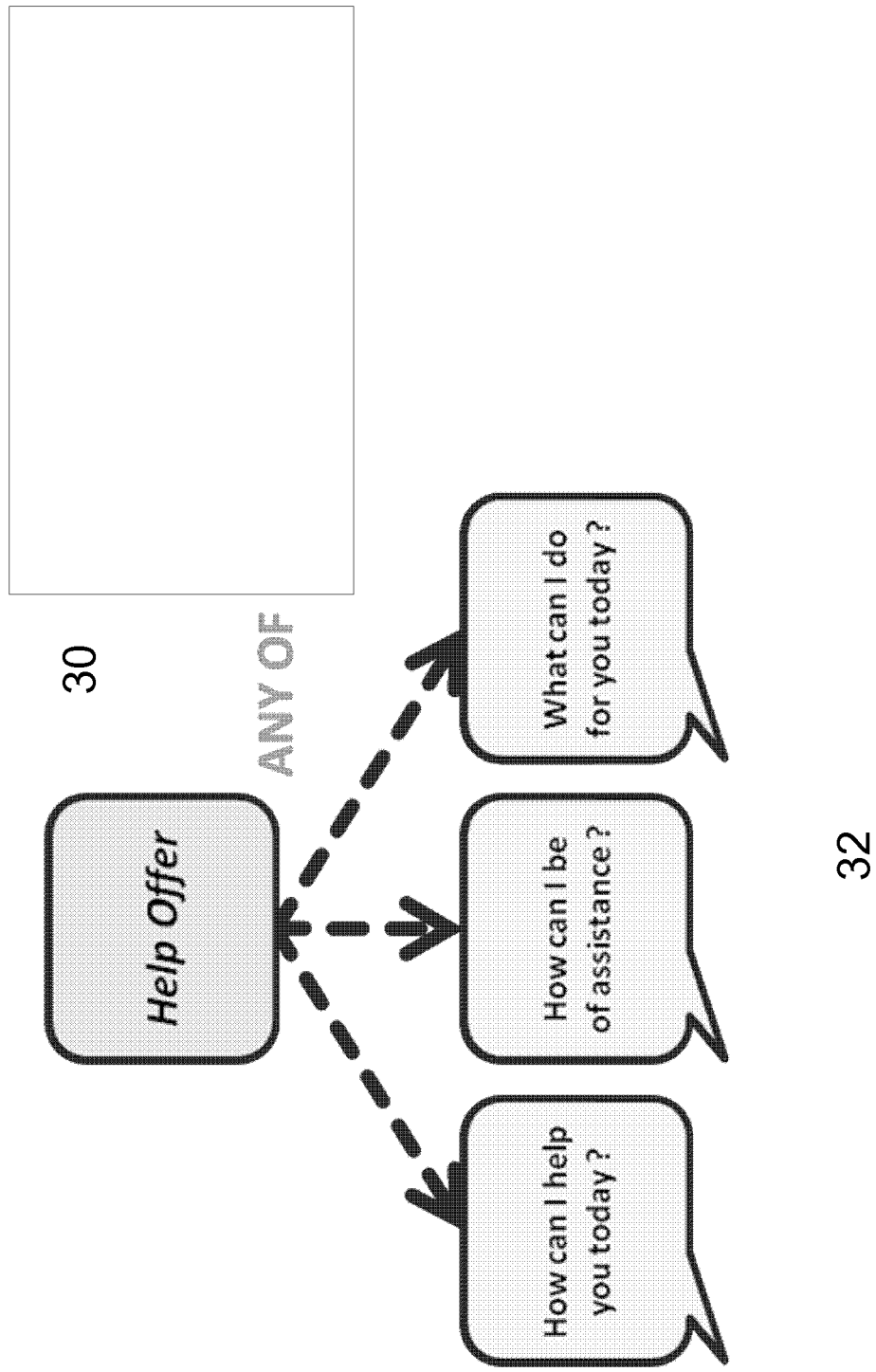
FIG. 2 is an example of combining search phrases to form a complex search query.

FIG. 2 is an example how search phrases can be combined to form a more complex search constraint.

A search phrase is a pattern of characters used to identify matches in source material as a result of executing a search. A search phrase could be a single word, a sequence of words, or other symbols such as phonetic symbols or wild card characters. It could also be a specification to be matched against metadata associated with the source data. The term "search constraint" refers to a collection of one or more search phrases that are combined through the use of logical connectives such as conjunction and disjunction.

In FIG. 2 there is shown the search constraint 30 and the search phrases 32. The search constraint 30 has been named "help offer". The search phrases include "how can I help you today?", "how can I be of assistance?", "what can I do for you today?". As can be seen, the three search phrases are combined to form a single search constraint 30 of "help offer".

Figure 3:
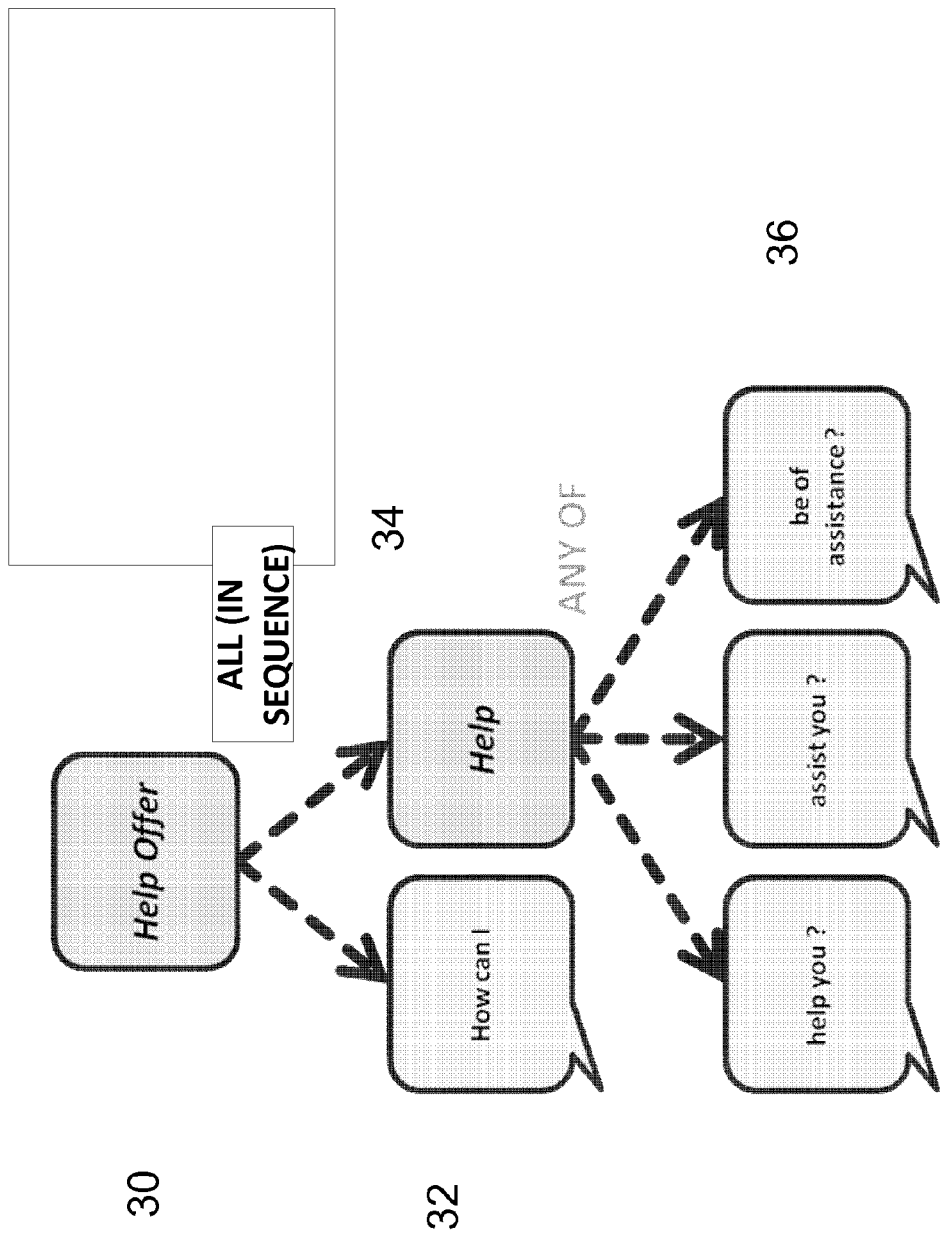
FIG. 3 is a further example combining search phrases to form a complex search query.

FIG. 3 shows a further example of how search phrases and other search constraints can be combined to form a more complex search constraint. There is shown the search constraints 30 and 34 and the search phrases 32 and 36.

The search constraint 30 is named "help offer", and comprises the sequence of the search phrase 32 "how can I" and the secondary search constraint 34 named "help". The search constraint 34 "help" further comprises any of the secondary search phrases 36 as shown in FIG. 3, namely "help you", "assist you" and "be of assistance". As can be seen, the search constraint is more complex than that shown in FIG. 2 as it now forms a two level hierarchical sequence of terms. Therefore, the possible terms searched for in the audio data will include phrases such as "How can I help you?" and "How can I be of assistance?". However, as the search constraint requires all the terms to be in sequence, it does not comprises the phrases which are out of sequence, such as "be of assistance how can I?". In further embodiments, the requirement for the search constraint 30 to be in sequence may be removed. However, in some situations the removal of the sequence stipulation allows for phrases that are potentially grammatically incorrect and unlikely to occur to become search terms and increases the computational cost of the search.

Figure 4:
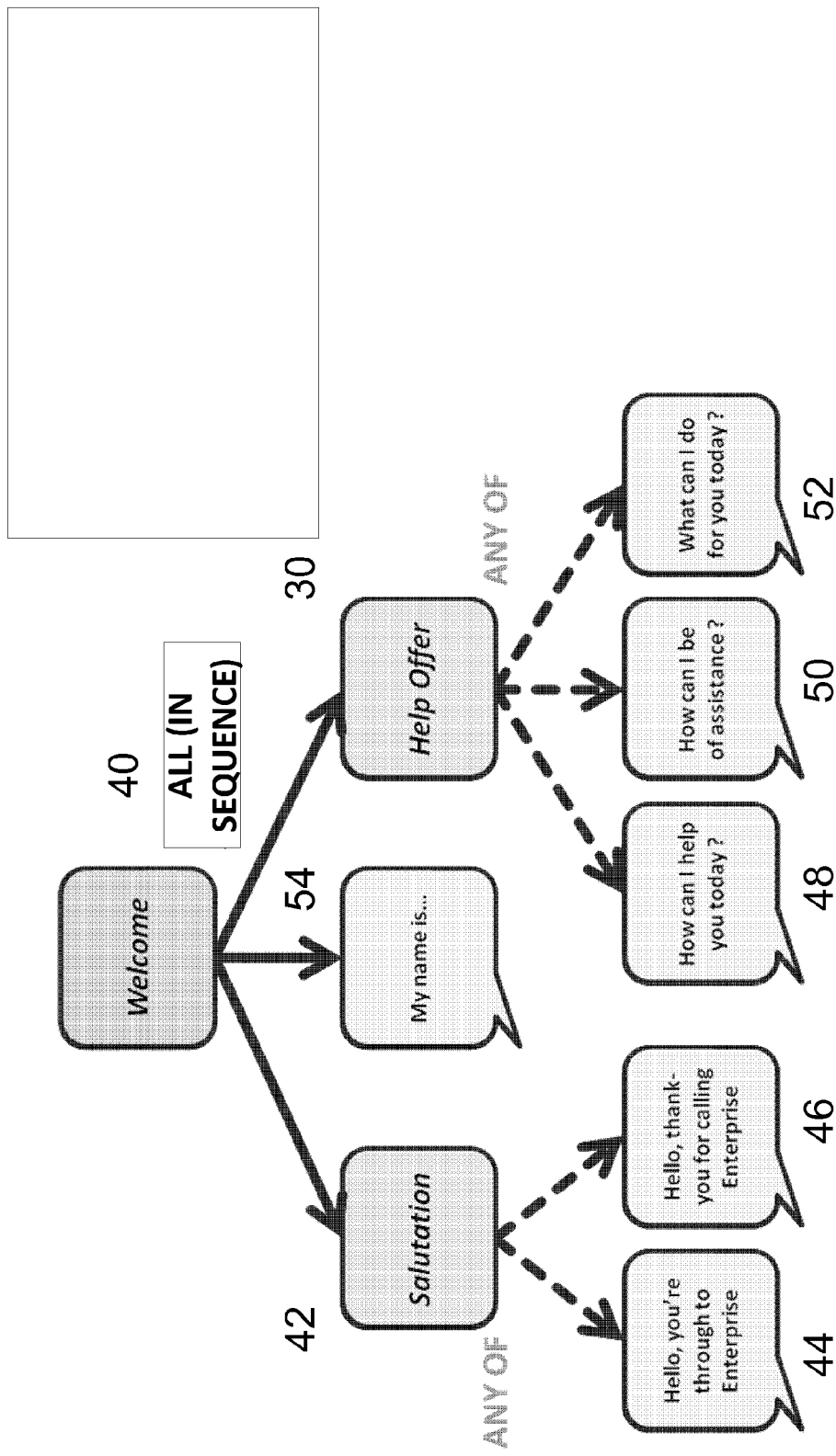
FIG. 4 is a further example of a complex search query.

FIG. 4 is a further example of a complex search query that combines search constraints and search phrases in sequence. There is shown a complex search query 40 "Welcome", the complex search query 40 comprising two search constraints "help offer" 30 and "salutation" 42 and a search phrase "my name is" 54. The search constraint "salutation" 42 further comprises two search phrases, "hello, you are through to Enterprise" 44, and "hello, thank you for calling Enterprise" 46. The search constraint "help offer" 30 further comprises, three search phrases namely "how can I help you today" 48, "how can I be of assistance" 50 and "what can I do for you today" 52.

The complex search query 40 comprises all of the search constraints "salutation" 42 and "help offer" 30 and the search phrase "my name is" 54. Therefore, the complex search query 40 "Welcome" encompasses all the possible sequential search phrases for example, "hello, you are through to Enterprise, my name is . . . how can I be of assistance", "hello, thank you for calling Enterprise, my name is . . . how can I help you today" etc. As discussed with reference to FIG. 3, the sequential requirement of the search phrases ensures that less likely sequences of phrases do not form part of the search terms e.g. "how can I help you today, hello thank you for calling Enterprise, my name is . . . ". In further embodiments the requirement of the terms in sequence may be removed and all possible combinations of the search phrases are searched.

Therefore the search constraint may include other search constraints as a convenient way of building previously defined search phases into a nested structure. Through the use of logical connectives, such as conjunction and disjunction, the complex search query is a convenient way of referring to a single hierarchy of interconnected search constraints and search phrases.

The nature therefore of a complex search query, is that the query criteria can be nested and combined to build a sophisticated search request such as those showing in FIGS. 2 to 4. The complex search query can therefore be composed of several interconnected and inter related search constituents, which are defined under a single complex search query 40 in terms such as "welcome". The complex search query in the present invention may be constructed in any suitable manner.

It is also beneficial to build up a library of such phrases and constraints and to provide appropriate tools for so doing as part of the query editing interface. The skilled man will readily understand how that may be accomplished.

Such phrases and library of phrases are particularly beneficial when examining audio data from environments such as call centres. Typically a person in a call centre will have a particular script and there may be some regulatory requirement to ask certain questions e.g. ensuring the person is over the age of 18. The library of search queries can save time when searching the audio data (e.g. recorded telephone call data).

Figure 5:
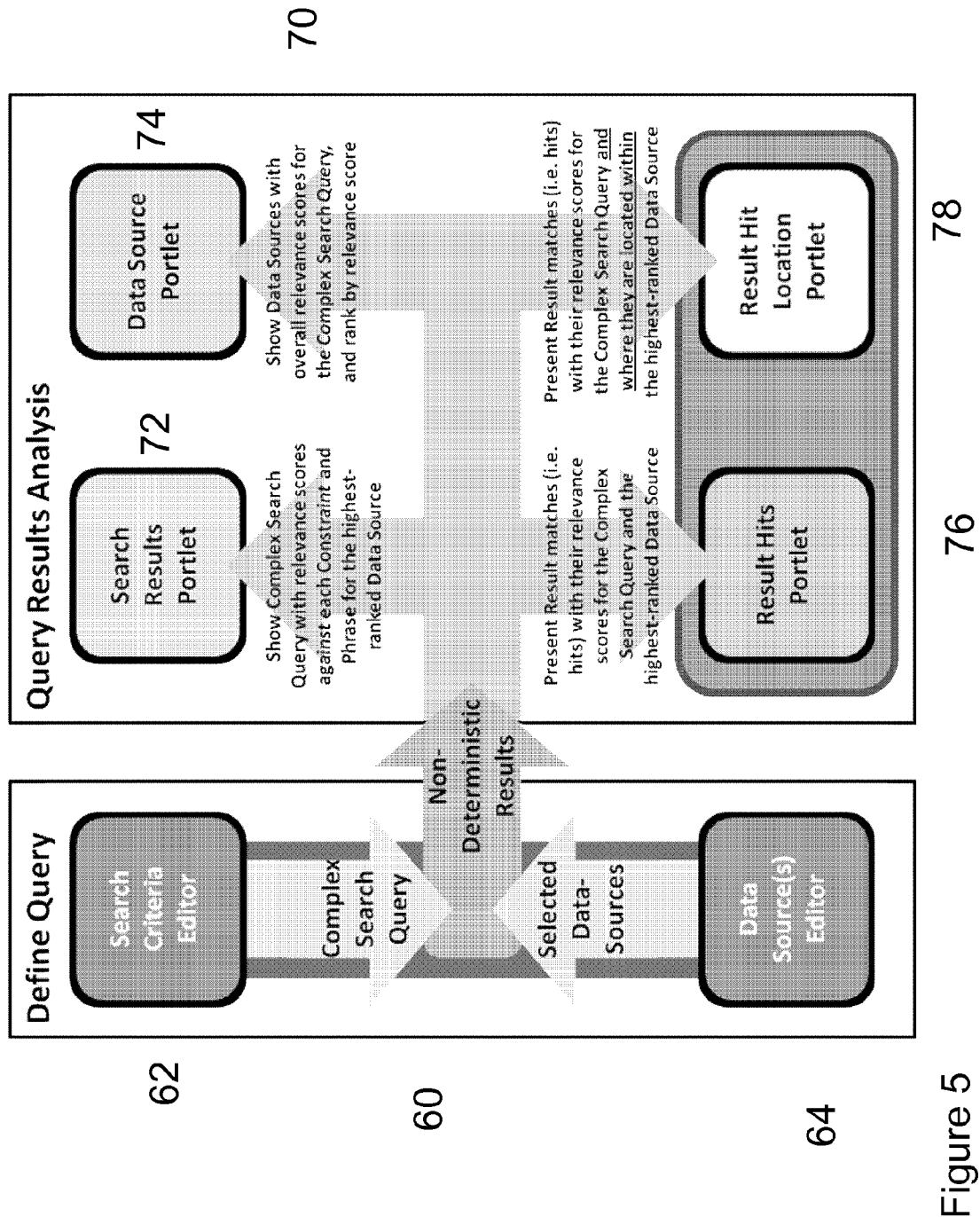
FIG. 5 is a data flow diagram according to an aspect of the invention.

FIG. 5 is a data flow diagram of the user interface according to an aspect of the invention.

There is shown, the defining of the query 60, comprising the search query editor 62 and a data source editor 64. There is also shown, the query results analysis 70, comprising a search results portlet 72, a data source portlet 74, a result hits portlet 76 and a results hit location portlet 78.

A data source is defined as any coherent package of information that can be queried for non-deterministic results. In the preferred embodiment, data sources correspond to persistent storage in any form, such as media files, web pages or records within some data base, in particular audio files. The data source preferably comprises core data e.g. the audio data of an audio file, and metadata e.g. a header describing the content of the audio file. The core data varies according to the file type e.g. for a written article the core data would comprise the text data. An example of a data source may be recorded telephone calls in a call centre environment.

The invention may also be applied to searches of "streaming" data, in which case data sources would correspond to streams and the latest part of a stream would be retained (e.g.

in volatile storage in a ring buffer) allowing detailed inspection of results only within that latest portion.

Figure 5A:
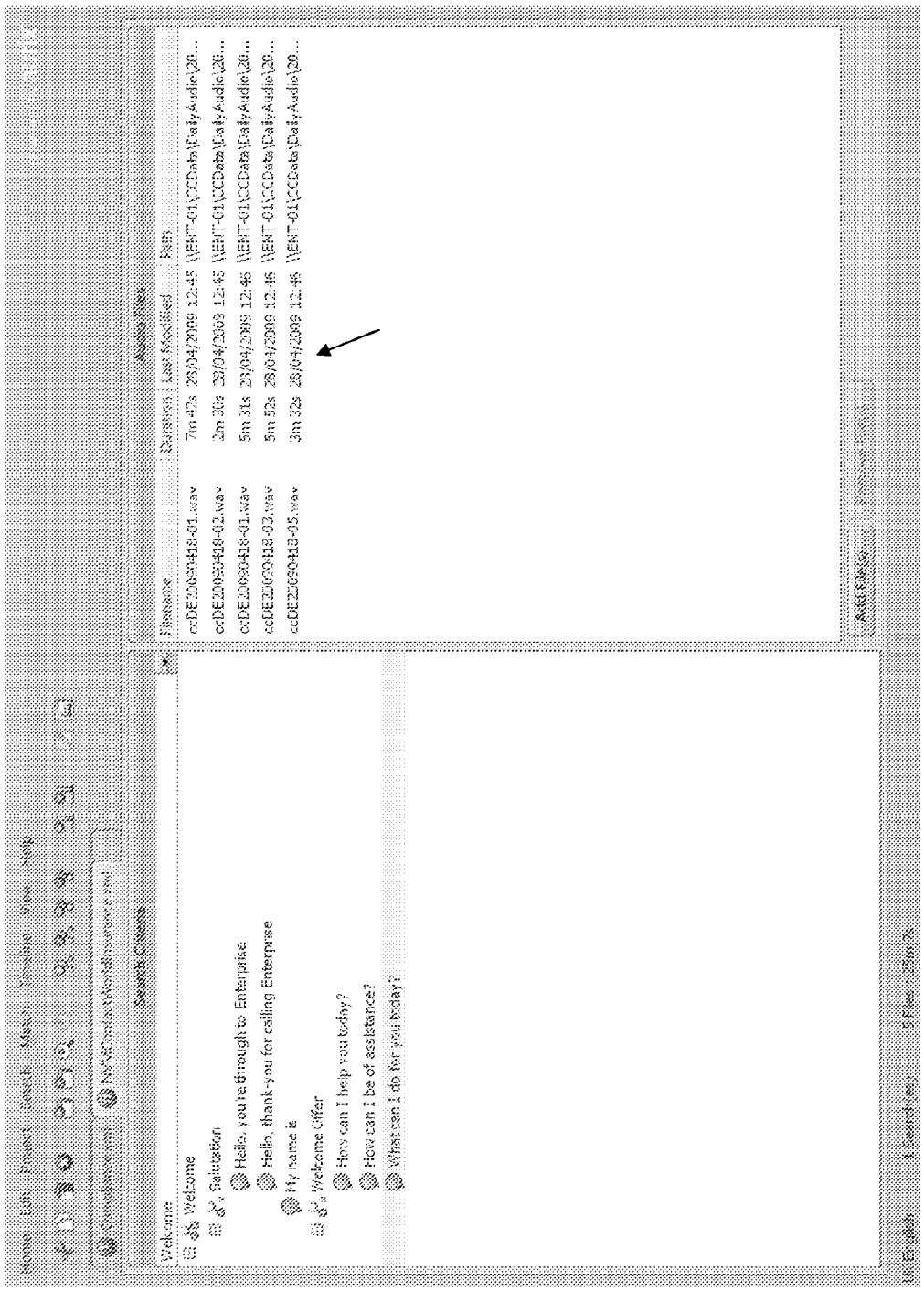
FIG. 5a is an example of the edit view.

The search criteria editor 62, is shown in further detail in FIG. 5a. It is shown as a separate interface, though the selection of data sources could equally be enabled through the Search Results and Data Source portlets described later.

FIG. 5a, shows a screen shot of the user interface wherein the complex query of FIG. 3 is shown in the left hand panel as a hierarchical structure (using a WPF "treeview" control). The editing tool allows both modification of the display (expansion and contraction of parts of the tree) and modification of the tree structure (addition of phrases and constraints; specification of how the constituents of a constraint are combined). The right hand panel displays the set of data sources on which the query is to be run. When the data sources correspond to individual files, the selection of data sources may be accomplished using standard file selection components.

When defining the query 60, the user inputs the complex search query 40, as detailed with references to FIGS. 2 to 4, in the search criteria editor 62. The user also selects the various data sources to be queried from the data source editor 64. In the preferred embodiment, the data sources are audio files though other media files and other types of files such as alphanumeric text files may also be used. Once the query 60 has been defined the query is run and the non-deterministic results are passed on to query results analysis 70. The query results analysis comprises the various portlets: a search results portlet 72, a data source portlet 74, a result hits portlet 76 and a results hit location portlet 78.

A portlet is an independent component in a user interface of an overall portal or interface. In the user interface framework a portal is a single point which will provide access to a variety of information. In the preferred embodiment this may include a web portal i.e. one which is accessible from the worldwide web, or a desk top portal i.e. one which is accessible from a desk top computer. However the invention in further embodiments may be implemented by any means which allows a plurality of inter-operating user interface elements. A portlet is an independent user interface component of a portal. A portlet can be said to:

A. Publish the event of change of state (for example a change in focus of the selected item);

B. Subscribe to events that may be published by other portlets within the portal. It is through such subscription that the portlets become "aware" of a state of change in another portlet.

In the query results analysis 70 there are four such portlets. The search results portlet 72, presents the relevant scores for each search constituent within the complex search query 40, as applied to selected data sources as determined by the data source portlet 74, which refers to some or all of the set of data sources entered within the data source editor 64 for which query results are available. The data source portlet 74, presents the relevant scores for each data source as they are calculated for the selected search constituents. The results hits portlet 76 presents the individual results/matches/hits for the selected search constituents in the search results portlet 72, against the selected data sources as listed in the data source portlet 74. The results hit location portlet 78, shows where the individual results within the results hit portlet 78 are located within the selected data sources listed in the data source portlet 74.

Therefore, in an embodiment the four portlets interact through the subscribing of events of other portlets. This in turn provides a "cascade" effect where the change of state (e.g. through interaction with data) in a first portlet may result in a change of state in all other portlets.

Such a cascade increases the user's cognitive understanding of the data. In particular a user can see the effect of, for example, changing a search constituent and the returned data. Therefore, the invention provides a tool for the user to fully understand the data set as well as spot any patterns in the data that would otherwise be unseen without a full time consuming analysis of the data.

For example, if the invention is used to determine regulatory compliance in a call centre environment, the ability to determine if a particular word or phrase is present in a number of conversations in the search results portlet 72, and to see which sources of data (which may be identifiable to a particular operator) contain, or not as the case may be, the required search constituents help with the user's understanding of the data. Therefore, the invention provides the user with a tool to interact and select various data elements as well as increasing their understanding of the data.

In FIG. 5 the user has inputted their search criteria into the search criteria 62 and such criteria has been searched for within the selected data sources as selected by the data source editor 64. Such a search will determine non-deterministic results for the reasons discussed in the introduction. These results are passed onto the query results analysis 70, wherein the user is enabled to further analyse and determine the nature of the data. Each portlet as described above presents the user with relevancy scores to the data as determined by the non-deterministic results.

In further embodiments additional information is added to the displays. For example, the reliability of search hits in a phonetic audio mining system is strongly related to the number of phonemes in the search term. Therefore a function such as $1/(1+\exp(-0.5*(x-10)))$, where x is the phoneme count and exp the exponential function, may be used to represent this reliability as a score in the range 0-1. An appropriate visual indication of the reliability score is attached to each search term in the search criteria editor 62 and/or the search results portlet 72 and/or the dialog box used for entering search phrases. Examples of the visual indicators include partially filled/coloured bars where the filling of the bar is representative of the reliability of the score. In further embodiments, other functions to represent the reliability of a search query may also be used. Such indicators also further increase the user's understanding of the queried dataset.

Figure 6:
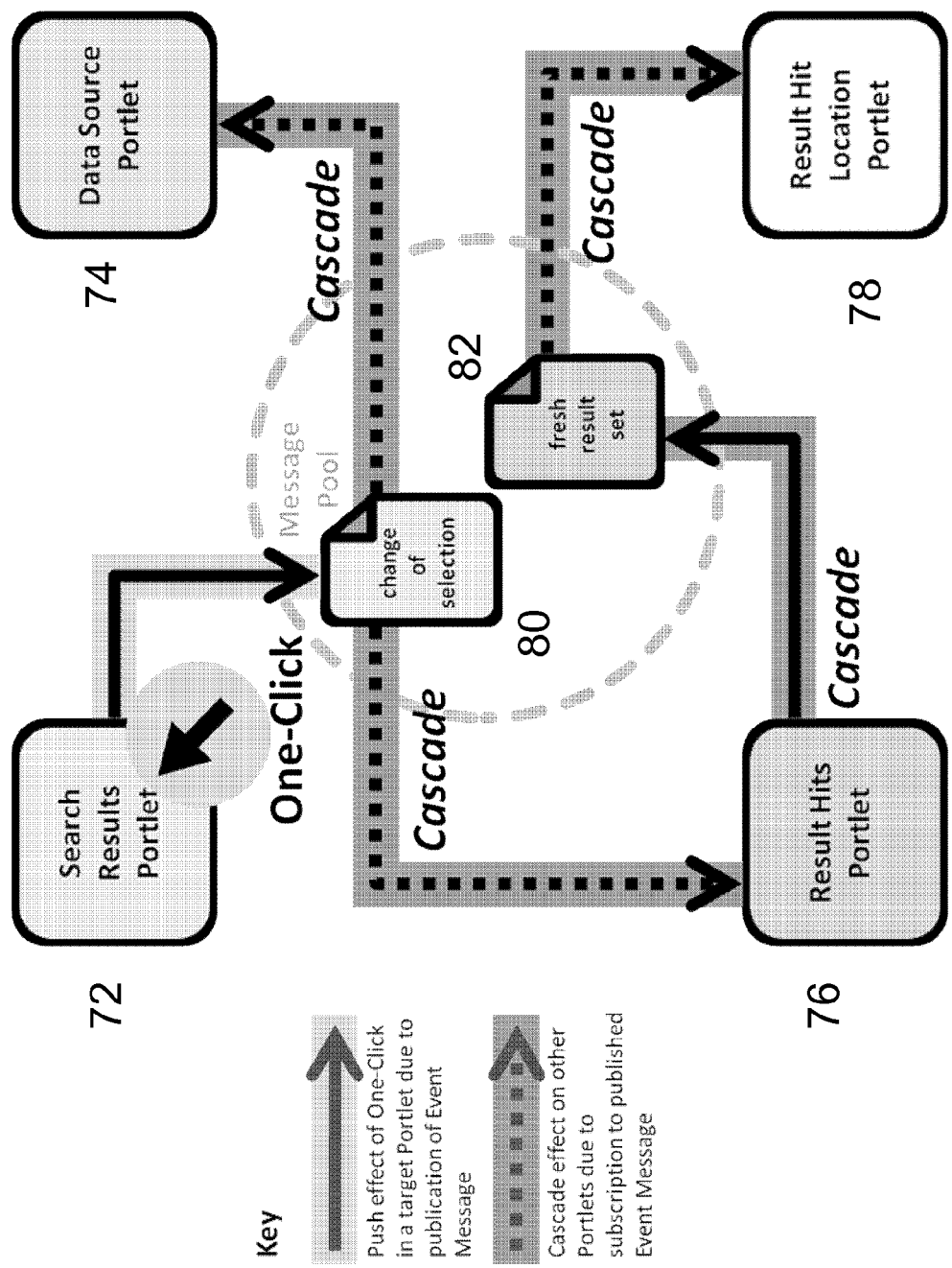
FIG. 6 is an example of a "cascade" according to an aspect of the invention.

FIG. 6 is an example of a "cascade" in the present invention, showing how the content of the individual portlets 72, 74, 76 and 78, are updated during a change-of-state event, whenever state is changed within any one of the portlets. There is shown the search results portlet 72, the data source portlet 74, the results hit portlet 76, the results hit location portlet 78, a change of selection event 80 and a fresh results set 82.

An intrinsic element of this mechanism is that a state change, for example a change in the data source selected resulting in a change in data content, subsequently updates the subscribed portlets. In an embodiment this updating or cascading across all portlets happens as a result of a single input from an interaction device such as mouse 22, keyboard 24, or where the display screen 20 is a touch screen device, the display screen.

In FIG. 6 there is shown the cascade event of when a user selects a specific search result in the search results portlet 72, causing a change of selection event 80. The change of selection event 80, causes the data source portlet 74 to update, and the results hit portlet 76 to update likewise. The updating of the results hit portlet 76, will in turn result in a fresh results set 82, which in turn will cause the results hit location portlet 78 to update. Therefore, selection of a single constraint or phrase within the search results portlet 72, causes the immediate updating of the various other portlets 74, 76 and 78. The process of the updating of the various portlets is described in more detail with references to FIGS. 7 to 33.

To illustrate the cascade nature of the invention several examples of a change-of-state are presented, and their effect on the portlets of the user interface are shown. The following examples show:

1) Analysing the Non-Deterministic Results of a complex search query using cascading updates to synchronise portlets within the portal
 a) Select search constituent(s) within search results portlet
 b) Select data source(s) within data source portlet
 c) Select result hit(s) within result hits portlet
2) Determining the absolute relevance of a non-deterministic result through confirmation of result
3) Determining the absolute relevance of a non-deterministic result through rejection of result
4) Determining an absolute result in a data source that did not appear in the search results
5) Selecting a subset of the data for further analysis based on arbitrary combinations of previous operations, metadata, and non-deterministic search results.

These five steps allow a user to explore an audio data set in rapid and efficient manner. In particular, the ability to convert non-deterministic results (as returned by a phonetic search of the audio data) to deterministic results (through user interaction) provides the user with a greater understanding of the data, and allow for the analysis of large quantities of audio data through the combination of automatic searching (resulting in non-deterministic results) and user intervention/searching (resulting in deterministic results). In particular it allows for the searching and analysis of large quantities of analogue data, such as audio data, and allows the user to interact with results of the data where the non-deterministic searching has resulted in an uncertainty in the results. During analysis of a data set, a user may accept the results of the automatic non-deterministic search which have high or low values (i.e. a high or low likelihood that a search term is, or is not present in a data file) and interact with the remaining data, thereby reducing the analysis required. As shown below, the portlets allow for the identification of the probable location in a data source where a search term is present, and enables the user to interact with the data (e.g. by playing that segment of the file if it is an audio file) which further reduces the amount of data a user has to search.

Figure 7:
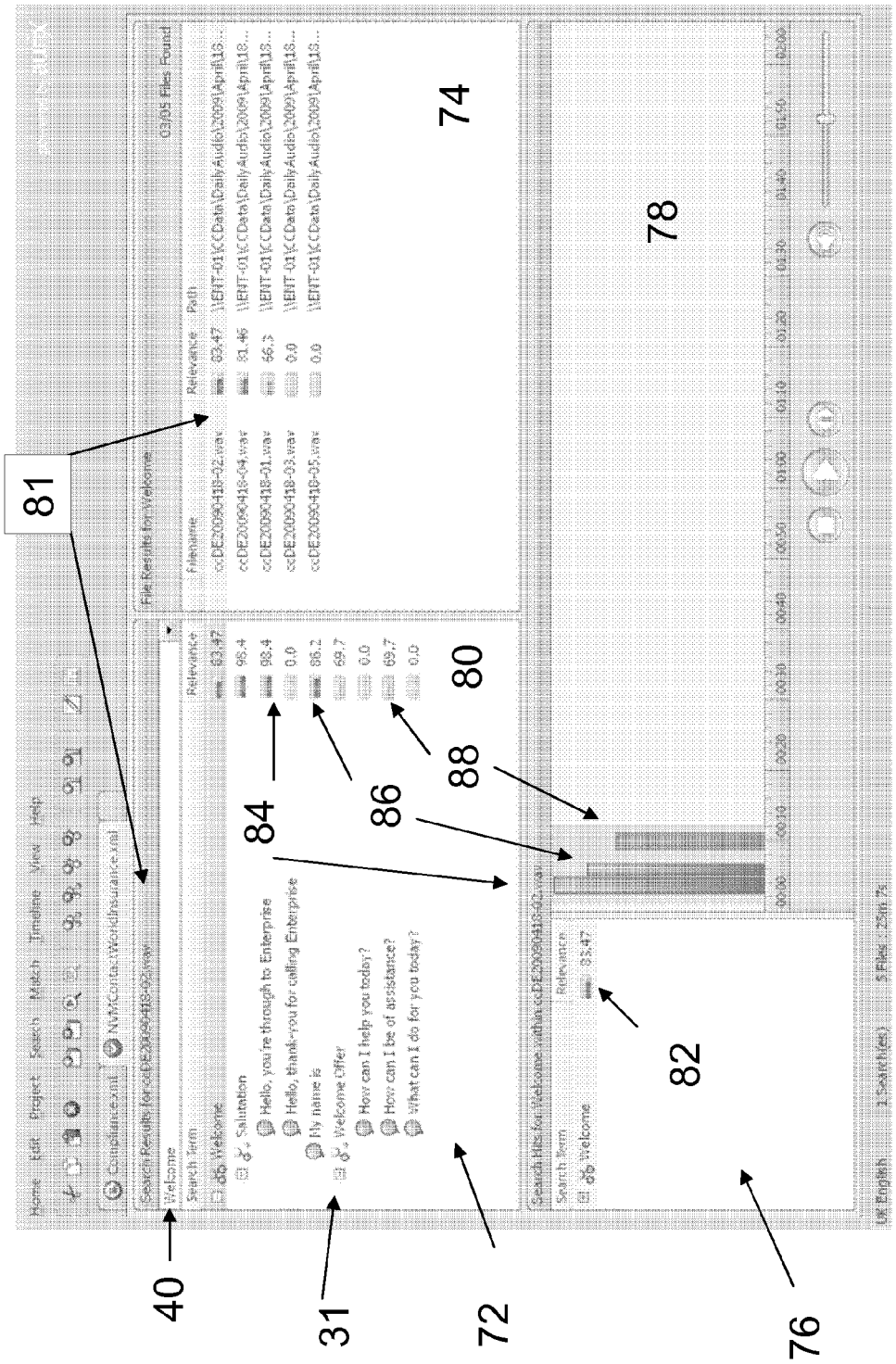
FIG. 7 is a screen shot of the user interface in its initial mode displaying the results of a complex search query.
Figure 8:
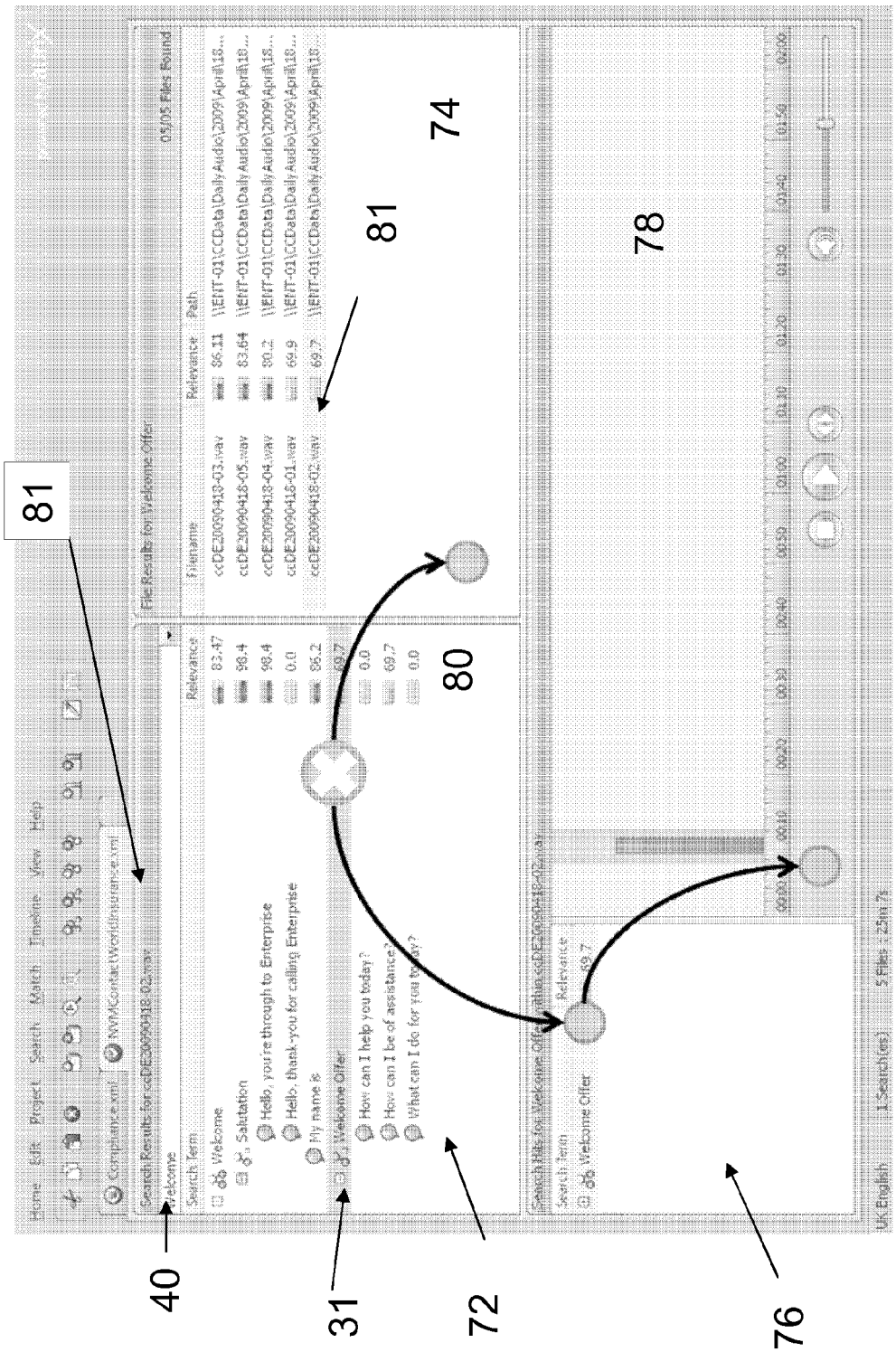
FIG. 8 is a screen shot of the user interface wherein the user has selected a search constraint of the complex search query within the search results portlet.

FIGS. 7, 8 and 9 show the process of analysing the non-deterministic results of a complex search query using cascading updates to synchronise portlets within the portal.

FIG. 7 shows an example of the user interface wherein the user has inputted a complex search query 40, in the search results portlet 72, and is presented with the some or all of the files as specified to the data source editor 64 (not shown), in the data source portlet 74, and is also presented with the results hits in the results hit portlet 76, and the location of the results hits are shown in the results hit location portlet 78. There is also shown the relevance score 80, the selected data source 81, the results hit portlet relevance score 82, relevance bars 84, 86 and 88 which relate to phrases "hello, you are through to Enterprise", "my name is", and "how can I be of assistance" respectively.

In FIG. 7 the complex search query has already been performed and results exist for the selected data source. Therefore, the Figure shows the interaction of the user with the query results analysis 70. Whilst this example and the following examples are shown with only a single data source having been selected for the purposes of clarity, it is to be understood that multiple data sources may be selected in further embodiments.

The user has inputted into the search query editor 62 a complex search query 40 "welcome" as described with reference to FIG. 4. The search results portlet 72 displays in an intuitive manner the structure of the complex search query "welcome", namely that it comprises the search constraint "salutation" 42, the search phrase "my name is" 54 and the search constraint "welcome offer" 31. The "welcome offer" 31 in this particular example is identical to the "help offer" 30 in FIG. 4. The search constraint "salutation" 42, further comprises the search phrases "hello, you are through to Enterprise" 44, and "hello, thank you for calling to Enterprise" 46. The search constraint "welcome offer" 31, comprises the search phrases "how can I help you today" 48, "how can I be of assistance" 50, and "what can I do for you today" 52. To the right of each of these terms in the search results portlet 72, there is shown the relevance score 80. The relevance score 80 describes the non-deterministic relevance score of the results of the complex search query 40 as applied to the data source(s) selected in the data source portlet 74. As can be seen, in the example shown in FIG. 7 the relevance score attributed to the complex search query "welcome" 40, is 83.47, the relevance score attributed to the search constraint "salutation" 42, is 98.4 and the relevance score attributed to the search constraint "welcome offer" 31, is 69.7.

In the preferred embodiment, the numerical scores are accompanied by partially filled bars providing a more immediate visual indication of the score, in which a fully filled bar represents a maximum score of 100.0 and an empty bar represents the minimum score assigned to a search constituent for which no match is found.

In the data source portlet 74, there is shown the ".wav" audio files that comprise the data sources selected from the database using the data source editor 64. The user has selected the file ending in 02.wav (i.e. the selected data source 81), and the search results for the complex search query 40 for this file are described in the search results portlet 72 along with their relevance scores 80. The relevance scores in the data source portlet 74 correspond to the relevance in that source for the search constituent selected in the search results portlet 72, in FIG. 7 the entire complex query "welcome" 40.

The results hit portlet 76, shows the relevance score 82 for the complex search query "welcome" 40. The results hit location portlet 78 shows the position in the audio file of the instances of the corresponding hits in the 02.wav file currently selected in the data source portlet 74. The height of the bars in the results hit location portlet 78 is indicative of the relevance score attributed to the search phrases within that query. There are shown three bars 84, 86 and 88 which relate to phrases "hello, you are through to Enterprise", "my name is", and "how can I be of assistance", respectively.

In the preferred embodiment the height of the bars in the results hit location portlet 78 is indicative of the relevance score 80. As can be seen, the phrase "hello, you are through to Enterprise" has a relevance score of 98.4 (84) and therefore the height of the bar in the results hit location portlet 78 is at almost at full height. Likewise, the relevancy score for "my name is" is 86.2, and accordingly the height of the bar as shown in the results hit location portlet 78 is lower than that of "hello, you are through to Enterprise" 84.

In the preferred embodiment, the bars indicative of the relevance score in the search results portlet 72, data source portlet 74, results hit portlet 76 and results hit location portlet 78 are additionally colour coded according to the relevancy of the hit with a highly relevant hit (score>70%) being displayed as green, a hit with relevancy of 40 to 70% being displayed as orange, a hit of less than 40% being displayed as red and no hit being left as empty. The user may choose to vary the precise choices of thresholds and colours.

The presentation of the data in such a manner aids the user's understanding of the data set. In particular, the invention provides a tool to allow the user to easily and in an intuitive manner: identify files which are very likely to contain, or not contain, a search constituent (i.e. those having a high or low relevancy); understand the contribution of search constituents to the overall search results; and further identify files which may need to be manually explored and to undertake that exploration.

FIG. 8 shows the effect of the user selecting a specific search constituent or constraint within the complex search query.

The user in FIG. 8 has specifically chosen to examine the "welcome offer" 31, search constraint of the complex search query welcome 40. The welcome offer 31 search constraint has a relevance score 80 of 69.7. As can be seen, the relevance scores in the data source portlet 74 have been updated to reflect the relevance scores specifically attributed to the search constraint welcome offer 31.

In particular the selected data file 81 (02.wav) previously in FIG. 7 had a relevance score of 83.47 and now has a relevance score of 69.7. Likewise the file 05.wav in FIG. 7 had a relevant score as displayed in the data source portlet 74 of 0.0, and now has a relevant score of 83.64. Therefore the change-of-state in the search results portlet 72, has resulted in the change in the data source portlet 74. If the user has chosen to order the data source portlet by relevance, then the ordering of sources will be updated accordingly.

Additionally, through the selection of a specific search constraint in the search results portlet 72, the results hit portlet 78 has likewise been updated with the complex search query reflecting the change from the complex search query "welcome" 40 to the search constraint of "welcome offer" 31. Similarly, the results hit location portlet 78 now only displays a single hit relevant to the search query. As can be seen, only the search phrase "how can I be of assistance" 50 remains relevant to this search constraint and thus is the only one displayed in FIG. 8.

Figure 9A:
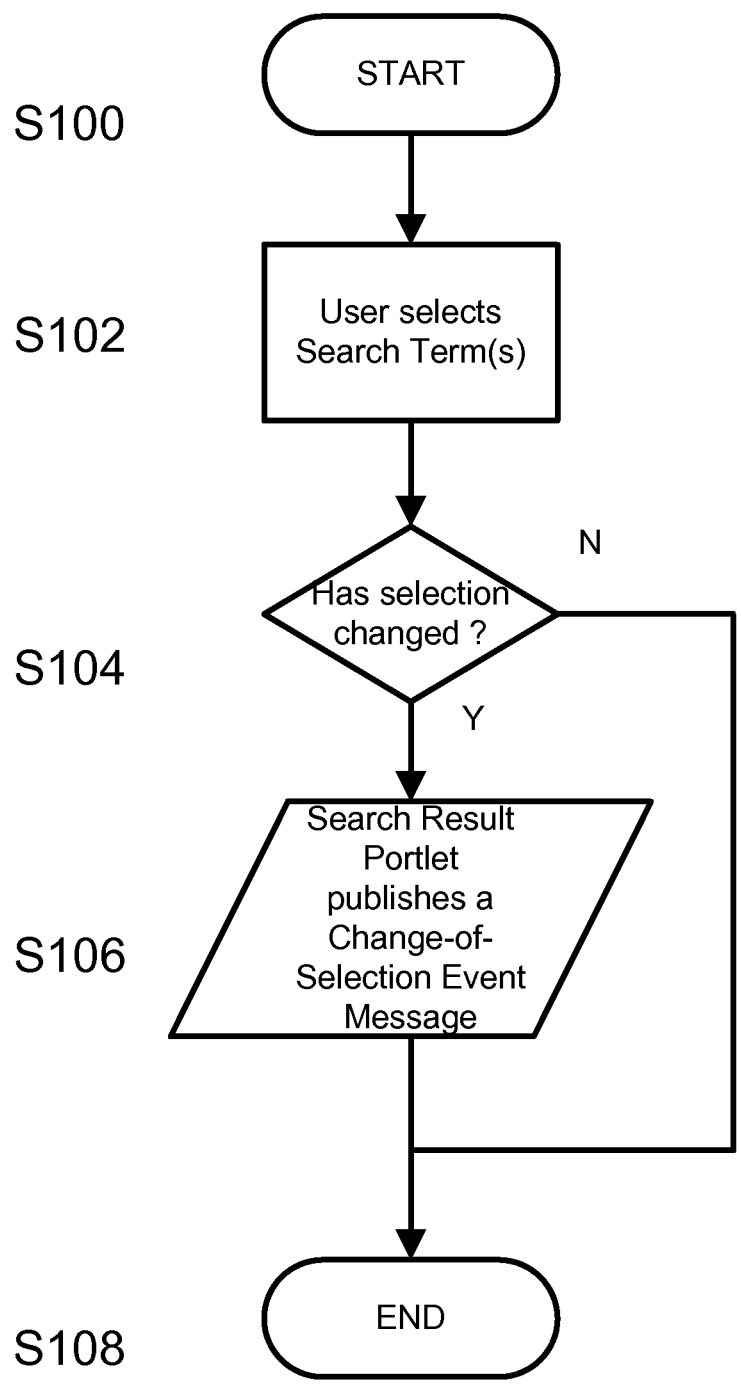
FIG. 9a shows a flow diagram of the process of a user selecting a search constituent in the search results portlet.

FIG. 9a shows the flow chart of the process of the user selecting a term in the user interface.

There is shown the starting of the process at step S100, the user selecting a term at step S102, verifying has the selection changed at step S104, the search results portlet publishing the change of selection event message at step S106, and the end of the process of step S108.

In FIG. 9a, a user has selected an initial search constituent as inputted in the search query editor 62 (not shown). Once a search constituent has been selected as step S102, the selection is checked to see if it is different from a previous selection at step S104. In the event that the selection is different a message indicating the change in state is published by the search result portlet 72 to the other portlets. In the event that the selection at step S104 has not changed the message at S106 is not published.

FIG. 9b shows the effect on the data source portlet after the selection of a new/different search constituent. There is shown the starting of the process S109, the data source portlet receiving a change of selection event message from the search result portlet at step S110, the data source portlet calculating the relevance scores for all data sources at step S112, the data source portlet updating the relevance scores in the user interface at step S114, verifying if the user has imposed a sort order at S116, the data source re-ordering the data sources according to their relevancy score at step S118, and at the end of the process at step S120.

If at step S106 as described with reference to FIG. 9a results in a change of selection event message being published, such a message is published to the data source portlet 74, at step S110. Upon receipt of the change of selection message the data source portlet updates the relevancy scores for all data sources at step S112. This is because the search constituent has now changed, and therefore the relevance scores will also change accordingly as to which terms are being searched for within the data set as defined at the data source portlet 74.

Relevance scores for a search constraint or the overall query are computed by combination of the relevance scores which are input to that search constraint/query. In the preferred embodiment the relevance score for an "ANY" constraint corresponds to the maximum of the input scores; and the relevance for an "AND" or "SEQUENCE" constraint corresponds to the geometric mean of the input scores. However the invention also applies equally to other forms of constraint and other methods of computing the relevance scores.

Once the relevance scores have been updated for the new search constituent at step S112 the scores are now published in the data source portlet 74 at step S114. The rows of the data source portlet 74 may be sorted according to the values in one or more of the columns visible in that portlet (e.g. high to low relevance). At step S116, the invention verifies if a user has inputted some form of preference for the sorting of the published results. If no order has been imposed the invention moves to step S120 and refreshes the display with the new relevance scores and the process terminates. If the user has imposed a sort order the invention moves to step S118 where the data source portlet 74 reorders the data sources as required before moving to step S120 and refreshing the entire display.

In the preferred embodiment, the invention sorts the position of the files within the data source portlet according to their relevance score as determined in step S112 for a particular search constituent or query. This step is apparent in FIGS. 7 and 8 where the selected data source 81 02.wav has moved from the top of the five files showing in the data source portlet 74 in FIG. 7 to the bottom of five files due to the reduction in relevancy from 83.47 to 69.7.

Figure 9C:
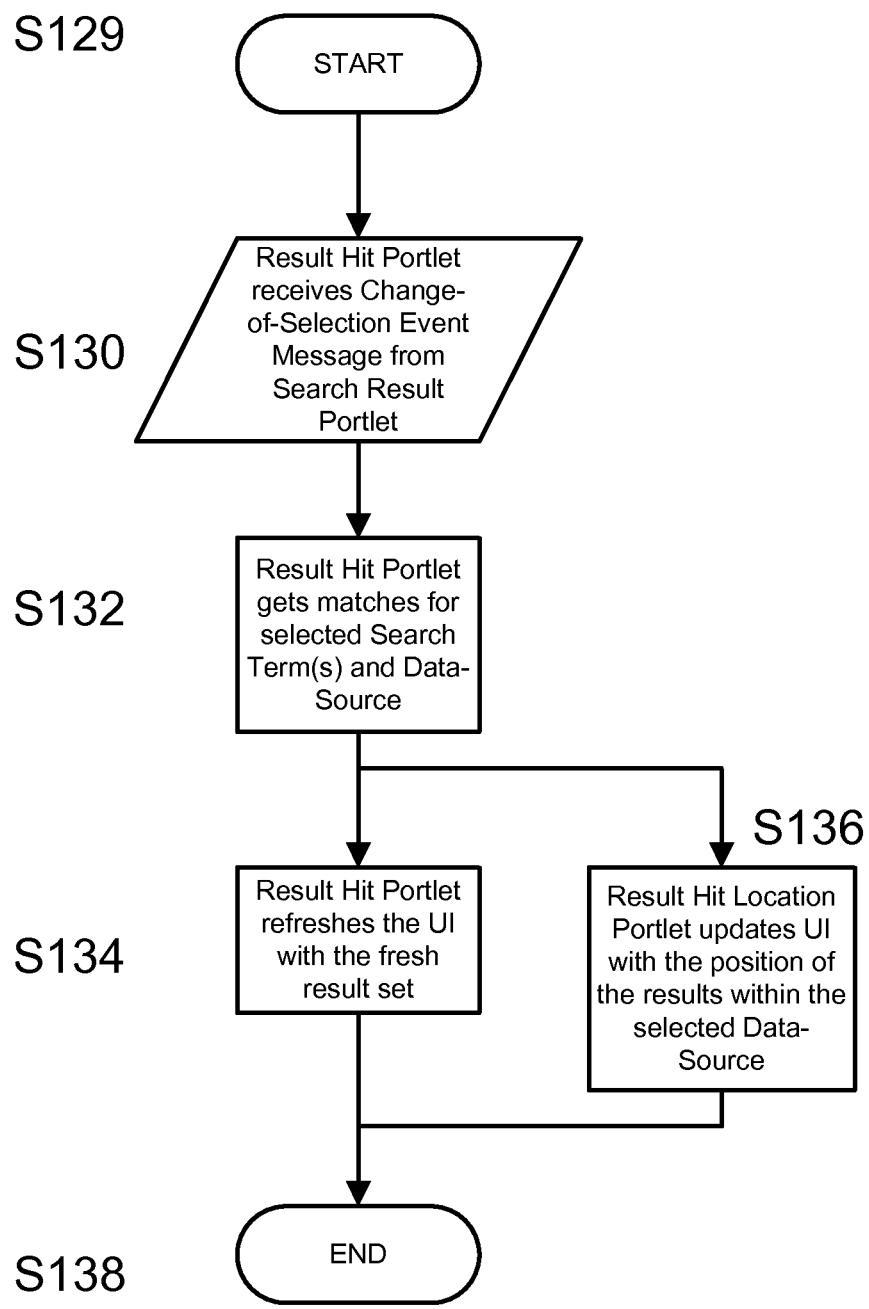
FIG. 9c shows the effect on the result hit portlet and result hit location portlet of a user selecting a search constituent.

In FIG. 9c there is shown, the start of the process at step S129, the results hit portlet receiving a change of selection event message from the search results portlet at step S130, the results hit portlet obtaining matches for the selected search terms and data sources at step S132, the results hit portlet 76 updating the user interface with the new results set at step S134, the results hit location portlet 78 updates the user interface with the positions of the results within the selected data source at step S136 and the end of the process at step S138.

Once the data source portlet has been updated, the results hit portlet 76 and the results hit location portlet 78 are also updated. The results hit portlet receives a change of selection event message from the search results portlet at step S130. The results hit portlet obtains the matches for the selected search terms and data sources at step S132. Once the matches for the selected search terms and data sources have been obtained at step S132, the results hit portlet 76 is updated on the user interface with the new results set at step S134. As a result of the change in the search terms, the positions of the matches within the data file will have changed. At step S136 the results hit location portlet 78 updates the user interface with the positions of the results within the selected data source. This is particularly relevant in FIGS. 7 and 8 wherein the hits 84 and 86 at present in the results hit location portlet 78 in FIG. 7 are no longer visible in FIG. 8 in the result hit location portlet as such matches no longer occur with the modified search query.

Figure 10:
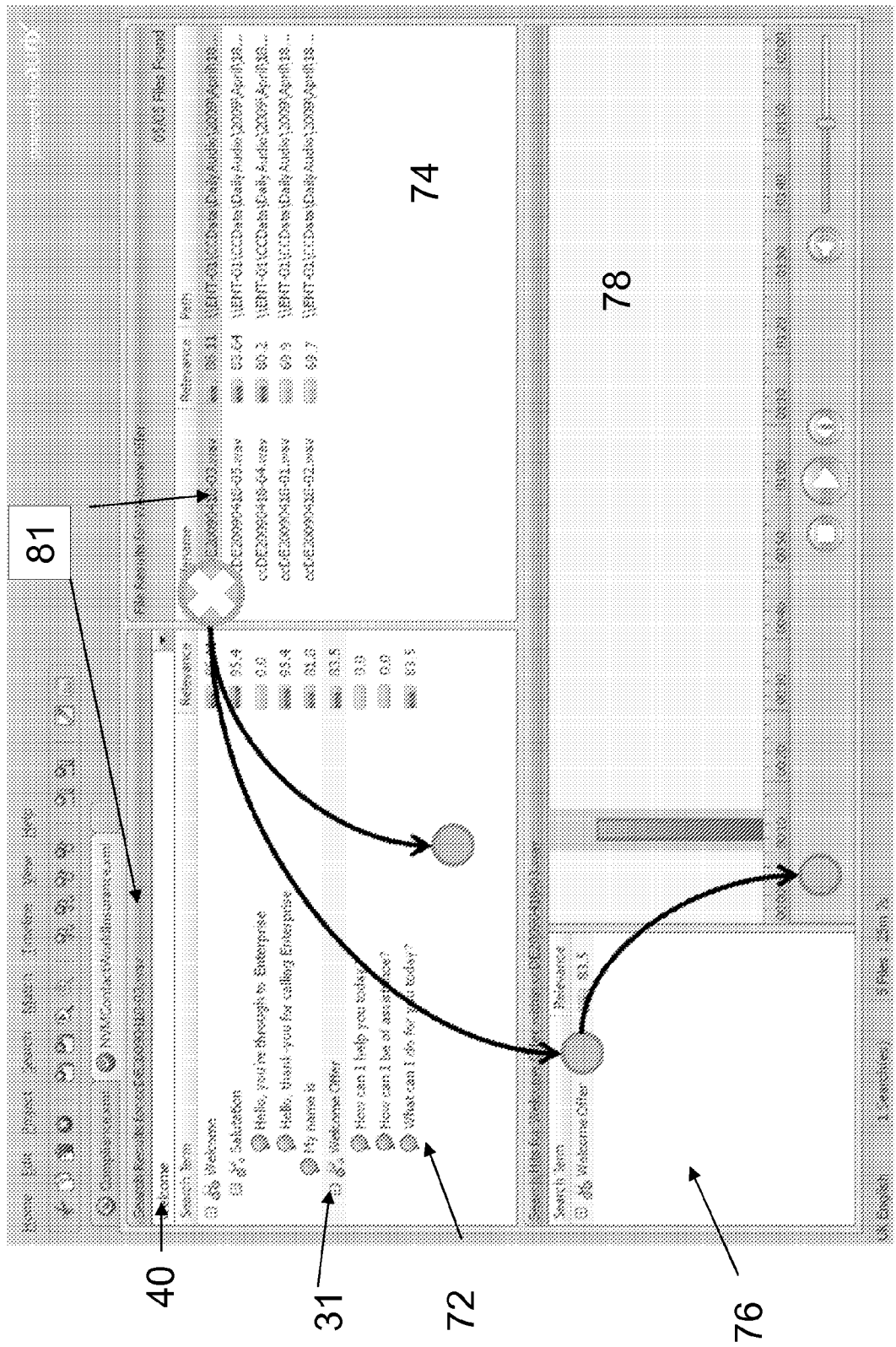
FIG. 10 is a screen shot of the user interface wherein the user has selected a data source in the data source portlet.

FIGS. 10 and 11 show the process of analysing the non-deterministic results of a complex search query using cascading updates to synchronise portlets within the portal.

FIG. 10 shows a screen shot of the user interface wherein the user has now selected file "03.wav" instead of file "02.wav" as the selected data source 81. As in FIG. 8 the user has kept the search constituent in the search results portlet 72 as the search constraint welcome offer 31. In FIG. 10 as can be seen by the relevancy scores 80 the file appears to contain the search phrase "what can I do for you today" 52, as the search phrases "how can I help you today" 48 and "how can I be of assistance" 50 show a relevance score of zero.

As the user has also updated the data source portlet 74 by selecting a different file, the results hit portlet 76 has also been updated. As can be seen by comparing results hit portlet 76 of FIGS. 8 and 10, the relevancy score of the welcome offer has increased from 69.7 (in FIG. 8) to 83.5 (in FIG. 10). This reflects the change in the data source as selected in the data source portlet 74. Likewise as indicated in FIG. 6 the change in the results portlet 76 has resulted in a fresh results set 82 and accordingly has resulted in a change in the results hit location portlet 78. The position of the results hit within the file as shown in the results hit location portlet 78 has changed as well as the relevance score in the results hit portlet 82.

Figure 11A:
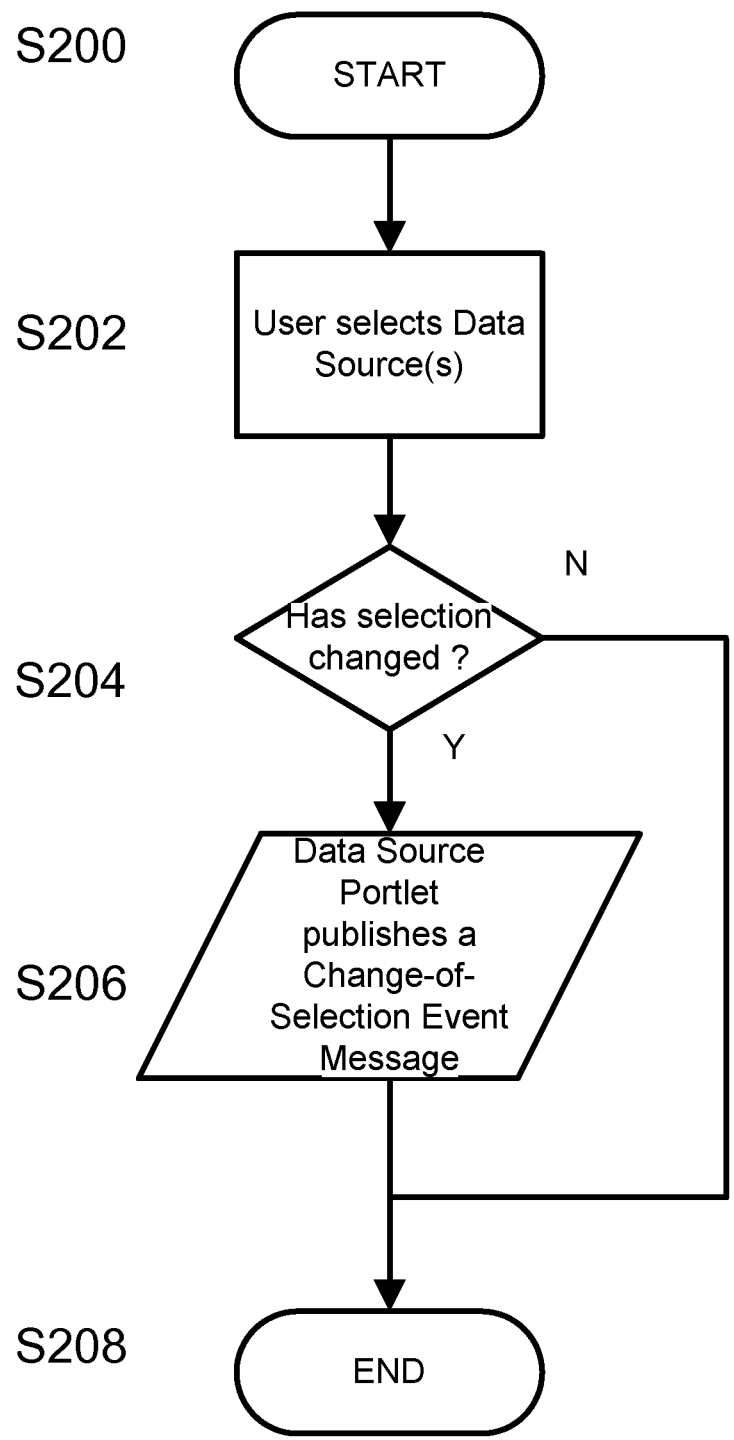
FIG. 11a is a flow diagram representing the process of the user selecting a specific data source in the data source portlet.

FIG. 11a shows the flow chart of the process of the user having selected a different data source. There is shown, the start of the process at step S200, the user selecting a different data source at step S202, verifying if the selection has changed at step S204, the data source portlet publishing a change of selection event message at step S206 and the end of the process at step S208.

Figure 11B:
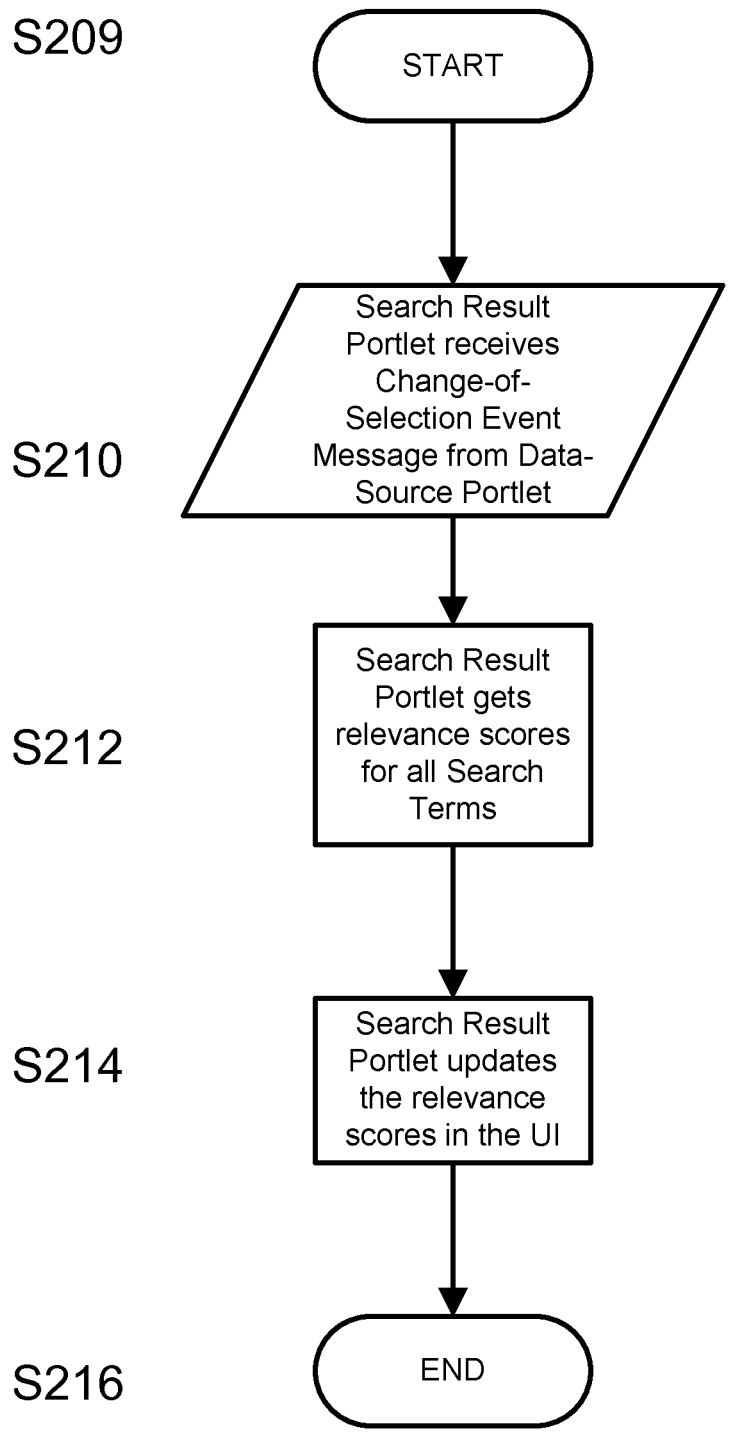
FIG. 11b is a flow diagram of the effect on the search results portlet of the user selecting a specific data source.

FIG. 11b shows the effect of the user having selected a different data source. There is shown, the start of the process at step S209, the search result portlet 72 receiving a change of selection event message from the data source portlet at step S210, the search result portlet obtaining the relevance score for the search terms at step S212, the search result portlet updating the relevancy scores in the user interface at step S214, and the end of the process at step S216.

As the user has selected a different data source at step S202, the relevance score 80 in the search results portlet 72 the results hit portlet 76 and the location of the hit as shown in the results hit location portlet 78 will be updated. In FIG. 11b there is shown the updating of the search result portlet 72 which has received a change of selection event message from the data source portlet 74 at step 210 thereby informing it that new relevancy scores 80 are required. The search portlet obtains the relevancy scores for all the search constituents in the complex search query 40 at step S212.

At step S214 once the updated relevance scores have been obtained at step S212 these are updated in the user interface at step S214.

FIG. 11c shows the effect on the results hit location portlet, as a result of the user selecting a new data source at step S202.

There is shown, the start of the process at step S219, the results hit portlet 76 receiving a change of selection message from the data source portlet 74 at step S220, the results hit portlet 76 obtaining matches for the selected search constituents and data source at step S222, the results hit portlet 76 being updated with the fresh results set at step S224, the results hit location portlet 76 updating the user interface with the position of the results within the selected data source at step S226 and the end of the process at step S228.

Due to the change in the data source at step S202, the results as shown in the results hit portlet 76 and the results hit location portlet 78 are now no longer relevant. Therefore they need to be updated, with the relevance scores for the newly selected data source 81 in the data source portlet 74. Such updating occurs at step S222, where the results hit portlet 76 obtains the matches for the individual search constraints or search phrases of the complex search query 40—whichever is selected in the search results portlet 72. Once obtained the results hit portlet 76 is updated with the new information. This is apparent in the difference in the results hit portlet of FIGS. 8 and 10 where it can be seen that the relevancy score reflecting the non-deterministic nature of the results is different for the same search constituent namely "welcome offer" namely 83.5 in FIG. 10 as opposed to 69.7 in FIG. 8.

Figure 12:
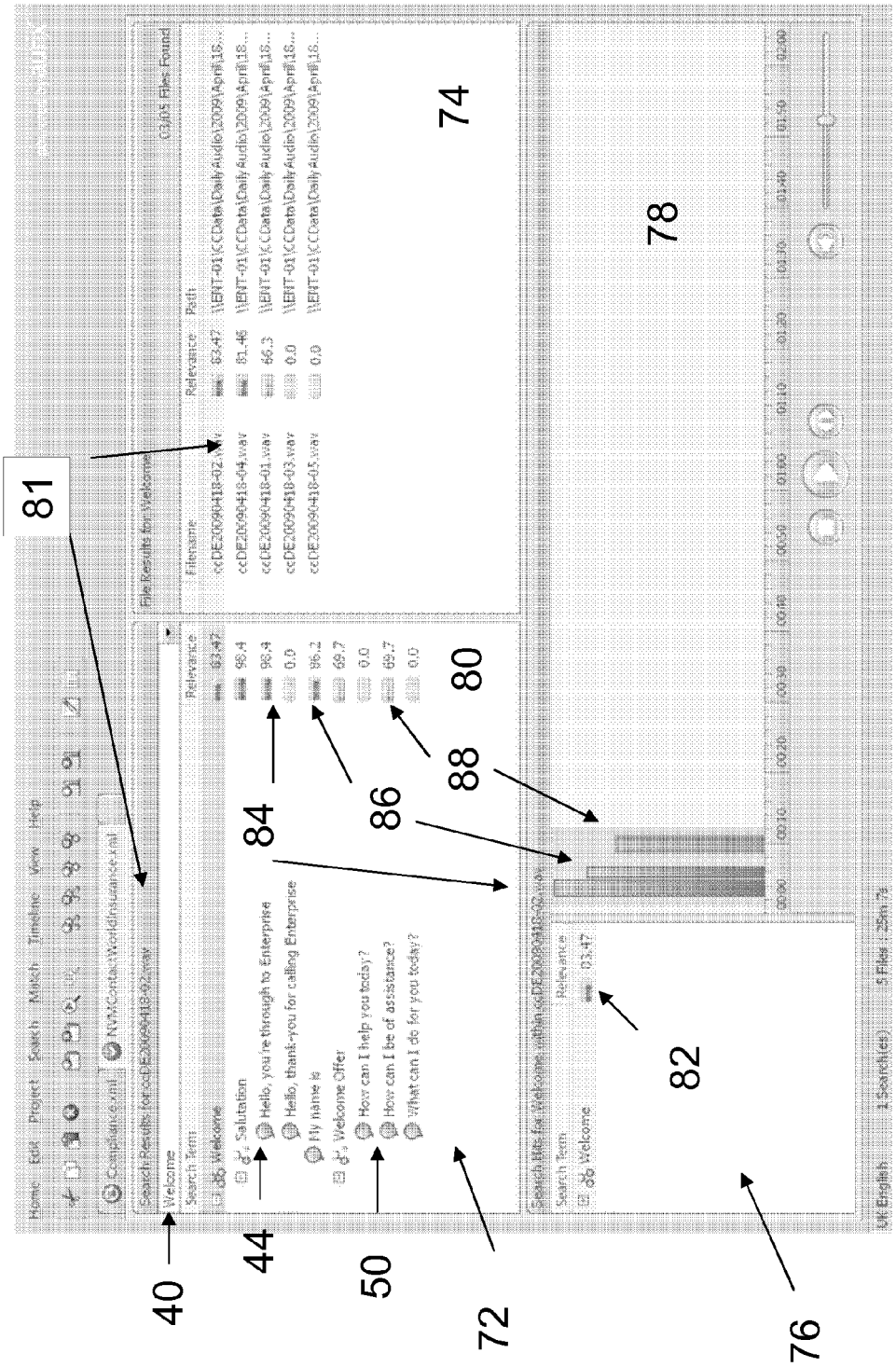
FIG. 12 is a screen shot of the user interface wherein the user has imputed a complex search query, selected a source and is presented with the location of the results within the specified source.
Figure 13:
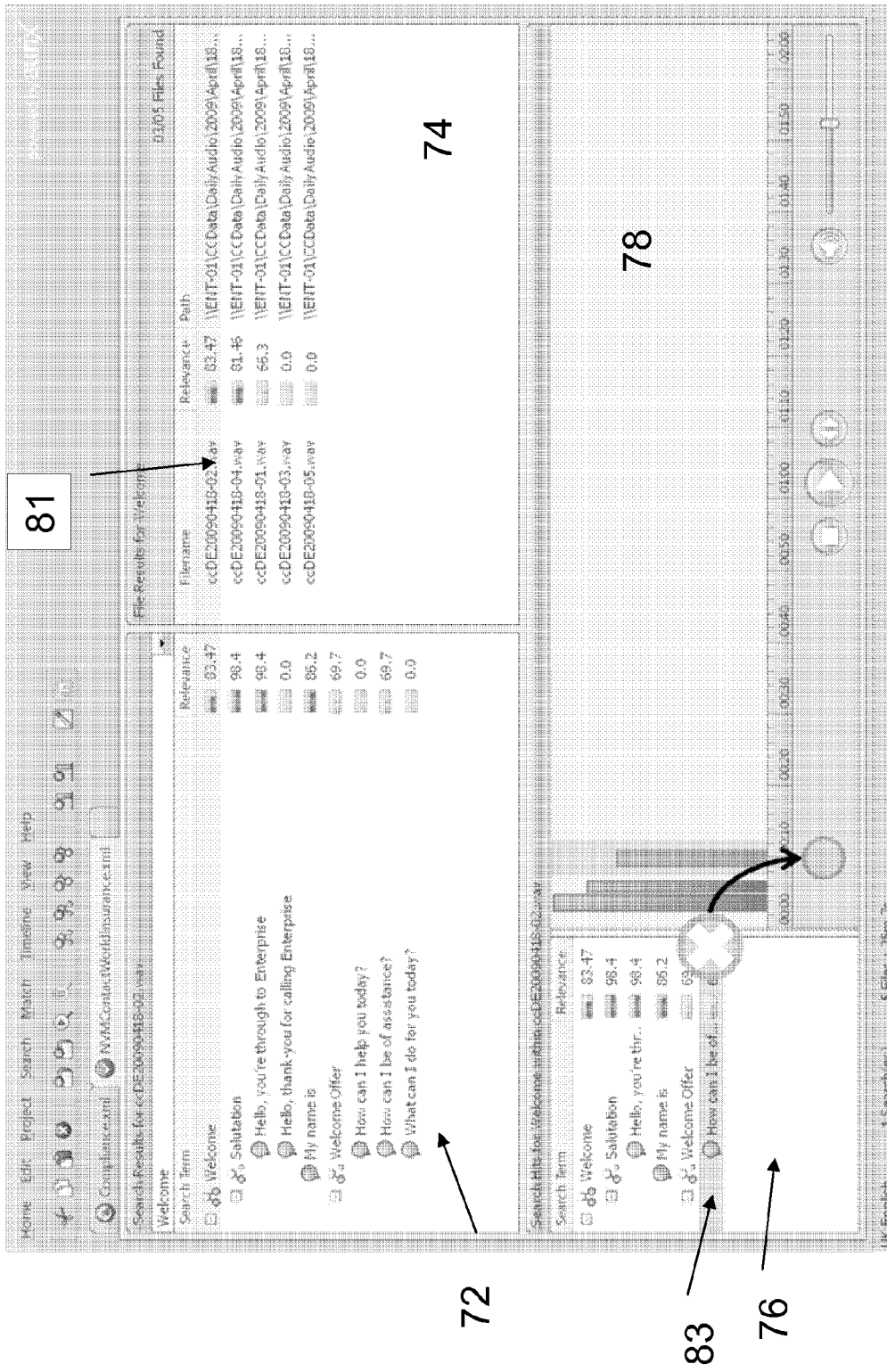
FIG. 13 is a screen shot of the user interface wherein the user has expanded the view of the hierarchy of hits within the results hit portlet.
Figure 14:
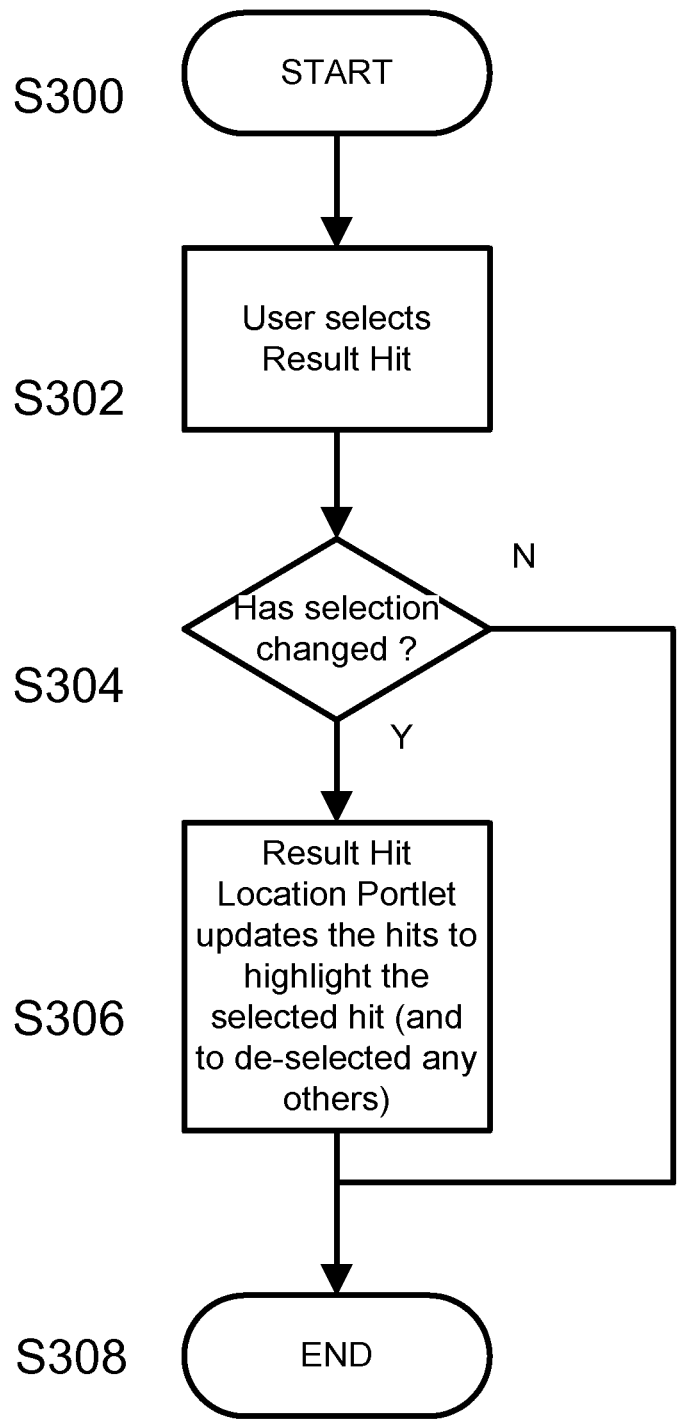
FIG. 14 is a flow diagram of the process wherein the user has selected a results hit from the results hit location portlet.

FIGS. 12, 13 and 14 show the process of analysing the non-deterministic results of a complex search query using a single user action, e.g. a One-Click-Cascade, to synchronise portlets within the portal.

FIG. 12 shows the user interface where the user has selected the file "02.wav" as the selected data source 81. As a result, hits are shown for all search constituents for the selected data source in the relevance column 80. Additionally the user has selected the general complex search query welcome 40. That is to say, they have not refined the search query in this image.

As can be seen in the results hit location portlet 78 there are three matches to the search query as shown in the search results portlet 72 namely the search phrases "hello, you are through to Enterprise" 44, "my name is" 54, and "how can I be of assistance" 50, are all present (respectively 84, 86, 88) in the selected data file 81.

FIG. 13 shows the user interface of FIG. 12 wherein the user has expanded the hierarchy of hits within the results hit portlet 76. In particular, the user has selected a particular search phrase of interest 83 within the results hit portlet namely "how can I be of assistance". The selection of the phrase of interest 83 has resulted in a change of state in the results hit portlet 76 and has also resulted in a change in the results hit location portlet 78. Namely, whereas in FIG. 12 all three instances of a search phrase are highlighted in the results hit location portlet 78, only the selected phrase that is to say "how can I be of assistance" 50, has been selected in the results hit location portlet 78. Thereby causing the results hit location portlet 78 to only highlight the selected hit and removing the highlights from the unselected hits, that is to say "hello, you are through to Enterprise" 44 and "my name is" 54.

Note also that the expanded view in the result hits portlet 76 comprises only those parts of the overall query for which hits have been found. Therefore, although the search phrase "what can I do for you today" is forms part of the search constraint "Welcome Offer" 31, no hits were found for that particular search phrase, and accordingly it does not appear in the result hits portlet 76.

FIG. 14 shows a flow chart of the process of a user selecting a results hit in the results hit portlet 76. There is shown the start of the process at step S300, step of the user selecting a results hit at step S302, verifying if the selection has changed at step S304, the results hit location portlet 78 being updated to highlight the selected hit and deselect any of the other hits at step S306 and the end of the process at step S308.

As is in common with other changes of state, the selection of a result from the results hit portlet 76 results in a further change in a second portlet namely the results hit location portlet 78. At step S302, the user has selected a specific results hit in the results hit portlet 76. By selecting one or more specific hits this will result in other hits being of no longer of interest to the user and therefore the results hit location portlet 78 is updated with the hits that are of interest. The hits which have been selected in the results hit portlet 76 are highlighted and those which are no longer of interest have had their highlights removed.

FIGS. 15 to 20 shows the process of determining the absolute relevance of a non-deterministic result through confirmation of a result within the portal.

Figure 15:
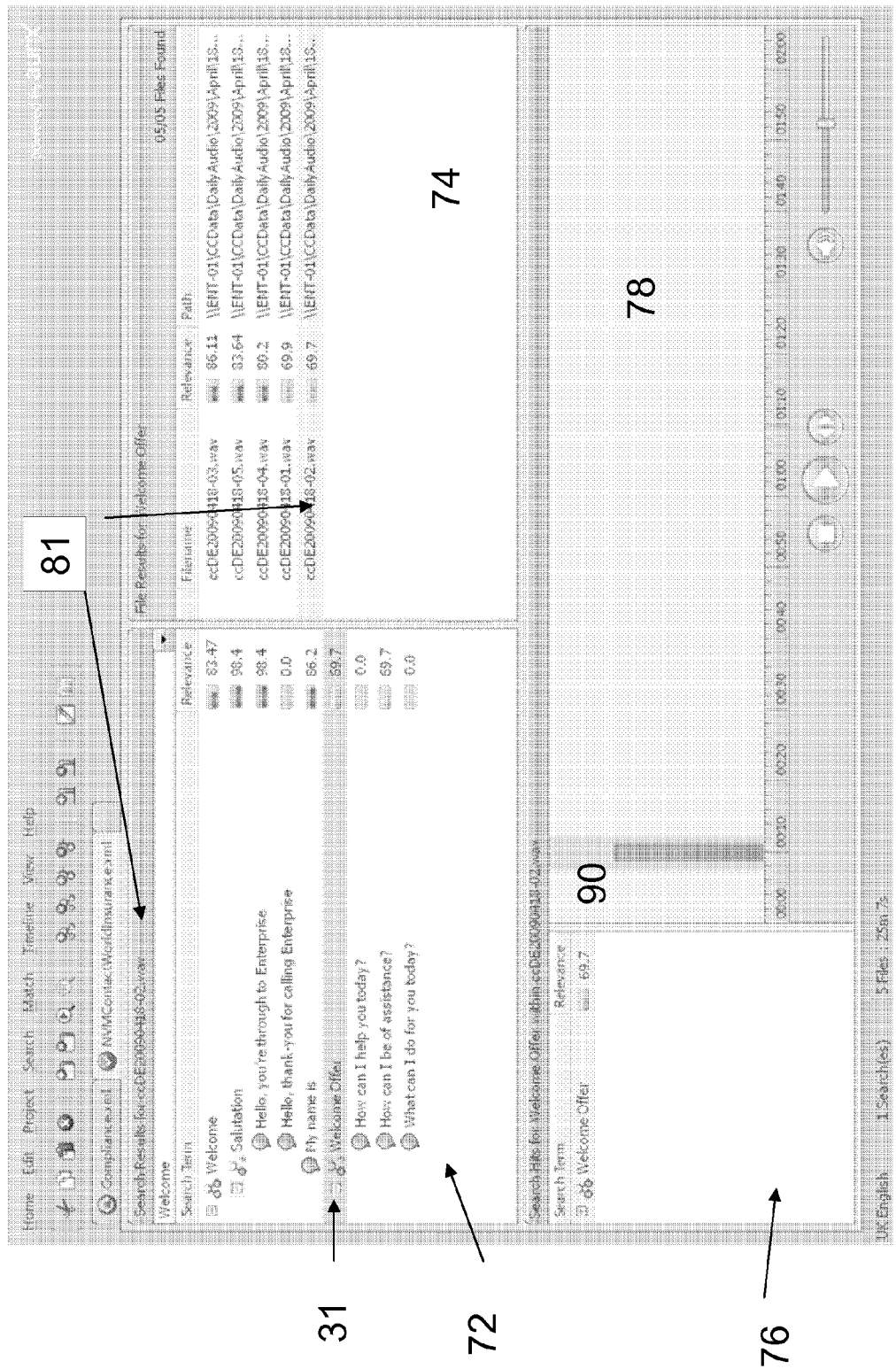
FIG. 15 is a screen shot of the user interface wherein the user has selected a search constraint within the complex search query.

FIG. 15 is a screen shot of the user interface wherein the steps of the flow chart of FIGS. 9a, 9b and 9c have been completed and the results hit location portlet 78 only shows a single hit 90 from the selected data source 81, namely from the search constraint welcome offer 30, "how can I be of assistance" 50. A similar effect may be obtained by selecting a single search term within the results hit portlet, as shown in FIGS. 13 and 14.

Figure 16:
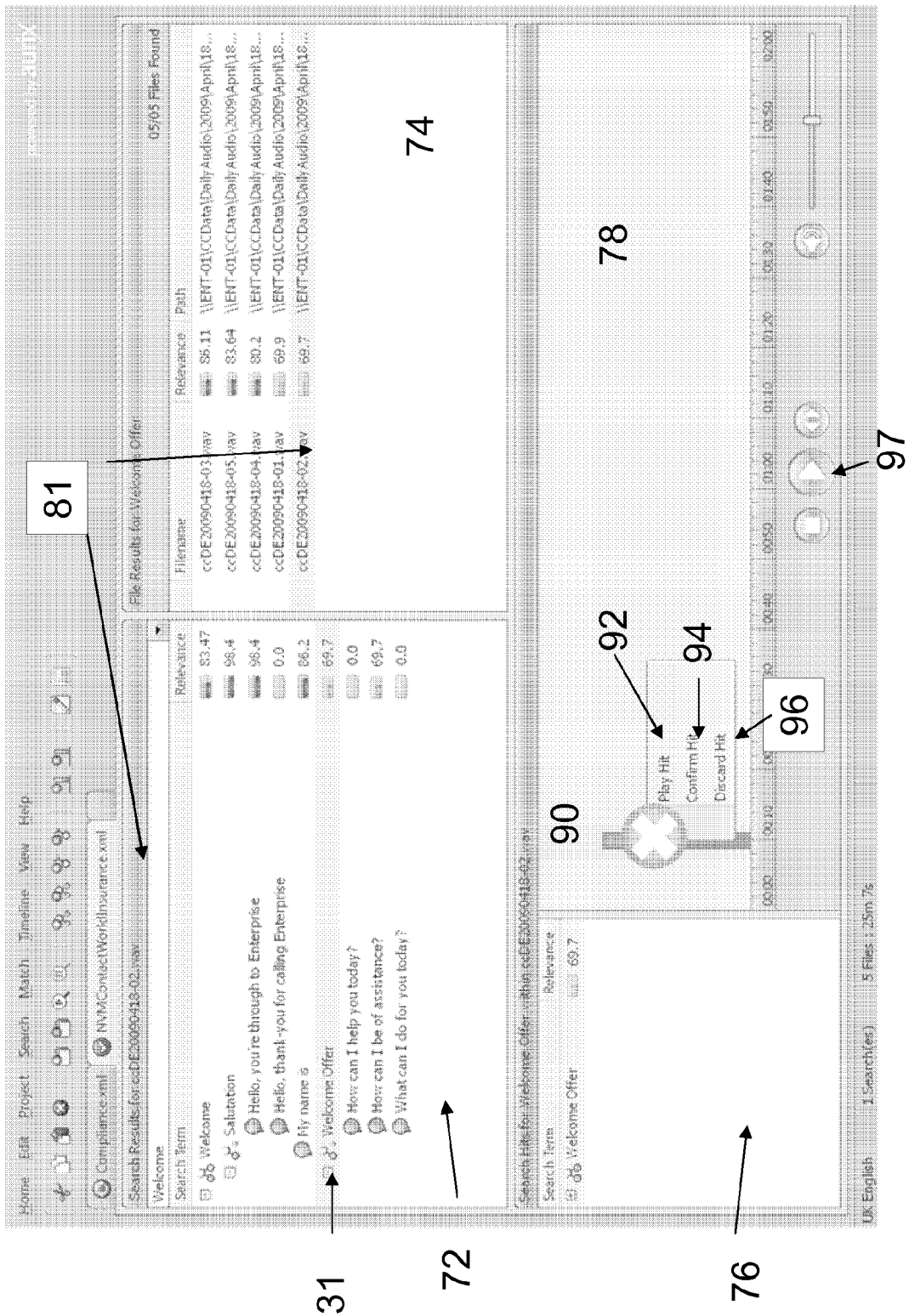
FIG. 16 is a screen shot of the user interface wherein the user has selected a hit and is examining the match to determine its relevance via human analysis.

FIG. 16 shows the user interface wherein the user has selected the hit from the results hit location portlet 78, and is examining that element in detail. There is shown, the results hit location portlet 78 the results hit which is being examined 90 and the menu selection choices of play hit 92 confirm hit 94 discard hit 96.

In the current embodiment, the results hit location portlet 78 is a media player 97. The media player, may be any form of known media such as RealPlayer®, QuickTime®, etc. The user at this stage has selected data source 81 from the data source portlet 74 namely "02.wav", they have also selected their search constraint 30 or 42 or their search phrase 44 to 54 from the complex search query 40.

In FIG. 16, the user has selected the search constraint welcome offer 31. As can be seen from the results hit portlet 76, the relevance score 82 for the search constraint welcome offer is 69.7. In the results hit location portlet 78 the user is able to inspect the individual element concerned by selecting one of the three menu choices play hit 92, confirm hit 94, discard hit 96. Selection of any one of these three menu choices will result in the execution of the choice through known methods e.g. play hit 92 will result in the audio element being played through known media playing elements 97. This allows the user to play that particular element of the selected data source 81 and therefore verify for themselves if that element does indeed contain the search phrase "how can I be of assistance".

In further embodiments, the inspection of the element is varied according to file type. For example, if the data source is a .pdf file the inspection would be a visual inspection, a video file such as a .flv would be inspected by an appropriate player.

Figure 17:
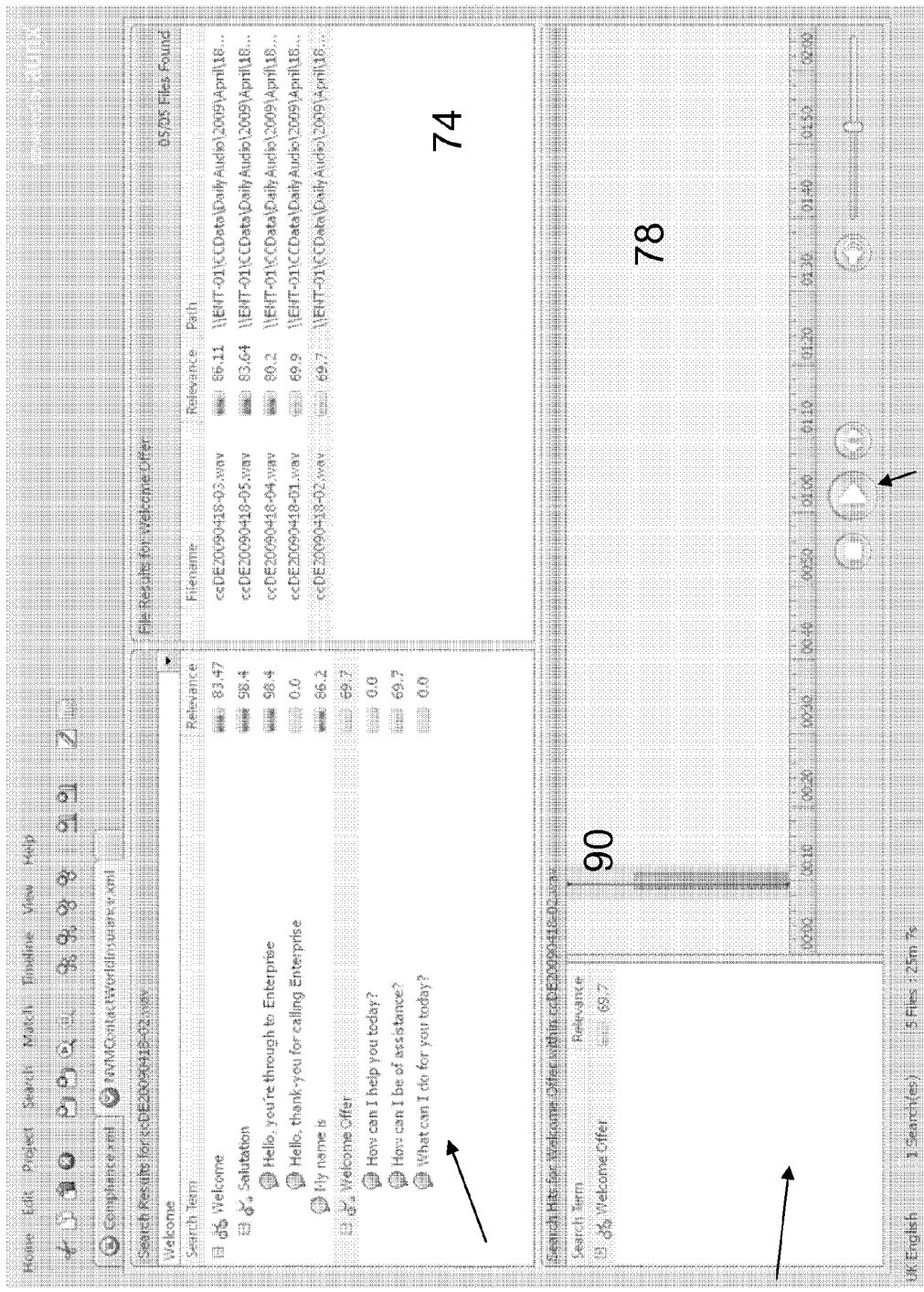
FIG. 17 is a screen shot of the user interface wherein the system is carrying out the inspection instruction in this case, and the audio source is played within a media player.

FIG. 17 shows the system carrying out the examination/inspection instruction, of FIG. 16. In this example as the data source is an audio file as shown in the data source portlet 74 the file being 02.wav, the selected data source 81 is played within the media player 97. In particular only the relevant part of the file is played by the user, thereby avoiding the need to listen to extraneous audio data. This allows the user to quickly and efficiently determine the relevancy of the hit. In a preferred embodiment a cursor synchronised with the audio playback is shown as a vertical black line within the selection region 90.

As the relevancy scores 80 as shown in the search results portlet 72 are non-deterministic, the user will want to verify in some or all cases whether the relevancy score is indeed correct. In this embodiment, as the data source is an audio file, the user simply has to listen to the relevant audio of the data source in the results hit location portlet 78. This will allow the user to determine how well the systems scored relevance compares to the user assessment of relevance, in particular this is found to be beneficial when testing audio transcribing systems such as the Aurix audio miner.

Figure 18:
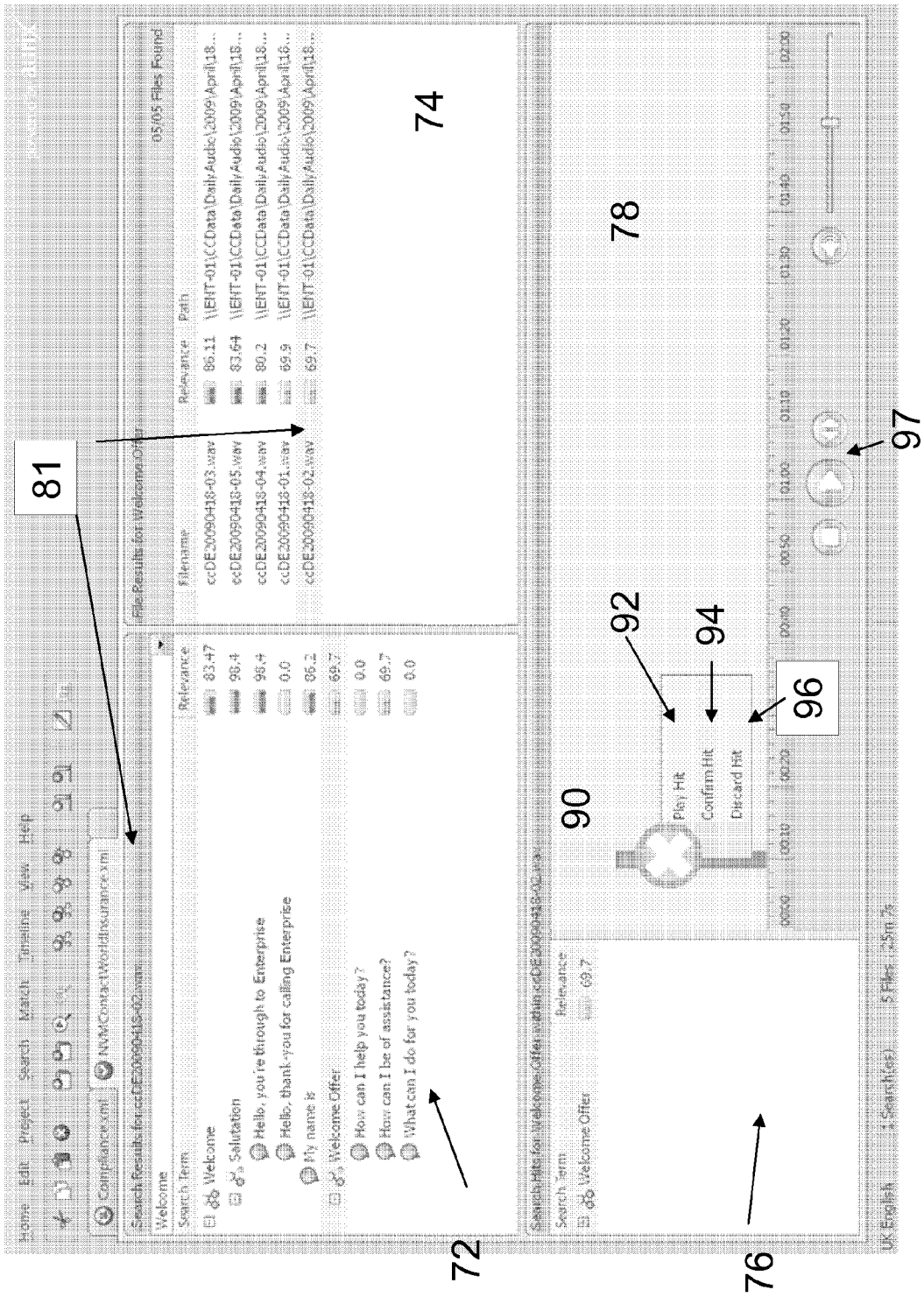
FIG. 18 is a screen shot of the user interface wherein the user confirms the nature of the hit.

FIG. 18 shows the user having inspected the element making a decision as to the validity of the element itself. In the example shown in FIGS. 16 and 18 the element is an audio element and therefore has been played through the media player. In this example the element that has played is said to be relevant to the search phrase "how can I be of assistance" 50, with a relevance score of 69.7. The user in this example has analysed the content of the audio file at the relevant location as displayed in the results hit location portlet 78. In the example shown in FIG. 18, the user has determined that the selected hit is indeed relevant i.e. the section of audio does in fact contain the words "how can I be of assistance". This confirmation can be taken as a confirmation of a non-deterministic result being an absolute result as a result of the human analysis input. In order to confirm the validity of the non-deterministic result the user has selected from the drop down menu confirm hit 94, thereby confirming that the non-deterministic result is indeed correct and making it an absolute result.

In a preferred embodiment the confirmation of the non-deterministic result additionally allows the selected data source 81 to be updated or tagged to reflect the deterministic result. In the preferred embodiment, metadata is updated for the selected data source 81, either as a header within the file or a database entry associated with the file, said metadata confirming that the hit is present in the data source. Therefore the core data of the data source e.g. the audio data, would be associated with metadata deterministically describing the whole or part of the content. Other methods of labelling the data may also be used.

Figure 19:
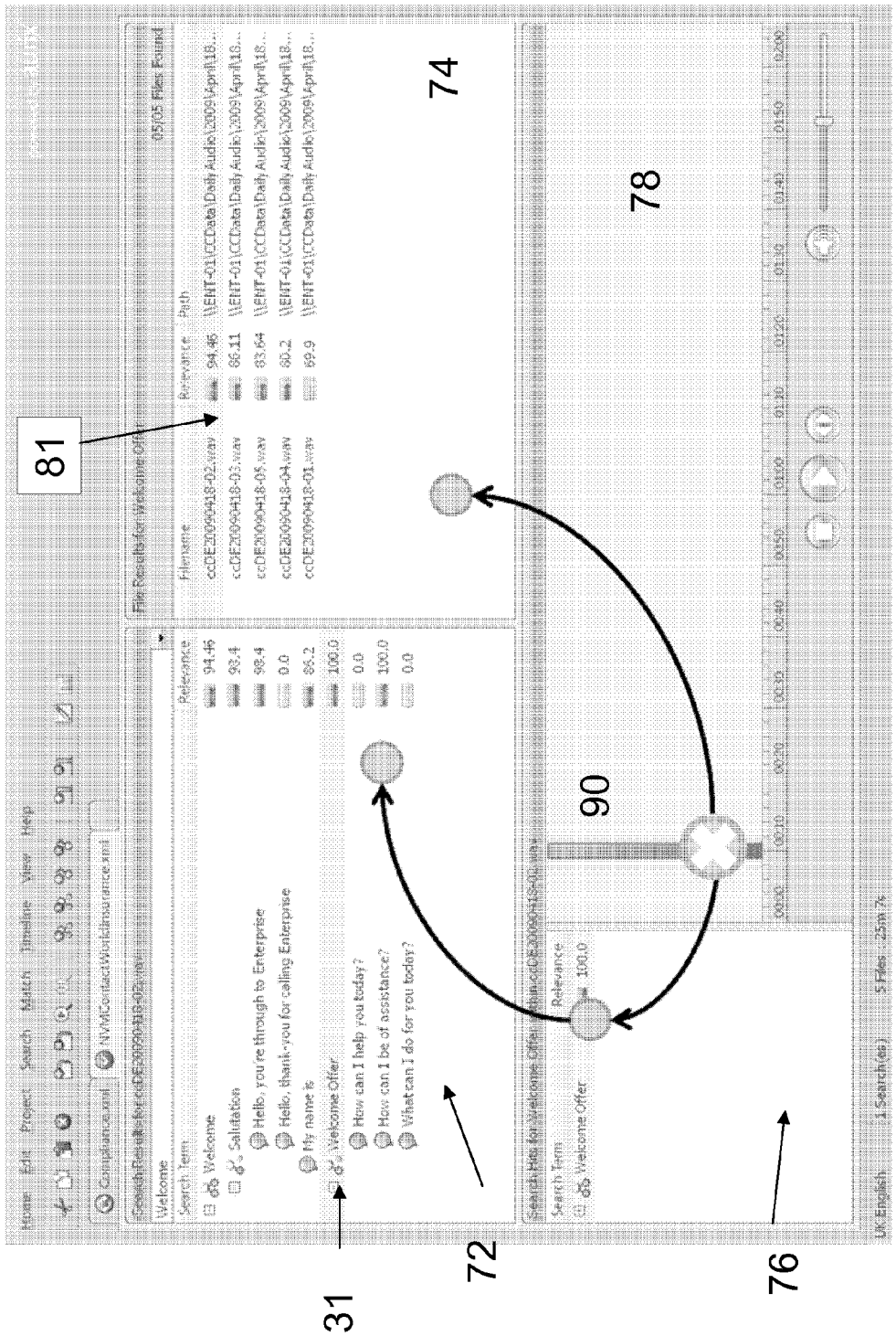
FIG. 19 is a screen shot of the user interface wherein as a result of the user confirming the hit the system has updated the search result portlet, the results portlet and the results hit location portlet.

FIG. 19 shows the changes in the user interface as a result of the user confirming the search hit of FIG. 18. As a result of the search hit being confirmed, the system has updated the hit with the highest score, that is 100. Thereby the system has reflected the notion that the user considers the hit to be wholly relevant to the search query. The updating of the relevancy score to 100 results in changes in the results hit portlet 76 the search results portlet 72 and the data source portlet 74. Accordingly the height of the bar in the results hit location portlet 78 has increased and the colour changed.

The results hit portlet 76 is updated to show the new score for the selected hit. The search phrase is nested within the search constraints and the scores are updated as the effect of the absolute relevancy passes up the complex search query structure 40. As can be seen by comparing the search results portlet 72 from FIGS. 18 and 19 the search constraint welcome offer 31 in FIG. 19 has now been assigned a relevance score 80 of 100, as opposed to the previously unconfirmed relevance score of 69.7 as shown in FIG. 18. Likewise the relevance score in FIG. 19 for the complex search query welcome 40, is now 94.46 whereas in the unconfirmed instance as shown in FIG. 18 the complex search query welcome 40 had a relevance score of 83.47. Likewise, the data source portlet 74 has also been updated to reflect a change and the confirmation of the relevance score in FIG. 19, previously "02.wav", the selected data source 81, had a total relevance as shown in the data source portlet 74 of 69.7. Upon confirmation of the hit, the relevancy score as shown in the data source portlet 74 has now increased to 94.46 thereby reflecting the increase in confidence given to the non-deterministic search.

Figure 20:
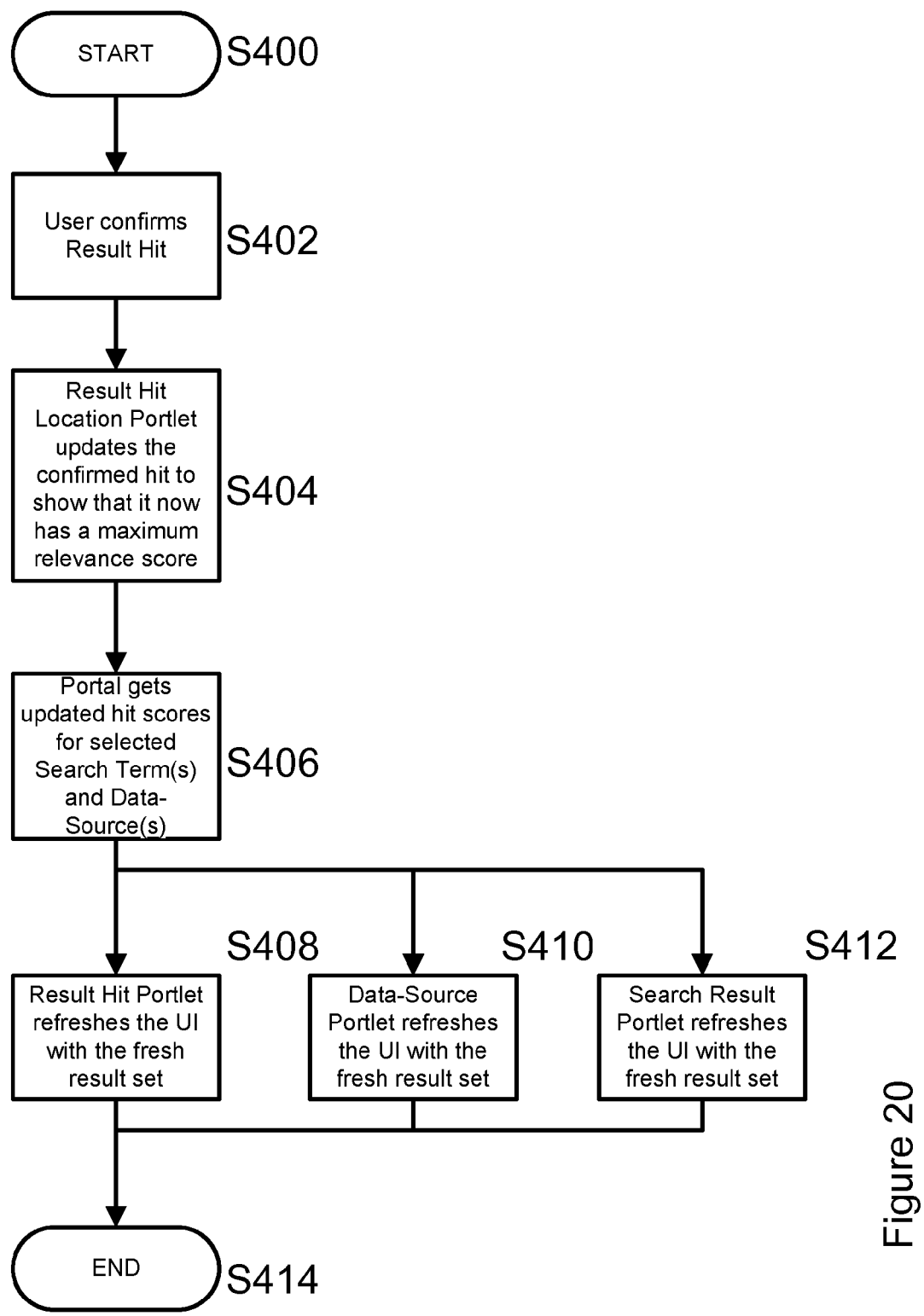
FIG. 20 is a flow chart of the process of a user confirming a result hit and the updating the portlets as a result of the confirmed hit.

FIG. 20 shows the flow chart of the process of updating the results hit portlet search results portlet and data source portlet as a result of the confirmation of a hit by the user.

There is shown, the start of the process at step S400, the user confirming a results hit at step S402, the result hit location portlet updating the confirmed hit to show that it now has a maximum of relevancy score at step S404, the portal obtaining the updated hit scores for the selected search constituents and data sources at step S406, the results hit portlet refreshing the user interface with the fresh results set at step S408, the data source portlet refreshing the user interface with the fresh results set at step S410, the search results portlet refreshing the user interface with the fresh results set at step S412, and the end of the process at step S414.

As shown in the previous flow charts, the change of state in the results hit location portlet 78 has a cascading effect on the state of the remaining three portlets. In this instance the confirmation of the hit from non-deterministic hit to an absolute hit has resulted in an increased confidence in the search constituent and this is reflected accordingly across all portlets. At step S402, the user has confirmed the results hit as discussed with reference to FIG. 18. The result hits portlet 76 has now been updated to reflect the increase in the relevance score of the results hit as confirmed by the user. Likewise, the search results portlet 72 and the data source portlet 74 also have to be updated to reflect the increased relevancy of the searches as determined by the user intervention. At step S406, the portal obtains the updated hits scores for the selected search constituents and data sources i.e. that is to update the search results portlet 72 and data source portlet 74 respectively. At steps S408, S410 and S412 the various portlets of the user interface are updated.

Figure 21:
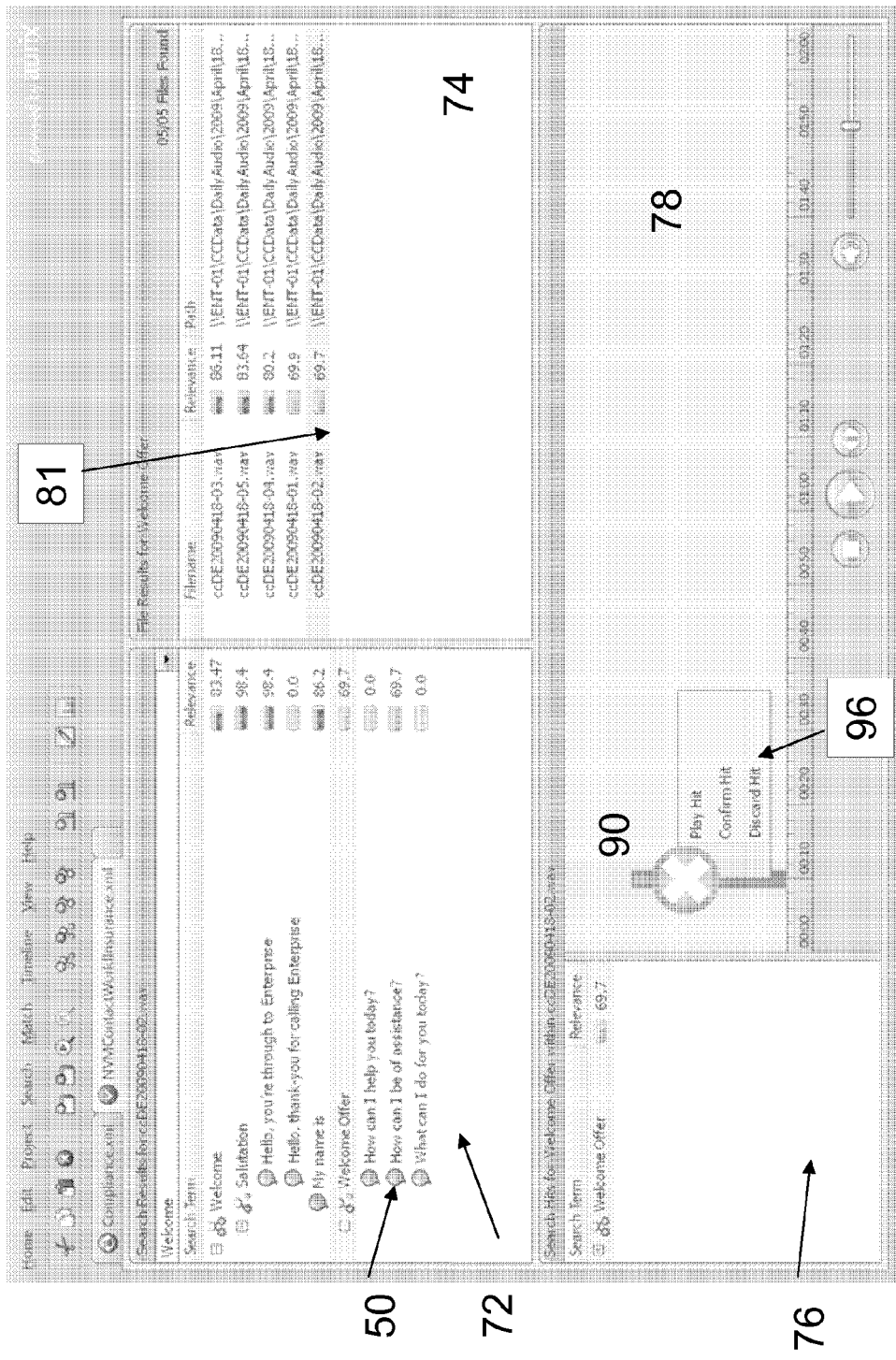
FIG. 21 is a screen shot of the user interface wherein the hit is found to be irrelevant and the user is disregarding the search hit.
Figure 22:
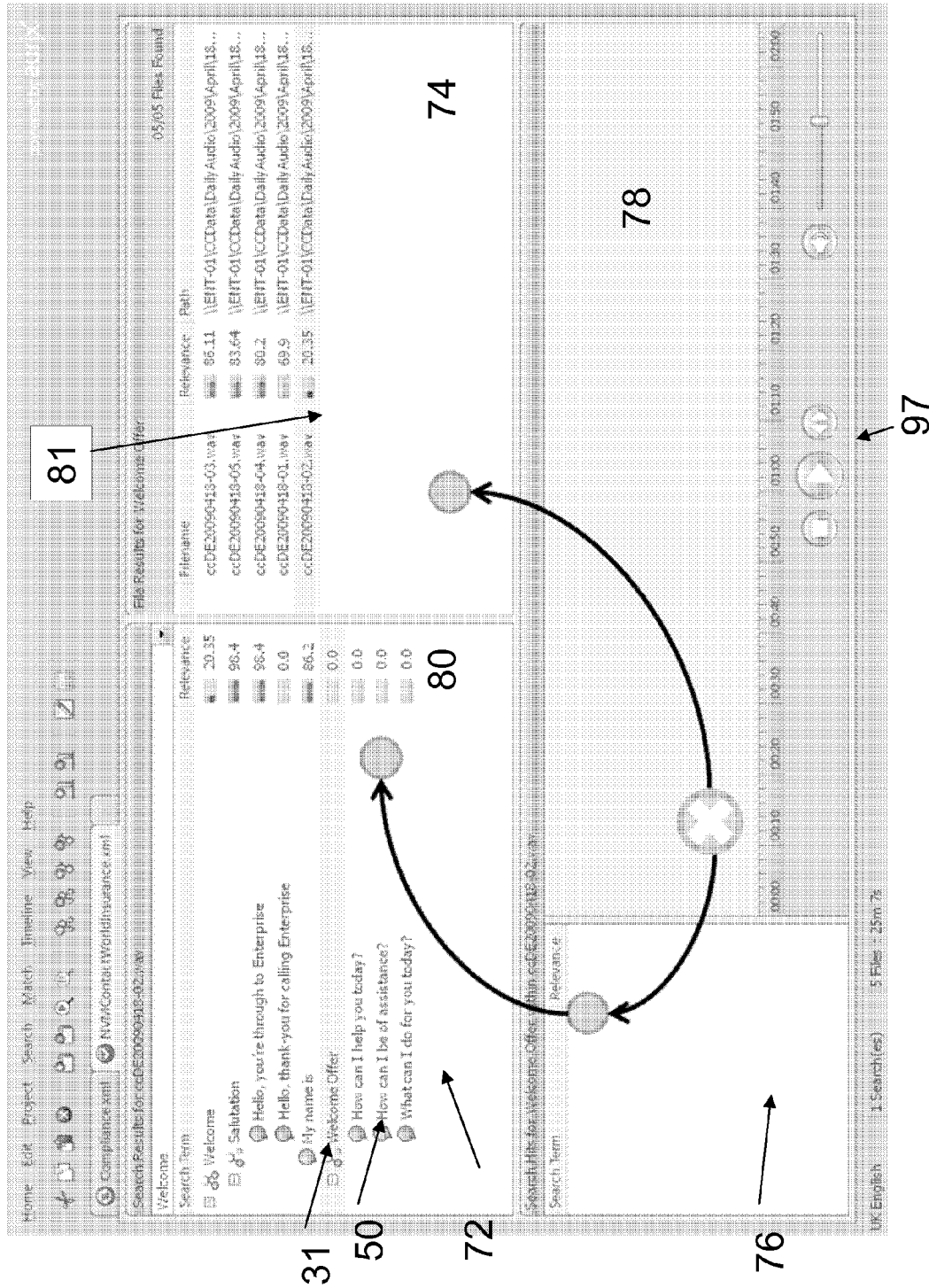
FIG. 22 is a screen shot of the user interface wherein the result hit portlet is updated to remove the selected hit, the search results portlet is similarly updated and the data source portlet is also updated.
Figure 23:
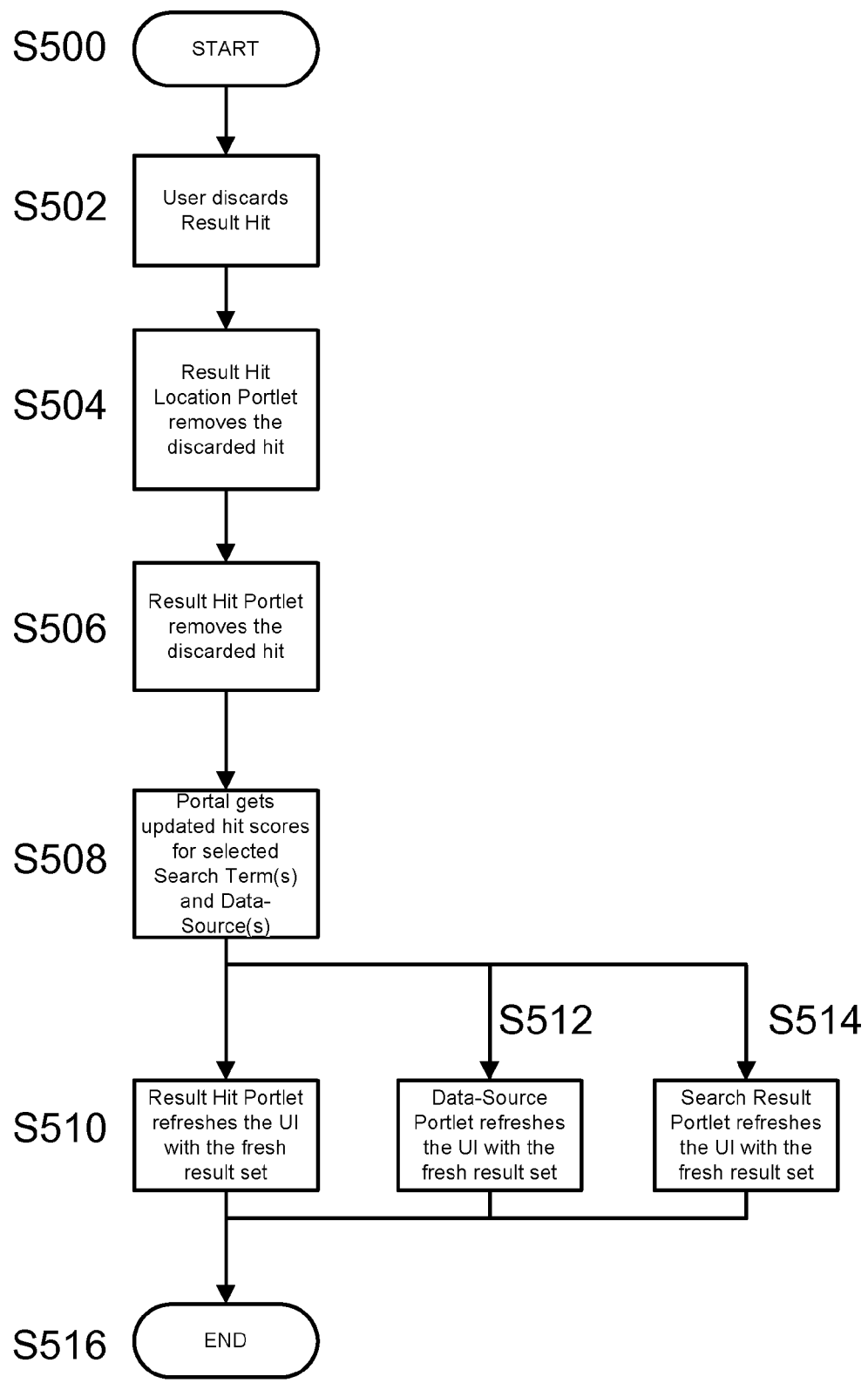
FIG. 23 is a flow diagram representing the user discarding a results hit and the portlets being updated.

In FIGS. 21 to 23 there is shown the method of determining the absolute relevance of a non-deterministic result through rejection of result within the portal.

In FIG. 21 there is shown the user interface where the user has inspected a further element to determine the relevancy of the match as described previously with reference to FIGS. 15, 16 and 17. In this situation, the user has analysed the selected file 81 by listening to the relevant part of the file and has determined that the relevancy score for the search phrase "how can I be of assistance" 50 is incorrect and therefore has selected discard hit 96. Therefore the user believes the non-deterministic search results to be incorrect and after inspecting the file has absolutely determined that a hit is not present. i.e. confirmed the relevance score to be 0.0.

As described previously with regards to the a hit being confirmed, the absolute determination that a hit is not present in a given data source preferably results in the updating of metadata associated with the file to describe with absolute certainty that a hit is not present with that particular file.

FIG. 22 shows the user interface after the user has discarded the hit i.e. they believe the hit to be incorrect and have assigned a deterministic result of a non-hit to the file. The change of state of the result hit for the selected data source 81, in the result hit location portlet 78 results in changes in the data source portlet 74, the results hit portlet 76 which in turn results in a change in the search results portlet 72.

The data source portlet 74 now shows the selected data source 81 "02.wav" with a much lower relevancy score 20.35 as opposed to 69.7 in FIG. 15. The results hit portlet 76 is now empty as the result has been determined by the user to be incorrect. Accordingly, the search result portlet 72 has been updated to reflect this change. The search constraint "Welcome offer" 31 now has a relevancy score 80 of 0.0.

FIG. 23 is a flow chart describing the cascade process that occurs when a user has determined a hit to be irrelevant as described with reference to FIG. 22.

There is shown, the start of the process at step S500, the user discarding a hit at step S502, the results hit location portlet 78 removing the discarded hit at step S504, the result hit portlet 76 removing the discarded hit at step S506, the portal obtaining the updated hit scores for selected search constituents and data sources at step S508, the results hit portlet being updated at step S510, the data source portlet being updated at step S512, the search result portlet being updated at step S514 and the end of the process at step S516.

As described with reference to the other flow charts, the invention updates the other portlets in a cascade fashion after a change in the state of the initial portlet. Once the user has discarded the hit at step S502 (as described with reference to FIGS. 24 and 25) the results hit location portlet 78 is updated at step S504 causing the cascade. Once the portal has obtained the updated relevance scores at step S508, the remaining portlets are updated with these new relevance scores in steps S510, S512 and S514, thereby updating the entire portal/user interface.

FIGS. 24 to 27 describe the method of determining an absolute result in a data source that did not appear in the search results.

Figure 24:
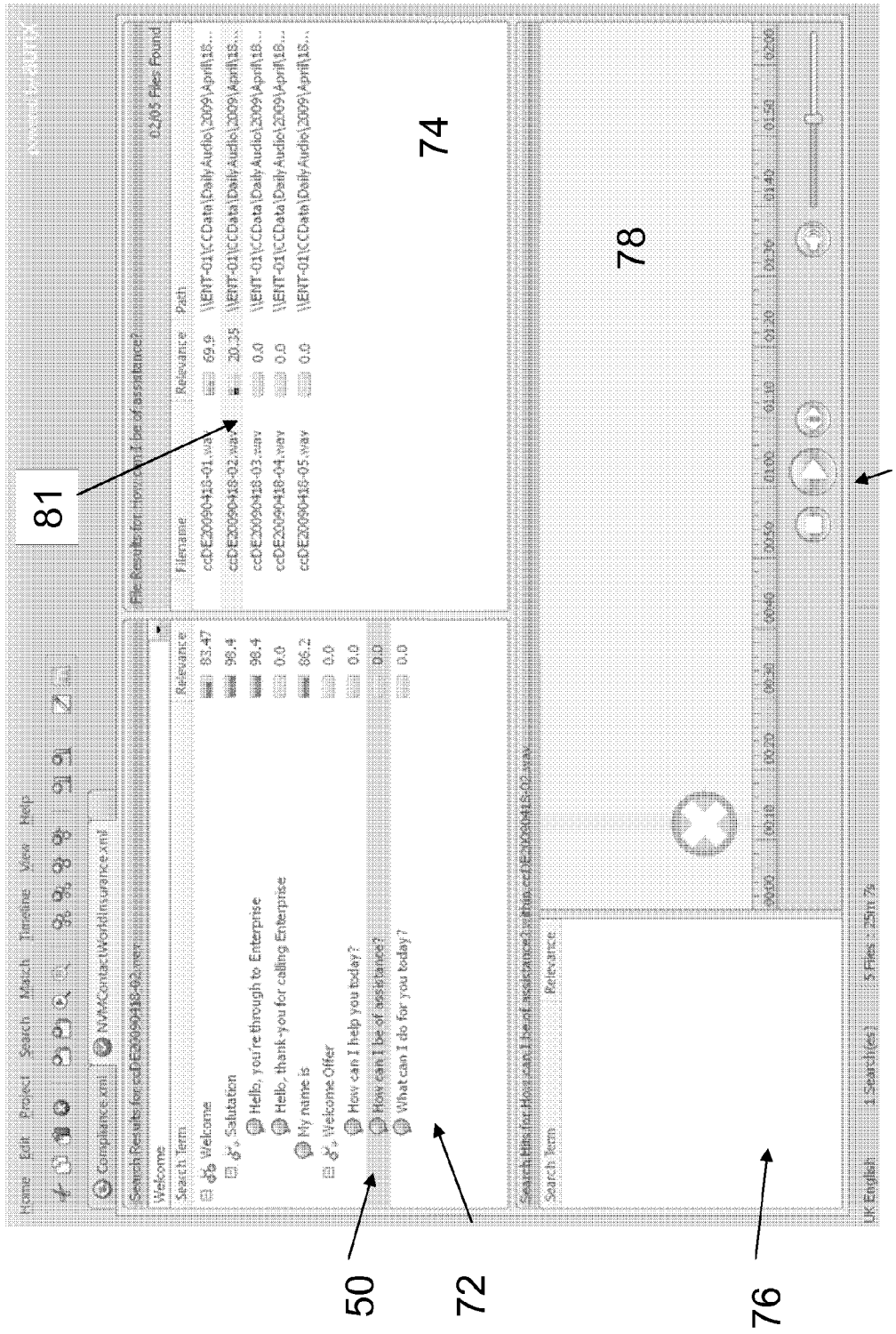
FIG. 24 is a screen shot of the user interface wherein the user examines a region of the data source for evidence of a hit that was missed.

In FIG. 24 there is shown a screenshot of the user interface where the user is determining an absolute search result that did not appear in the search results. In this situation, the search has returned the non-deterministic result of a hit for the search phrase "How can I be of assistance?" 50 of 0.0 in the search results portlet 72. As the search results have determined a 0.0 relevance for the search phrase 50, the search results hits portlet 76 and results hit location portlet 78 are empty. The user has decided to verify the result and examine the selected data file 81 "02.wav" at the location they believe a hit is likely to be present. In the present example, this is again performed by a media player 97 as the selected data source 81 is an audio file.

Figure 25:
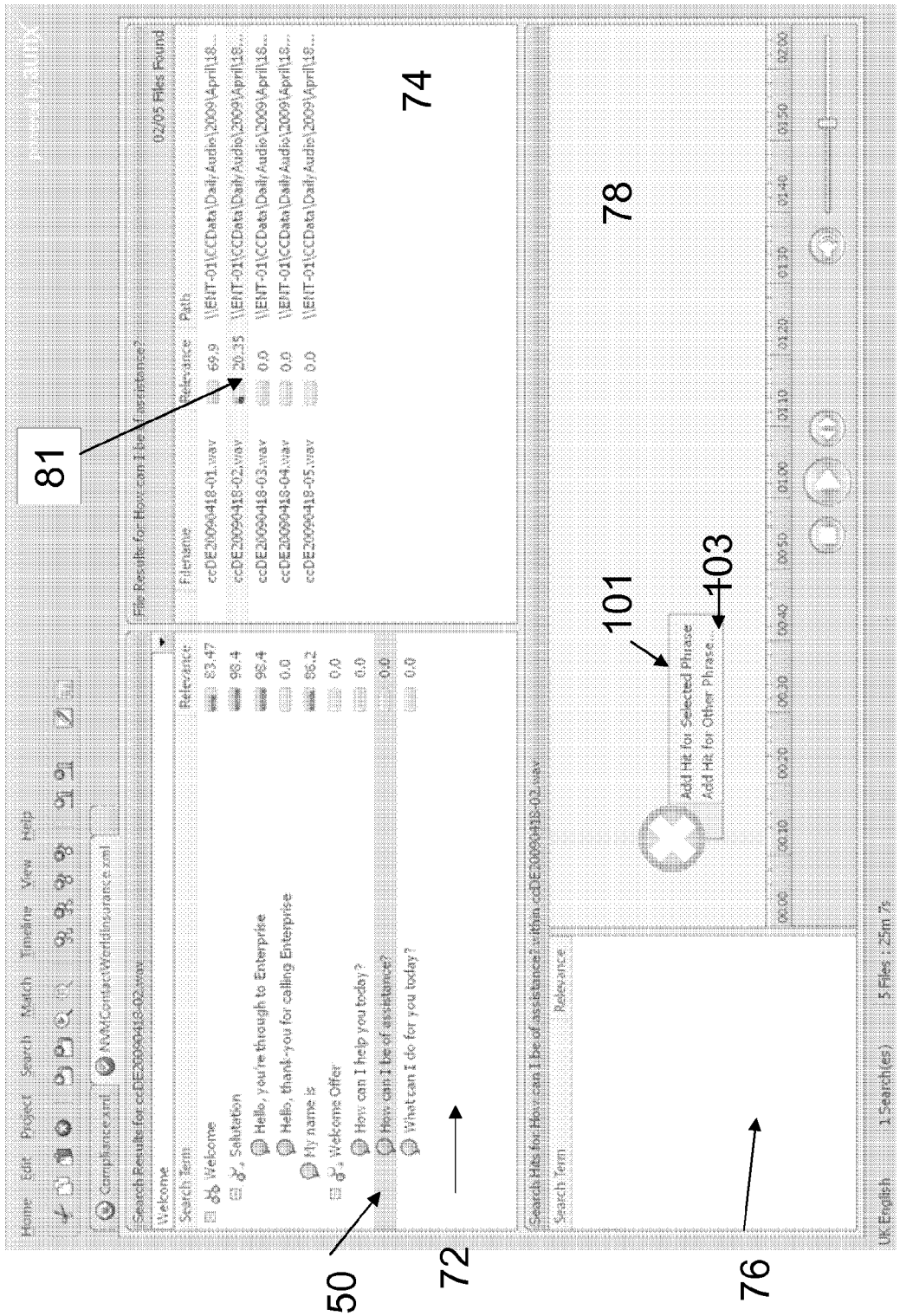
FIG. 25 is a screen shot of the user interface wherein the user adds a hit to the selected location within a selected source.

In FIG. 25 the user has reviewed the selected file and has determined that the non-deterministic result is incorrect and that the search phrase 50 is in fact present in the data. Therefore, the user is able to assign an absolute deterministic result to the file for that particular phrase. There is shown the menu option to add hit for selected phrase 101 and add hit for other phrase 103 in the results hit location portlet 78. In this example, the user has selected the search phrase "How can I be of assistance?" 50 and wants to add a hit for this particular phrase in the selected data file 81.

Figure 26:
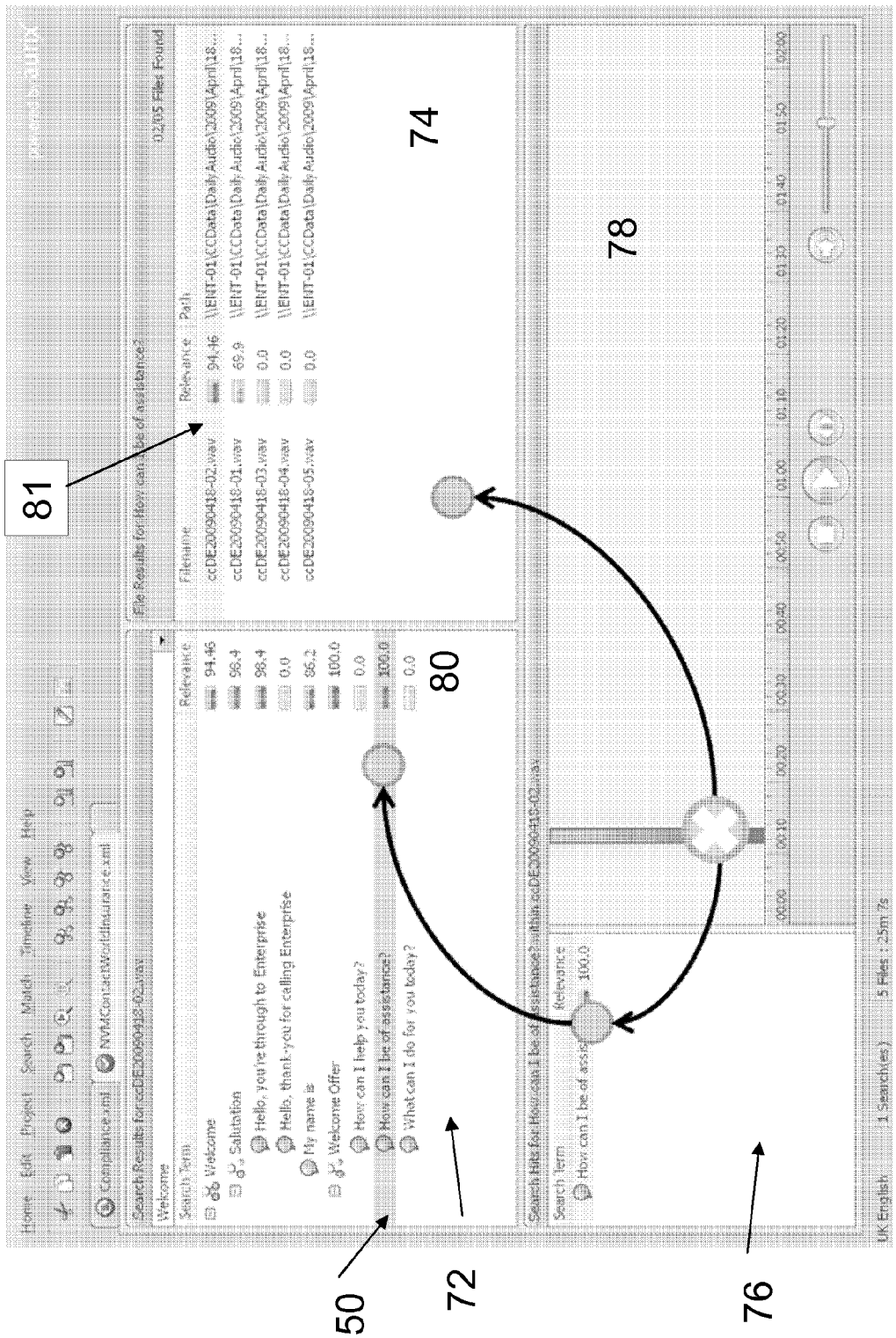
FIG. 26 is a screen shot of the user interface wherein as a result of the user adding a hit which has not been returned by the initial search, the results hit portlet the search results portlet and the data search portlet are updated.

In FIG. 26 there is shown the cascading affect of determining an absolute result for the hit in the file. The change-of-data event causes updates to cascade into the other portlets. The results hit location portlet 78 now shows a hit with a 100.0 relevance score, and accordingly the bar is at full height. The results hit portlet 76 now shows a hit with a 100.0 relevance score. The search results portlet 72 is accordingly updated with the search phrase "How can I be of assistance?" now showing a relevance score 80 of 100.0, as is the search constraint "Welcome Offer" 31. It must be noted that the relevancy of the search constraint 31 and the complex query 40 are updated to reflect the absolute nature of the hit now assigned to the file.

Figure 27:
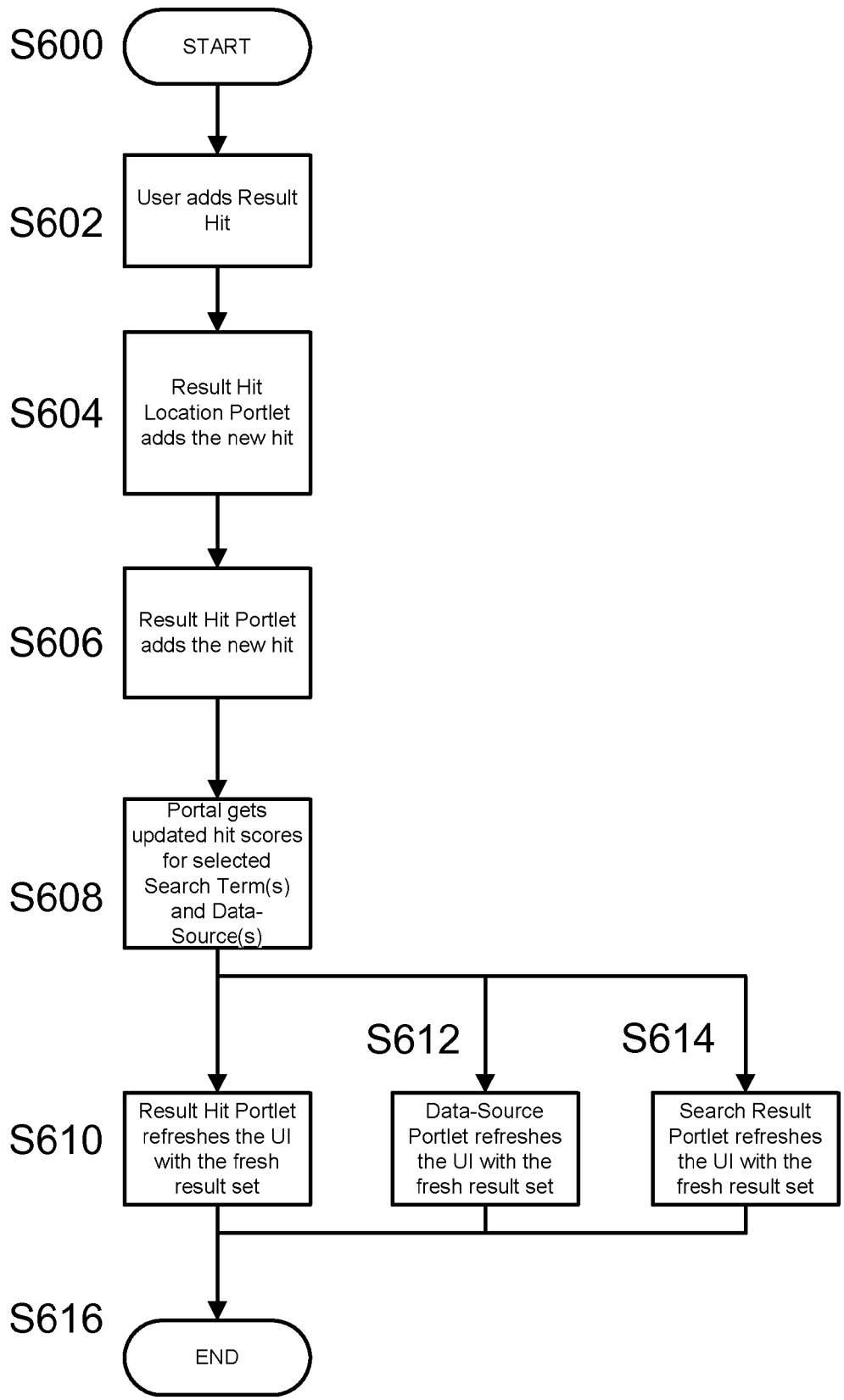
FIG. 27 is a flow diagram representing the process of a user adding a hit and the results hit portlet being updated.

FIG. 27 is the flow chart of the process caused by a change of state in the result hit location portlet 78. There is shown the start of the process at step S600, the user adding a hit at step S602, the results hit location portlet 78 adding the hit at step S604, the result hit portlet 76 adding the hit at step S606, the portal obtaining the updated hit scores for selected search constituents and data sources at step S608, the results hit portlet being updated at step S610, the data source portlet being updated at step S612, the search research portlet being updated at step S614 and the end of the process at step S616.

The change causes updates to cascade into the other Portlets:

The Result Hits Portlet 78 is updated to show the new score for the new hit at step S604. If the Search Phrase 50 is nested within search constraints 31, then these scores will be updated as the effect of the new relevance passes up the complex search query 40 structure.

The search results portlet 72 is similarly updated to show the new score for the new hit. If the Search Phrase is nested within search constraints, then these scores will be updated as the effect of the new relevance passes up the complex search query 40 structure.

The data source Portlet 74 is updated to reflect the new overall score for the selected data source 81.

Therefore, the present system allows the user to search for terms as either part of a single query, or a complex query, in a rapid and efficient manner. Furthermore, the user is further enabled to interact with the searched data to verify the accuracy of the results. This is particularly beneficial in environments where large amounts of audio data may need to be verified, for example in a call centre. In such environments there may be regulatory requirements for certain phrases to be said e.g. verification of age, or customer service requirements e.g. a greeting to each caller and identification of the operator.

The present system beneficially allows a user to run queries on the data set for the presence of a phrase (or set of phrases). The graphical representation of the non-deterministic result allows the user to make their own decisions as to whether they accept the results of the search, thus improving cognitive understanding of the data set. For results which are not considered convincing, or are possibly incorrect (e.g. a greeting being identified ten minutes into a conversation) the user is enabled to interact with the data to perform their own verification of the data i.e. listen to the selected piece of audio data, and determine absolutely if a term is present or absent from a piece of audio data. Again this improves the user's interaction with the data set allowing for improved understanding and an easy to use system.

Furthermore, as the system preferably uses a phonetic searching system, which can search recorded data several times faster than it is spoken, large amounts of data can be quickly analysed. In situations such as call centres where compliance is a requirement, errors and/or deficiencies (e.g. a regulatory question is not asked) can quickly be identified and remedial action taken. In call centres previously this would need to be done by either listening in on a call in real time, or listening to a recording. These are both time consuming and only allow for one-to-one analysis. In the present system a single person can monitor the entire dataset. Thus the present invention allows a user to analyse potentially large scale datasets and improves the user's understanding of the data by presenting results in a cognitive fashion which also allows for intuitive interaction with the dataset.

In the field of speech recognition in certain circumstances, the intention of a complex query may be satisfied without matching some or all of the pre-specified search phrases. For example, "good morning, this is the Enterprise help centre, what would you like me to do for you?" does not match either the Salutation or the Welcome Offer constraints shown in FIG. 8, but might be a perfectly acceptable Welcome. In such a situation a user or operator may take one of the following options:

The operator may modify the search constraints to include the additional phrase(s) and re-run the search;

The search constraint(s) may be marked as satisfied (e.g. given a score of 100) without any explicitly associated audio region and without altering the (low or zero) scores associated with the constituents within the constraint(s);

The relevant regions of the audio file may be selected and marked as matching the search constraint(s)—in the above example "good morning, this is the Enterprise help centre" could be marked as matching the Salutation constraint and "what would you like me to do for you?" marked as matching the Welcome Offer constraint. This follows the same process as discussed with reference to FIG. 25 for marking search phrases, except in that there are additional options: "add hit for selected constraint" and "add hit for other constraint".

A note or metadata may be added (optionally with data source and location information):

To the project, the query or to the appropriate constraint—for example, to record that the search should be updated for next time;

To some list associated with the data source, for example a list of comments to be fed back to the particular operator.

In an embodiment, the user adds the note or metadata by accessing a menu brought up using a specific command e.g. by right clicking on a data source in the data source portlet 74, or on one of the constituents in the search results portlet 72.

Therefore, "dummy" search strings may be used as part or all of a complex query with the intention of manually marking data sources or regions of data sources in relation to that string. For example, in a legal context "to be played in court" or "not to be played in court" might be used to mark up recordings of interviews, even though those precise words are most unlikely to occur in the audio stream.

A further method for implementing such searching is via tagging of the audio files.

FIGS. 28 to 32 show an example of the use of tags in a dataset to refine search queries and/or to explore the data set.

Figure 28:
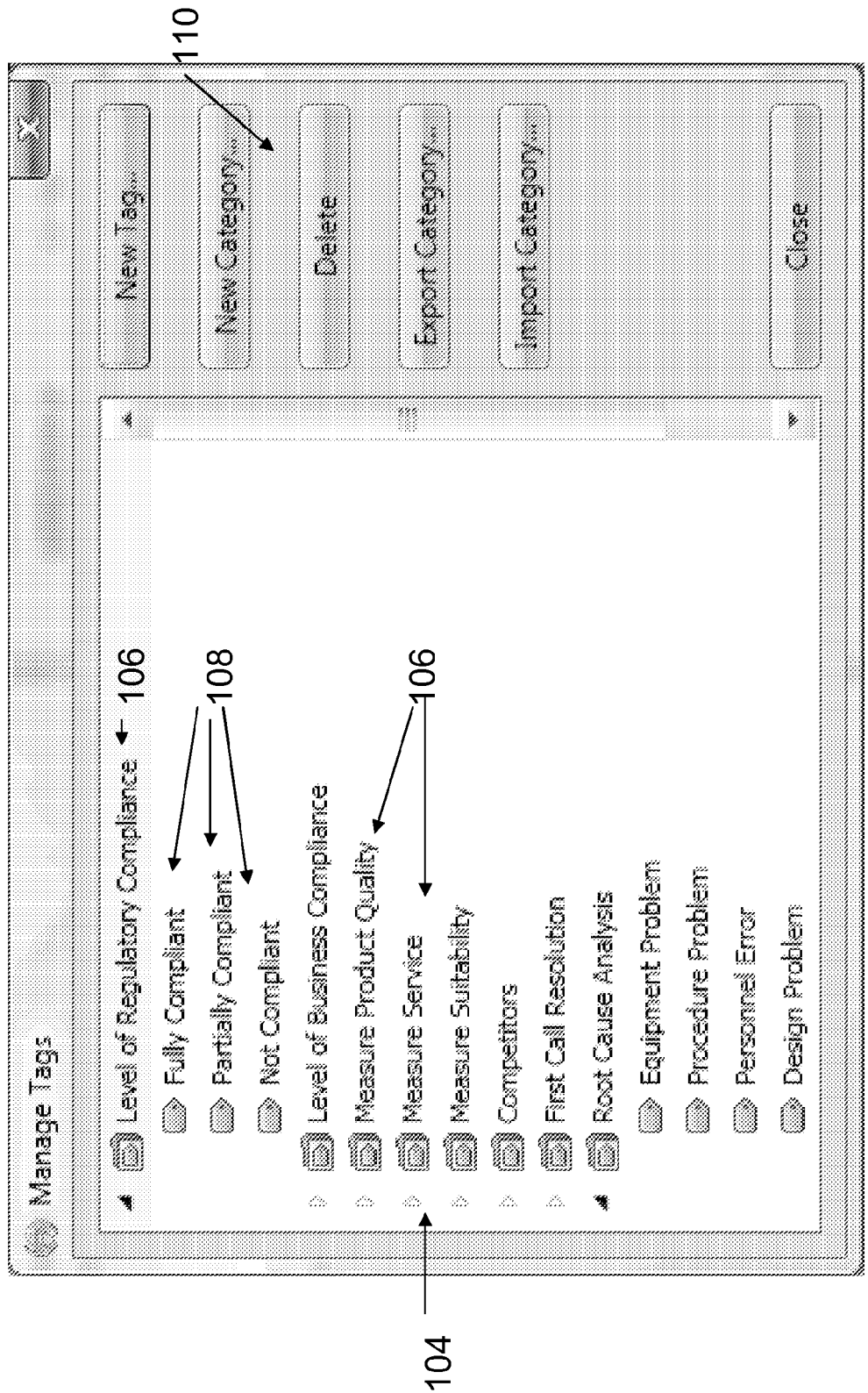
FIG. 28 is a screen shot of a user interface for defining tags within tag sets.

In FIG. 28 there is shown a tag tree 104, comprising nodes 106 and sub-nodes 108 and a menu 110. There is a one-to-one correspondence between tags to be assigned to the data and the sub-nodes in this tree.

Figure 30:
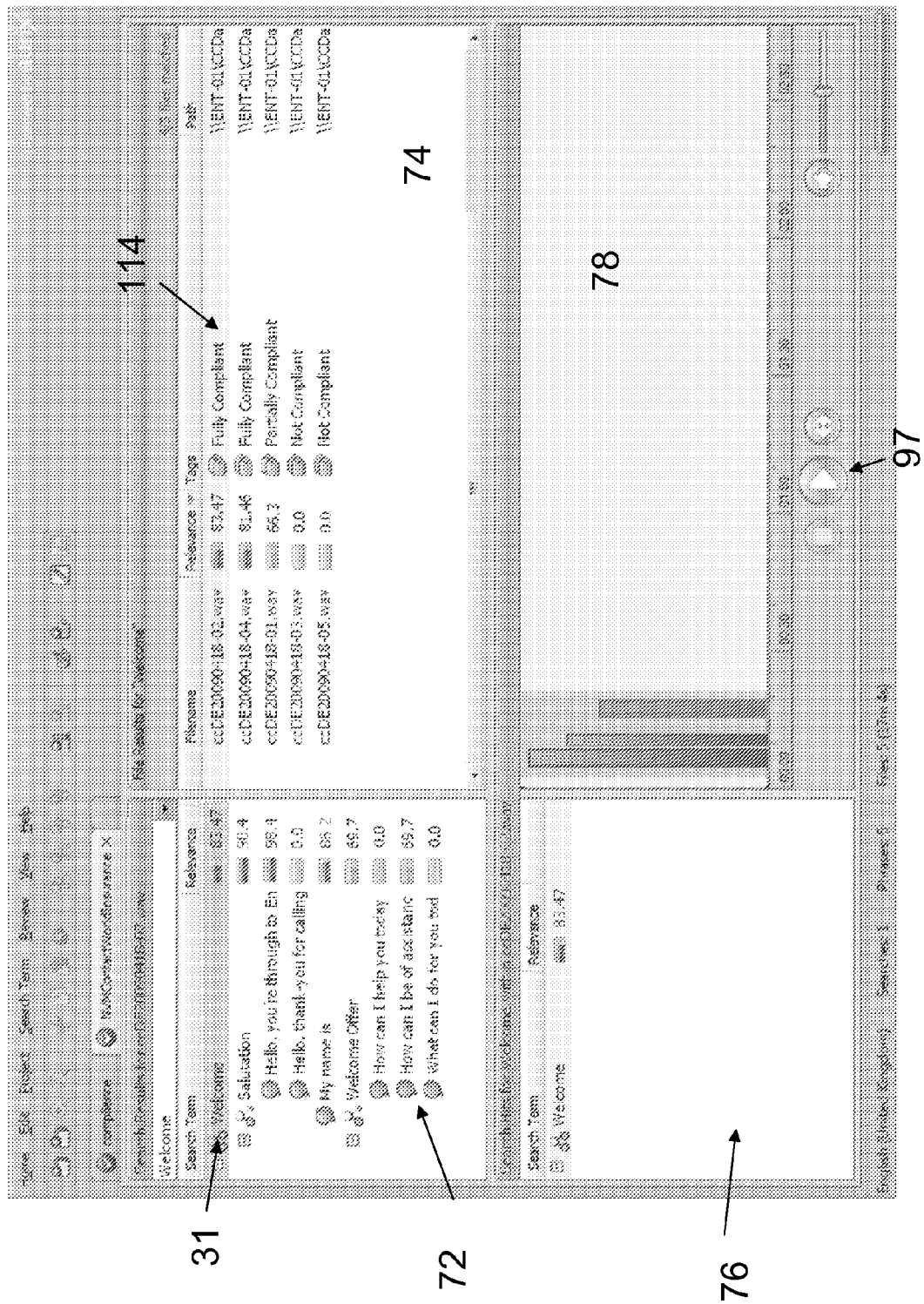
FIG. 30 is a screenshot of the results interface displaying one automatically assigned tag for each file, based on the relevance score for a particular search constraint.

Further levels of sub-nodes may be added to refine the descriptions—for example the general heading of "Equipment problem" might have sub-nodes "computer", "telephone exchange" and "handset" which are all implicitly also categorised as "Equipment problem". Subsequent data filtering operations might be based on either the general "Equipment problem" or the more specific descriptions. Likewise the display in the "Tags" column of data source portlet 74 in FIG. 30 shows only the highest level tags. The presence of sub-levels in an embodiment is indicated using a different or modified icon in the "Tags" column, for example an icon with a "+" symbol added, giving the user the option to "drill down", expanding one or more of the tags via menu options or by clicking on the individual tag. The text displayed for expanded tags could become quite long, so abbreviated forms may be necessary, for example "Equipment/telephone" for "telephone exchange" under "Equipment problem". A similar notation would provide disambiguation for the case where the same tag is required under two distinct nodes.

The nodes 106 may be altered according to user choice but will typically relate to a category or subject matter within a dataset. In the example shown in FIG. 28 the data set to be searched is one found in a call centre and the nodes 106 relate to subjects which may be typically associated with call centres. For example, "Level of regulatory compliance", "Level of business compliance" and "measure product quality" are typical nodes 106 in such a data set.

Corresponding to each node 106 is a set of sub-nodes/tags 108. In the node 106 "Level of regulatory compliance" the sub-nodes 108 are "Fully compliant", "Partially compliant" and "Not compliant".

Nodes 106 and sub-nodes/tags 108 may be managed using the menu 110 on the right hand side of the image. The user is enabled to define or delete nodes 106 and sub-nodes/tags 108 according to their requirements. In further embodiments the menu 110 contains further options for the user to manage the nodes 106 and sub-nodes/tags 108 as appropriate.

In particular, tags may be defined to be mutually exclusive within a node, enforcing a rule that at most one tag from a given node may be assigned to any one data source or region.

Data may be tagged as belonging to one or more sub-nodes/tags 108 within one or more of the nodes either manually (through user intervention) or automatically.

When tags are assigned manually, the tags may be applied to a data source by, for example, right clicking on the source in the data source portlet 74 to bring up an appropriate menu. Correspondingly, tags may be applied to a marked region of a data source when operating in the search results location portlet 78. Tags within a set may be mutually exclusive, in which case the assignment menu could use "radio buttons", or otherwise, in which case "check boxes" could be used so that multiple tags may be assigned to a single data source.

When the tags are assigned automatically, a tag may be applied "by rule" to some or all of the data sources based on any desired combination of metadata, search results and other tags as discussed with reference to FIG. 34 below. Such rules are preferably stored in a rules engine which defines said rules.

Figure 29B:
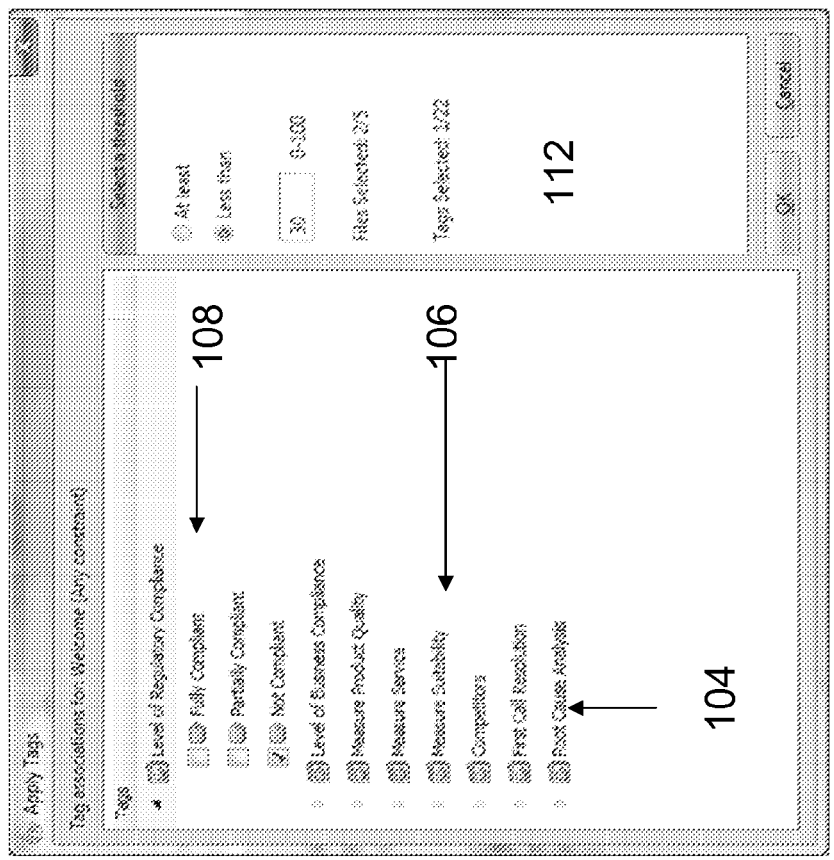
FIG. 29b is a screenshot of a user interface for automatically associating a given tag with files having a score below a threshold for a particular search constraint.
Figure 29A:
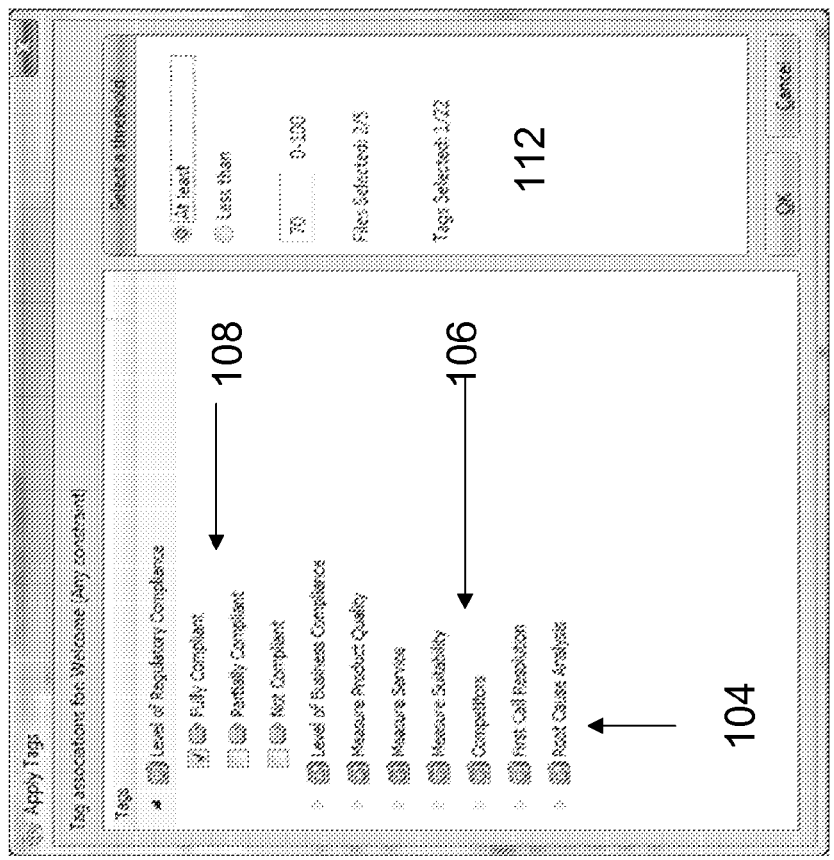
FIG. 29a is a screenshot of a user interface for automatically associating a given tag with files having a score above a threshold for a particular search constraint.

FIGS. 29*a* and 29*b* shows an example of automatically tagging a dataset according to predetermined search criteria.

There is shown the tag tree 104 comprising nodes 106 and tags 108. There is also shown the threshold menu 112.

In FIGS. 29*a* and *b* the search constraint 31 is the "Welcome" constraint and the "Level of regulatory compliance" node 106 has been selected. The "Level of regulatory compliance" node 106 contains three tags 108 "Fully compliant", "Partially compliant" and "Not compliant". Therefore, in the present example the user is searching the data to see if the salutations in the audio data set comply with the regulatory compliance standards.

In FIG. 29*a* the tag which is represented by the sub-node "Fully compliant" is selected and the threshold for data which is fully compliant is set in the threshold menu 112 at scores greater than 70. As described above the search of the data is or has previously been performed for the search constraint 31 and non-deterministic scores are assigned. Files which are determined to have a score of greater than 70 with the "Welcome" search constraint 31 are automatically assigned a tag of "Fully compliant."

Similarly in FIG. 29*b* the "Not compliant" sub-node 108 is selected and any data file which scores less than 30 for the "Welcome" search constraint 31 is automatically assigned a tag of "Non compliant". Because these three tags are mutually exclusive, any data files scoring between 30 and 70 are therefore tagged as "Partially compliant".

The examples shown in FIGS. 29*a* and *b* only show three mutually exclusive sub-nodes 108 (i.e. a file may only belong to one of the sub-nodes 108) though in further embodiments, there may be more sub-nodes 108 and the nodes may be non-exclusive. For example, a set of sub-nodes 108 may have overlapping ranges and a file may therefore be tagged as belonging to more than one sub-node.

In further examples, the user might choose to mark as "not compliant" all calls which have duration less than 20 seconds or have relevancy score less than 50 for a particular search (whether raw or as the result of manual checking of the search results) or have previously been tagged as "needs training". Such rules are preferably defined in the threshold menu 112 (discussed later with reference to FIGS. 34 and 35) and in a further embodiment expressed in SQL form.

FIG. 30 shows an example where a data set has been automatically tagged based on the "Welcome" search constraint 31 using the thresholds shown in FIGS. 29*a* and 29*b*.

There is shown the assigned tags 114 in the data source portlet 74. In the data source portlet 74 there are shown five files two of which have assigned tags 114 of "Fully compliant" two files which have assigned tags of "Not compliant" and one file "ccDE20090418-01.wav" as being "Partially compliant". The tags are assigned as described above.

In the example shown in FIG. 30 the user may choose to listen to the "Partially compliant" file in order to make a definitive decision as described previously with reference to FIGS. 20 and 21.

In further embodiments, instead of the entire file being assigned a tag, the relevant audio region is assigned the tag. For example, the region of audio which contains the salutation which scores highly on the "Welcome" search constraint 31 is identified using timestamps and the tag is assigned to that particular region of the audio file.

In a similar manner a subset of the data sources, or regions within data sources, could be selected for further operations, including but not limited to:
 applying further search(es) optionally based on the tags;
 processing through a large vocabulary speech recognition system to obtain a rough transcription.

When applying such subset operations, the display in the data source portlet 74 may be modified so that the active and inactive data sources are distinguished. For example the inactive files may be hidden or "greyed out". Likewise the active and inactive regions within a data source may be distinguished in the results hit location portlet 78 by the use of a different background colour. A further example of subset selection is described with reference to FIG. 34 below.

Figure 31:
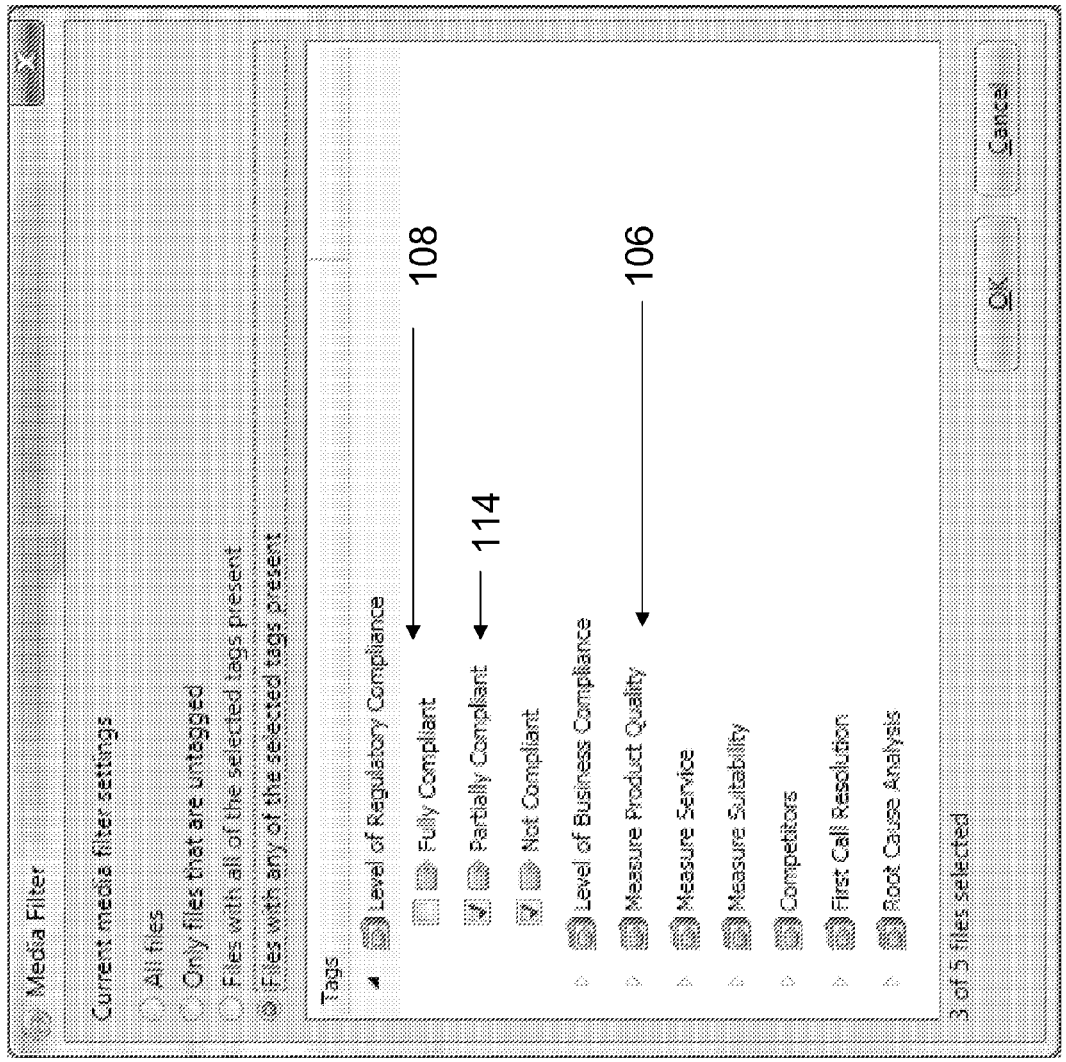
FIG. 31 is a screenshot of a user interface for selecting a subset of the data sources based on the presence of particular tags.

FIG. 31 shows an example of searching data using the tags.

There is shown the selection of search constraints based on tags 114. In FIG. 31 the tags as defined by sub-nodes 108 "Not compliant" and "Partially compliant" are selected. Therefore, only files which are tagged, or have part of the file tagged, as one of "Not compliant" and "Partially compliant" are selected.

Figure 32:
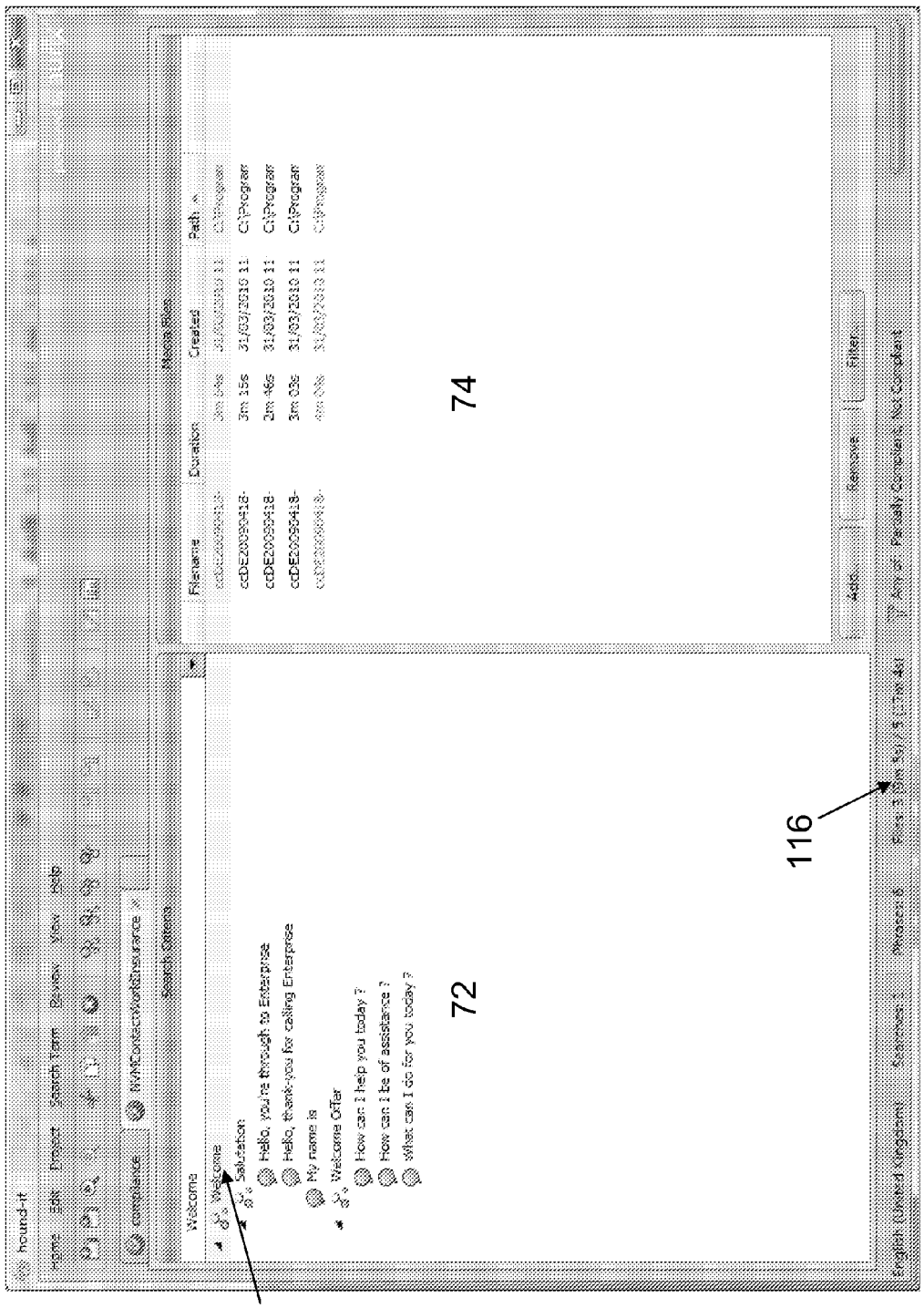
FIG. 32 is a screenshot of the edit view after a subset of the data sources have been selected for further processing.
Figure 33:
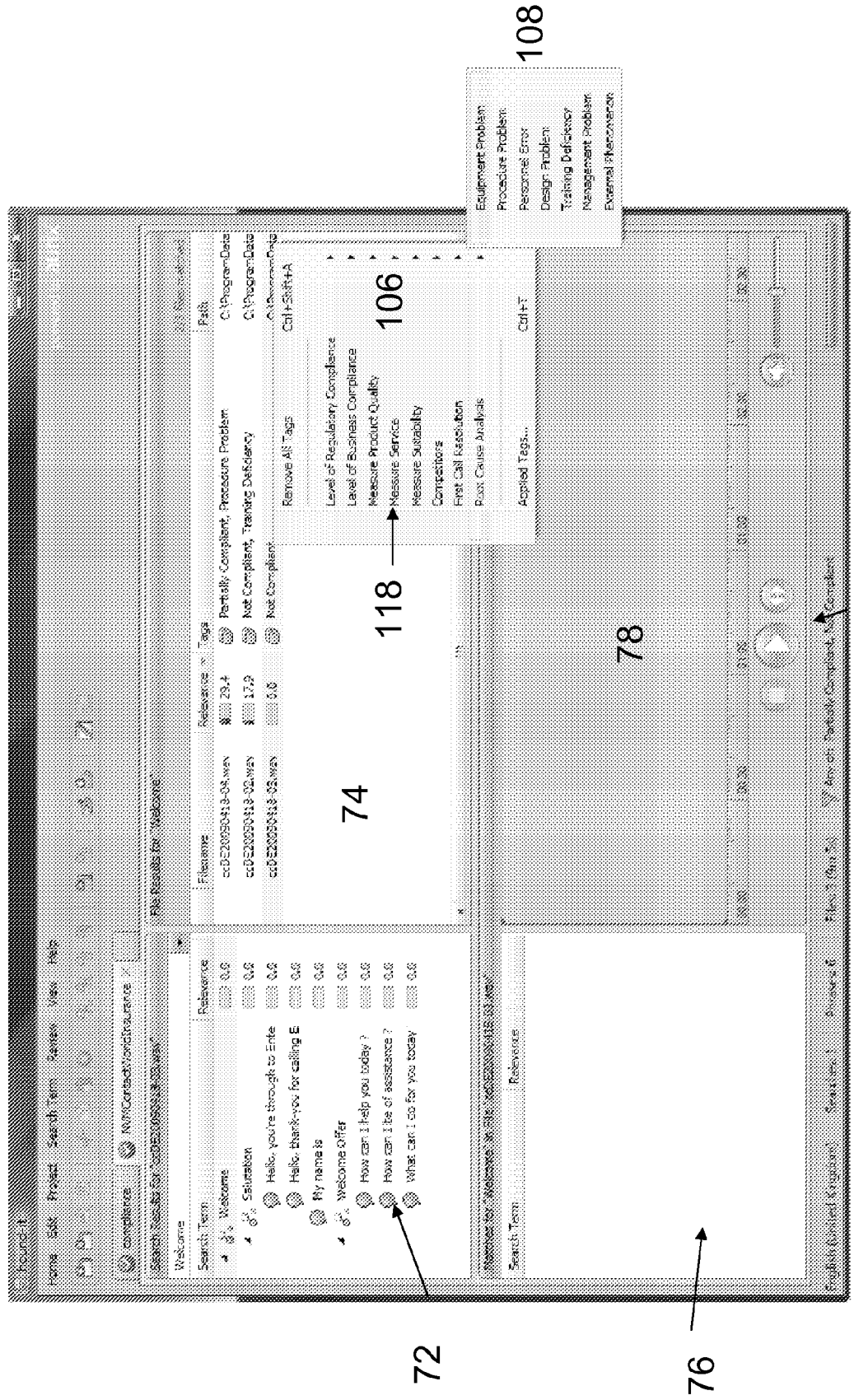
FIG. 33 is a screenshot of the user interface illustrating the process of manually assigning tags to data sources.

A search is run using the search constraints based on tags 114 and the results are returned to the user. In a preferred embodiment, all files that form the dataset are displayed and those which do not satisfy the search criteria are "greyed out". An example of an edit view setting up a search based on the tags is shown in FIG. 32. The filtering of results in such a manner is found to provide benefits in terms of audit and recoverability of the results. If the results were deleted instead of greyed out the user would find it difficult to determine how many files there were compared to the original data set. To assist a file count 116 in an X/Y format is provided, to show the size of the selected dataset compared to the original dataset.

In the present example, the user can review the files to determine the reason for the tag. For example, the files selected have been tagged "Not compliant" and "Partially compliant" for the Welcome search constraint 31 indicating that the audio files do not contain a salutation. In a commercial situation (e.g. a call centre where the calls have been recorded and are being analysed), a user (e.g. a manager), may wish to determine why the salutation was not recorded. The user can interact with the data as described with reference to FIGS. 24 to 27 and may add one or more tags or metadata to the file to indicate what they believe to be the reason for the omission (or inclusion as the case may be).

Furthermore, tagging of the data allows for an increased understanding of a data set. For example, in a call centre environment files which are tagged as "Non-compliant" and are identified as belonging to the same operator may be used as an indication for the need of further training In FIG. 33 the user has listened to the selected audio file, using the method described above, and determined the reason for the omission of the salutation. There is shown a tag menu 118 comprising nodes 106 and sub-nodes 108. The user in this example has selected the "root cause analysis" node in order to tag the data in order to describe the reason for the lack of salutation. In the example shown in FIG. 33 the user has identified the problem to be an "equipment problem" and has selected the appropriate sub-node.

In further embodiments, the user is enabled to associate metadata with a file and describe the problem.

Figure 34:
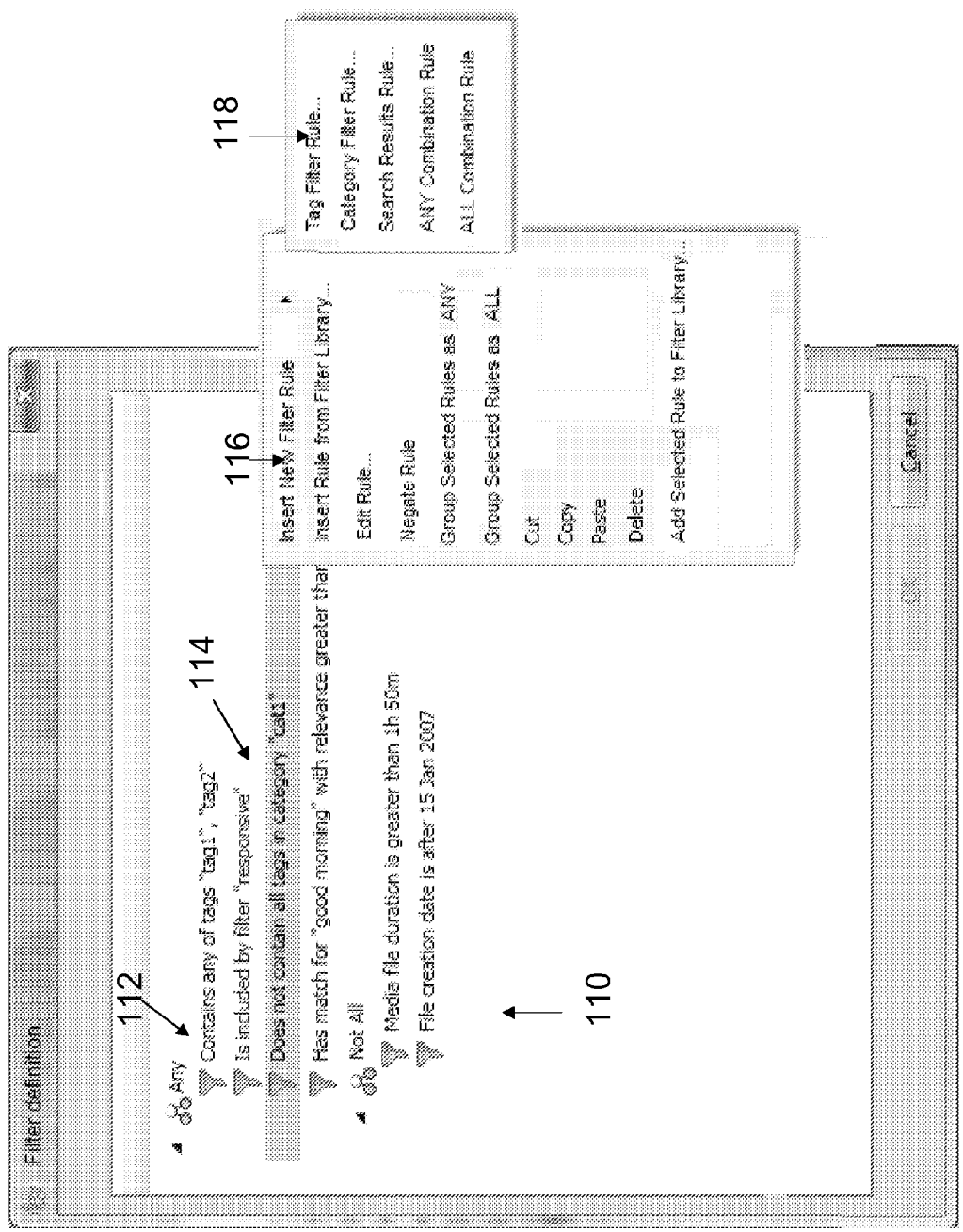
FIG. 34 is an example of an interface for setting up a data source filter tree for the purpose of selecting a subset of the sources for further operations.

FIG. 34 is a screenshot of an interface for setting up a more advanced data source filter tree for the purpose of selecting a subset of the data.

There is shown the filter portlet 110, tree 112, constituents of the tree 114 and sub menus 116 and 118.

This may be used wherever further operations are to be applied to data sources, so for example may be invoked from the edit view setting up initial searches or from the automatic tagging process as described with reference to FIG. 35. The tree structure 112 allows arbitrary combinations of information related to the data sources to be used to include or exclude data sources from operations of the system, such as further searching or automatic tagging. The information used may include one or more element from:

source metadata, such as call duration or agent identifier;
the raw results (non-deterministic or confirmed) of previous searches;
tags previously applied to the sources.

Furthermore, the user can access sub-menus 116, 118 to edit the filters as appropriate. In an embodiment, the sub-menus 116, 118 are accessed via a right-click event on the tree 112. As shown in FIG. 34 the user can select from the first sub-menu 116 "insert a new "filter rule"" of any supported type. The portlet displays the second menu 118 to allow definition of the rule. Once defined, rules can be edited by right-clicking and selecting "Edit Rule . . . ".

The user can also choose to re-use an existing named rule that has previously been saved in the "Filter Library". Under these circumstances a reference to the existing rule is inserted (thus, any changes to the definition of the existing rule are automatically inherited by all rules that rely on this definition).

The user can negate any rule by right-clicking and selecting "Negate Rule" in the first sub-menu 116. If the negated rule is an elemental filter, the negation is handled internally and the rule description in the tree 112 is updated to reflect this. If the negated rule is an ANY or an ALL combination rule, it is changed to "NOT ANY" or "NOT ALL" as appropriate, unless the rule has already been negated in which case the "NOT" is removed.

The user can multi-select an arbitrary combination of rules from the tree 112. If the selected set of rules share a common parent, the user may then right-click and select "Group selected rules by ANY" or "Group selected rules by ALL" from the first sub-menu 116. The appropriate combination rule is then added to the tree 112 as a child of the parent and the selected rules become children of the newly created combination rule.

The user can select a singe rule (elemental or a combination rule) and right-click to access the first sub-menu 116 and select "Add to Filter Library . . . "; the application then displays a pop-up dialogue box requesting a name, and on pressing OK, the filter is added to the library with the given name (unless another filter exists with this name, in which case they are asked to confirm overwrite or supply a new name).

The user can use cut/copy/paste to move rules from one place in the tree to another, and to duplicate existing rules.

Beneficially, the filter library allows the user to save the filters. This allows the user to repeat several searches which have been found to provide useful results.

In further examples, when a source filter tree is active it may be shown using a further portlet 110, with the currently selected subset indicated in the data source portlet which is responsive via the cascade mechanism to changes in the construction of the tree 112 or to which constituent of the tree 114 is currently selected. Further, an indication of the number of data sources selected may be shown against each constituent of the tree.

For example, suppose it is desired to apply a tag "listen" to all calls of duration greater than 30 seconds previously tagged as "partially compliant". The selection tree 112 then has the structure all (contains any of tags "partially compliant", data source duration>30). A click on the node, or constituent of the tree 114, corresponding to duration in the source filter portlet would cause the data source portlet 74 to be updated so that all and only the shorter files would be "greyed out"; A click on the top-level node would result in all the files which do not satisfy both constraints being "greyed out".

Once a data source filter tree has been defined it may be named and stored for re-use. FIG. 35 is a screenshot in which such a filter is used by name to select a set of files to which tags are to be applied. There is shown the tag tree 120, tag sets 122, tags 124, create new filter button 126, the apply button 128, the OK button 130, the apply selected tags choice 132 and the select filtering list 134.

Figure 35:
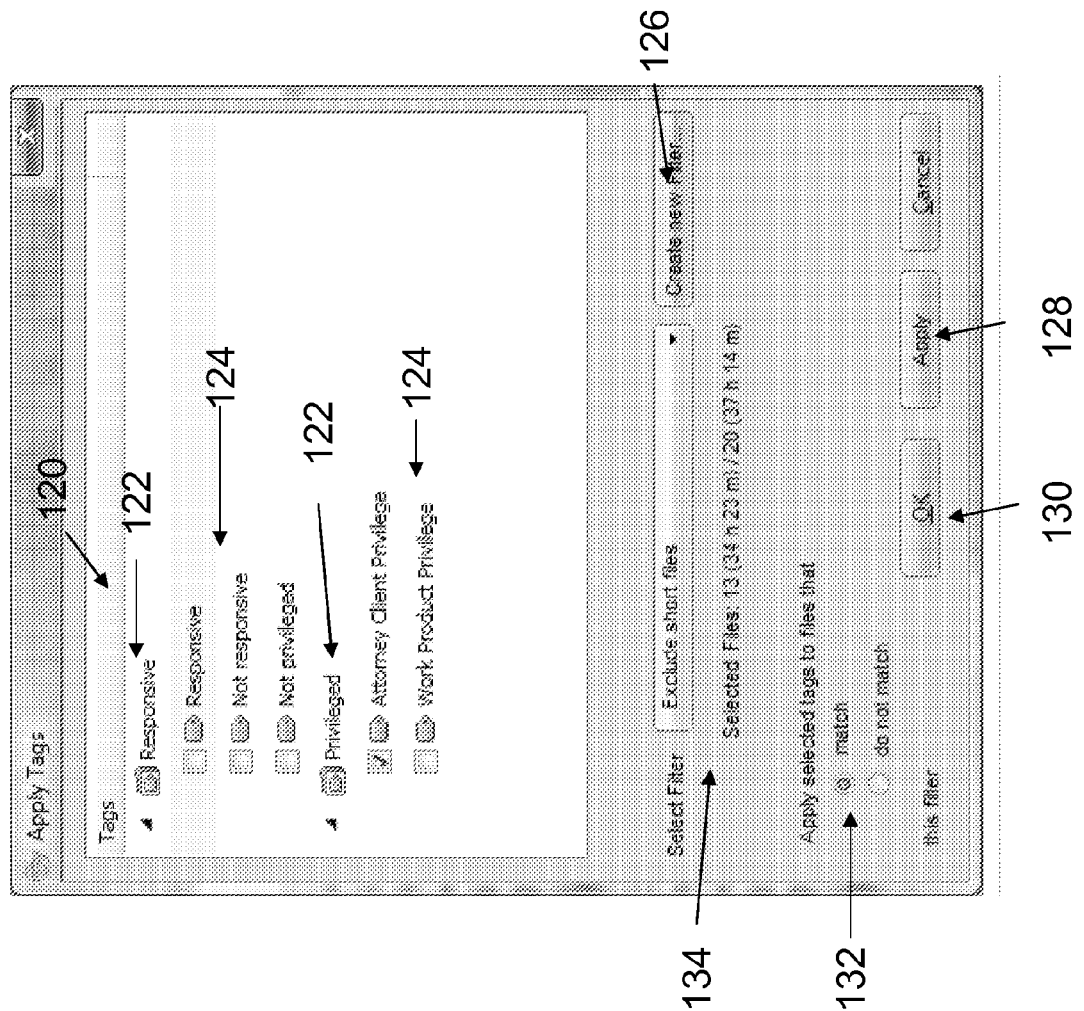
FIG. 35 is a screenshot where the filter tree of FIG. 34 has been used to select a set of data sources.

In the example shown in FIG. 35 the "exclude short files" filter has been selected from among predefined filters and filter trees using the select filtering list 134, as has the "Attorney client privilege" tag 124 within the "Privileged" tag set 122. The apply selected tags choice 132 is set to apply the selected tag to files which match the selected filter, so when the apply button 128 or the OK button 130 is pressed, then that tag will be applied to all files included by the "exclude short files" filter currently selected in the select filtering list 134. (As is the usual convention for such interfaces, the Apply button 128 and the OK button 130 both cause the tag to be applied—they differ only in that the OK button 130 additionally causes the closure of the dialogue box.)

If no suitable filter is already defined, the user may invoke "create new filter" 126, which opens the interface discussed with respect to FIG. 34 for defining filter trees. In another embodiment the "create new filter" 126 is labelled "edit filter" and may be used to edit the definition of the currently selected filter as well as for the purpose of creating new filters It is also known to use spoken queries to define the specification of a search of audio data (see, for example, D. Abberley, D. Kirby, S. Renals, T. Robinson, "The THISL broadcast news retrieval system" in: Proceedings of the ESCA workshop: Accessing information in spoken audio, Cambridge University, 1999, pp. 14-19) In further embodiments, the user is enabled to select one or more regions of audio which are used as the basis of a "find more like this" type search.

Because of the importance of the relationships among media files, associated metadata and search results, a further aspect of the invention provides for the use of a checksum or similar mechanism, which are known in the art, to verify that the specified media files are unchanged from when the searches were conducted. The same mechanism may be used to re-establish the linkage should the files be moved or accessed via a different pathway in a networked environment.

In an embodiment where the data source comprises multiple channels, for example separate recordings of both sides of a telephone conversation, the results hit location display may be modified to indicate which channel contains a particular hit. For example, the separate channels may be represented by using two separate portlets, one for each channel (preferentially arranged one vertically above the other), or by choice of the colours or shading of the bars, or by textual markings. Likewise in multiple channel sources the search constraints may be restricted to operate on only a subset of the channels.

A further variation on the results hit location portlet 78 is to incorporate an energy contour or other indication of the presence of speech into the display(s). The calculation and representation of the energy contours can be made using known methods. For a telephone conversation this gives the operator a visual impression of the balance between the parties and is found to assist in the process of checking and verifying the results.

In some circumstances, for example the preparation of material for use in court, it may be necessary to ensure that the endpoints of manually marked regions are accurately placed in order to include all and only the desired material. In order to achieve this, the user is enabled to adjust the endpoints of a search hit or other marked region in the results hit location portlet 78 by reference to an energy contour or other indication of the presence of speech. For example it is often found that a boundary between words will correspond to a local minimum of the energy contour, so that an option to enable the user to move the boundary to the next or preceding energy minimum will provide savings in time for a skilled operator.

Optionally, the results hit location portlet 78 may further include features such as "zoom in" and "scroll along". It is found such features provide significant assistance to the user when the individual data sources have large durations.

Whilst the above embodiments have been described with reference to searching an audio file, the present invention can be used to display non-deterministic search results, especially those which have complex search queries, in a manner that improves human-machine interaction. Furthermore, the invention provides a simple and efficient method for a user to transform a non-deterministic result to an absolute result as a result of human input. In particular the cascade feature which simultaneously updates the portlets after a change-of-state in a single portlet provides many technical benefits in terms of human-machine interaction.

Furthermore, the skilled man will understand that once a user has utilised the portal to analyse the data via complex search queries and by assigning with absolute confidence a deterministic result from a non-deterministic search result or set of results the user is able to utilise the information to further analyse the data in an external environment.

For complete flexibility, a further embodiment of the invention allows the addition of export add-ins. Support for such add-ins in an embodiment may be implemented using the Microsoft Add-In Framework. Through such add-ins, any desired combination of the information stored in the project may be exported, for example to a database, web service or media player. The latter might be used in the playback of redacted recordings, for example selecting portions manually marked as matching the dummy search string "to be played in court" as described above, or omitting portions matching (with relevance greater than some specified threshold) a search for credit card number strings.

Yet another embodiment provides support for import add-ins, allowing, for example, data source lists, search queries, tag sets, metadata etc. to be provided from an external data base.

In the examples shown herein, the user has analysed audio data for the search constituents that form the complex search query. As a result of the deterministic confirmation that a hit is present or not present metadata associated with the data source is also updated to describe the presence or not of a hit. This data may be exported to an external database 28 to allow for further analysis of the data.

The presence of the metadata describing deterministically the results of a non-deterministic complex search query allows for further analysis of data in a manner that would not have previously been possible. By being able to assign absolute results to non-deterministic search results the confidence that can be attributed to any subsequent analysis of the data is likewise increased. Furthermore, the highlighting and interaction of data, either via the media player or by the assigning of tags improves the usability of such a system. Whereas previously an operator may have been required to manually search through a file (or files) in order to determine if a file contains a particular term, the present system allows for the rapid handling of audio data in a manner that increases a user's cognitive understanding of the audio data as well as providing an easy-to-use system.

The invention claimed is:

1. An apparatus for analyzing non-deterministic results of a search query of data representing analogue information, such as audio data, comprising:
   a processor and a user interface, the processor being operably in communication with a plurality of audio data sources or databases representing the content thereof and adapted to communicate with the user interface which enables the user to query one or more audio data sources for the presence of search constituents within the audio data, wherein the processor is adapted to determine the non-deterministic likelihood of occurrence of the search constituent within at least part of each of the searched data sources for a user query and the user interface is adapted to present to the user the search results in a form including:
   a portlet presenting the overall search results (such as search strings) against part or all of the search query structure for a data source(s);
   a portlet presenting the data source (such as by source name) of one or more data source(s);
   a portlet presenting a data source filter tree for selecting currently active source(s);
   a portlet presenting the hit(s) of the search phrase(s) for a data source; and
   a portlet presenting the hit location(s) within a data source, and wherein at least one of the portlets presents the user with information related to the non-deterministic likelihood of occurrence of the search constituent as a probability of the relevance of a searched data source of the search query and parts of the search query, and the user interface further enabling the user to select and inspect at least part of the searched data source(s) for the presence of the search constituents;

wherein each of the portlets is presented to the user with relevancy scores to the data as determined by the non-deterministic results and each portlet is updated and synchronized during a change-of-state cascade event whenever the state is changed within any one of the portlets; and wherein each of the portlets enable a user to edit the probable relevance of the data source, convert the non-deterministic results that are returned by the search of the audio data to deterministic results based on the relevancy score by the user interaction with the data source, and altering the relevance of that data source computed for the overall query.

2. The apparatus of claim 1, wherein the user interface is further enabled to allow the user to assign a deterministic relevance result to data sources selected and inspected by the user.

3. The apparatus according to claim 1, wherein at least three portlets are provided and the probable relevance of a search query for a data source is presented in at least two portlets.

4. The apparatus according to claim 1, wherein the user is able to analyze the search results via the user interface so as to select an entry in one of the portlets, the processor being adapted then to alter the information presented in the other portlet(s) according to the user selected item.

5. The apparatus according to claim 1, wherein the search results portlet presents search results corresponding to one or more search constituents, each search constituent being either a search phrase or a search constraint, wherein a search constraint comprises a combination of one or more search phrases and/or other search constraints.

6. The apparatus according to claim 1 able to use logical conjunctions and/or logical disjunctions between or among the one or more search constraints and/or search phrases within each search constituent.

7. The apparatus according to claim 1 enabling use of a plurality of search constituents, having a common root of a search constraint or complex query.

8. The apparatus according to claim 1 adapted to provide probable relevance (non-deterministic) results in the form of a bar chart, preferably wherein default settings, are provided to show percentage relevance in different colours for different bands of relevance, such as blank for zero probability, red for greater than zero and less than 40%, yellow for 40% to less than 70% and green for 70% to 100% probability.

9. The apparatus according to claim 1, wherein in the data source portlet the relevance scores are displayed for each data source as they apply to the selected search constituent(s).

10. The apparatus according to claim 1, wherein the result hits portlet shows the individual results/matches/hits for any search constituent(s) selected in the search results portlet against the selected data source(s) listed in the data source portlet.

11. The apparatus according to claim 1, wherein the result hit location portlet shows where the individual results within the result hits portlet are located within the selected data source(s) listed in the data source portlet.

12. The apparatus according to claim 1, wherein a user interaction with one portlet effects change within one or more of the other portlets, and preferably wherein the types of change cascade through the other portlets.

13. The apparatus according to claim 1, wherein selecting a data source in data source portlet effects one or more of the following changes: relevance in search results portlet is displayed for the selected data source(s) only; result hits data is displayed for the selected data source only; result hits location portlet displays locations of hits within the selected source.

14. The apparatus according to claim 1, wherein selecting an entry in the search results portlet effects one or more of the following changes: relevance in data source portlet updated to correspond to only that part of the overall query; ordering of data sources reordered according to that new relevance; result hits data and hit locations displayed only for that part of the overall query.

15. The apparatus according to claim 1, wherein selection from the results hit portlet effects one or more of the following:
a change in the set of locations displayed in results hit location portlet;
display of a menu allowing verification or invalidation of the hit(s) corresponding to the selection.

16. The apparatus according to claim 1, wherein selection from results hit location portlet effects one or more of the following:
display of a menu allowing verification or invalidation of the hit(s) corresponding to the selection or entry of alternative search phrases to correspond to the hit or inspection of that location within the data source;
immediate inspection of that region of the data source.

17. The apparatus according to claim 1, comprising an editor interface which enables a user to define a new complex query or to modify an existing one by defining additional search constituents and/or modifying existing search constituents.

18. The apparatus according to claim 17, wherein the user may initiate a search process to obtain the results for a new query or to update the results for a modified query in which the status of the search process is reflected by an appropriate visual indication in one or more of the portlets.

19. The apparatus according to claim 18, wherein the visual indication comprises the data source names being displayed in italics until the search or search refresh has completed for said data source.

20. A method for analyzing non-deterministic results of a search query of data representing analogue information, such as audio data, comprising:
providing a processor and a user interface, the processor being operably in communication with a plurality of audio data sources or databases representing the content thereof and adapted to communicate with the user interface;
querying one or more audio data sources for the presence of search constituents within the audio data;
determining the non-deterministic likelihood of occurrence of the search constituent within at least part of each of the searched data sources for a user query;
presenting to a user the search results in a form including:
a portlet presenting the overall search results (such as search strings) against part or all of the search query structure for a data source(s);
a portlet presenting the data source (such as by source name) of one or more data source(s);
a portlet presenting a data source filter tree for selecting currently active source(s);
a portlet presenting the hit(s) of the search phrase(s) for a data source; and
a portlet presenting the hit location(s) within a data source, presenting the hit location(s) within a data source, and wherein at least one of the portlets presents the user with information related to the non-deterministic likelihood of occurrence of the search constituent as a probability of the relevance of a searched data source of the search query and parts of the search query;

enabling the user to select and inspect at least part of the searched data source(s) for the presence of the search constituents;

presenting the portlets to the user with relevancy scores to the data as determined by the non-deterministic results;

updating and synchronizing each portlet during a change-of-state cascade event whenever the state is changed within any one of the portlets; and enabling the user to edit the probable relevance of the data source, convert the non-deterministic results that are returned by the search of the audio data to deterministic results based on the relevancy score by the user interaction with the data source, and altering the relevance of that data source computed for the overall query.

* * * * *